INVENTORS
GEORGE F. MARETTE
EDWARD J. FARRELL
RICHARD R. LACHENMAYER
BY Thomas J. Nikolai
ATTORNEY

LEGEND:

REGISTERS, AMPLIFIERS, & TRANSLATORS

MODIFIER NETWORKS

| OP CODES | MNEMONIC INSTRUCTIONS | INSTRUCTION FUNCTIONS |
|---|---|---|
| 01 | Right SHift • Q | Shift (Q) Right by Y |
| 02 | Right SHift • A | Shift (A) Right by Y |
| 03 | Right SHift • AQ | Shift (AQ) Right by Y |
| 04△ | COMpare • A,• Q,• AQ | Sense (j); $(A)_i = (A)_f$ |
| 05 | Left SHift • Q | Shift (Q) Left by Y |
| 06 | Left SHift • A | Shift (A) Left by Y |
| 07 | Left SHift • AQ | Shift (AQ) Left by Y |
| 10 | ENTer • Q | $Y \longrightarrow Q$ |
| 11 | ENTer • A | $Y \longrightarrow A$ |
| 12 | ENTer • $B^n$ | $Y \longrightarrow B^j$ |
| 13* | EXternal-FunCTion • $C^n$ | $j^* \neq 0$ or 1, $(Y) \longrightarrow C^{j^*}$, $j^* = 0$ or 1, (See Note, Fig. 5b) |
| 14 | SToRe • Q | $(Q) \longrightarrow Y$; $k=0$, $Q' \longrightarrow Q$ |
| 15 | SToRe • A | $(A) \longrightarrow Y$; $k=4$, $A' \longrightarrow A$ |
| 16 | SToRe • B | $(B)^j \longrightarrow Y$ |
| 17* | SToRe • C | $(C)^{j^*} \longrightarrow Y$ |
| 20 | ADD • A | $(A)+Y \longrightarrow A$ |
| 21 | SUBtract • A | $(A)-Y \longrightarrow A$ |
| 22 | MULtiply | $(Q)Y \longrightarrow AQ$ |
| 23△ | DIVide | $(AQ)/Y \longrightarrow Q$, $R \longrightarrow A_f$ |
| 24 | RePLace • A+Y | $(A)+(Y) \longrightarrow Y$ & A |
| 25 | RePLace • A−Y | $(A)-(Y) \longrightarrow Y$ & A |
| 26△ | ADD • Q | $(Q)+Y \longrightarrow Q$. $(A)_i = (A)_f$ } j interpretation |
| 27△ | SUBtract • Q | $(Q)-Y \longrightarrow Q$. $(A)_i$ $(A)_f$ } reversed for A & Q |
| 30 | ENTer • Y + Q | $Y+(Q) \longrightarrow A$ |
| 31 | ENTer • Y − Q | $Y-(Q) \longrightarrow A$ |
| 32 | SToRe • A + Q | $(A)+(Q) \longrightarrow Y$ & A |
| 33 | SToRe • A − Q | $(A)-(Q) \longrightarrow Y$ & A |
| 34 | RePLace • Y + Q | $(Y)+(Q) \longrightarrow Y$ & A |
| 35 | RePLace • Y − Q | $(Y)-(Q) \longrightarrow Y$ & A |
| 36 | RePLace • Y + 1 | $(Y)+1 \longrightarrow Y$ & A |
| 37 | RePLace • Y − 1 | $(Y)-1 \longrightarrow Y$ & A |
| 40△ | ENTer • LP△△ | L $[Y(Q)] \longrightarrow A$; j=2, even parity; j=3, odd parity |
| 41 | ADD • LP | L $[Y(Q)]+(A) \longrightarrow A$ |
| 42 | SUBtract • LP | $(A)-$L $[Y(Q)] \longrightarrow A$ |
| 43 | COMpare • MASK | $(A)-$L $[Y(Q)]$ SENSE (j), $(A)+$L $[Y(Q)]$; $(A)_j = (A)_f$ |
| 44△ | RePLace • LP | $L(Y)(Q) \longrightarrow Y$ & A; j=2, even parity; j=3, odd parity |
| 45 | RePLace • A+LP | $L(Y)(Q)+A \longrightarrow Y$ & A |
| 46 | RePLace • A−LP | $(A)-L(Y)(Q) \longrightarrow Y$ & A |
| 47 | SToRe • LP | $L(A)(Q) \longrightarrow Y$; $(A)_i = (A)_f$ |
| 50 | SELective • SET | SET $(A)_n$ FOR $Y_n = 1$ |
| 51 | SELective • CP△△ | COMPLEMENT $(A)_n$ FOR $Y_n = 1$ |

REPERTOIRE OF INSTRUCTIONS

*Fig. 5a*

| OP CODES | MNEMONIC INSTRUCTIONS | INSTRUCTION FUNCTIONS |
|---|---|---|
| 52 | SElective • CL$^{\Delta\Delta}$ | CLEAR $(A)_n$ FOR $Y_n = 1$ |
| 53 | SElective • SU$^{\Delta\Delta}$ | Y ⟶ $(A)_n$ FOR $(Q)_n = 1$ |
| 54 | Replace SElective • SET | SET $(A)_n$ FOR $(Y)_n = 1$, ⟶ Y & A |
| 55 | Replace SElective • CP | COMPLEMENT $(A)_n$ FOR $(Y)_n = 1$, ⟶ Y & A |
| 56 | Replace SElective • CL | CLEAR $(A)_n$ FOR $(Y)_n = 1$, ⟶ Y & A |
| 57 | Replace SElective • SU | $(Y)_n$ ⟶ $(A)_n$ FOR $(Q)_n = 1$, ⟶ Y |
| 60 | JumP (arithmetic) | Jump to Y if j-condition is satisfied. |
| 61 | JumP (manual) | (see JP & RJP j-Designators) |
| 62* | JumP (if • $C^n$ has ACTIVE INput buffer) | Jump to Y if $C^{j*}$ input buffer active (see JP & RJP j-Designators) |
| 63* | JumP (if • $C^n$ has ACTIVE OUTput buffer) | Jump to Y if $C^{j*}$ output buffer active |
| 64 | Return JumP (arithmetic) | Jump to Y+1 and P+1 ⟶ $Y_L$ if j-condition is |
| 65 | Return JumP (manual) | satisfied. (see JP & RJP j-Designators) |
| 66* | TERMinate • $C^n$ INPUT | Terminate input buffer on channel $j^*$ |
| 67* | TERMinate • $C^n$ OUTPUT | Terminate output buffer on channel $j^*$ |
| 70$^\Delta$ | RePeaT | Execute NI Y times |
| 71 | BSKip • $B^n$ | $(B)^j = Y$, skip NI and clear $(B)^j$ ; $(B)^j \neq Y$, Advance $B^j$ and read NI. |
| 72 | BJumP • $B^n$ | $(B)^j = 0$, read NI; $(B)^j \neq 0$, $(B)^j - 1$ and jump to address Y. |
| 73* | INput • $C^n$ (without monitor mode) | Buffer IN on $C^{j*}$; $k^*=3$, (Y) ⟶ $(00100+j^*)$;<br>$k^*=1$, $(Y)_L$ ⟶ $(00100+j^*)_L$;<br>$k^*=0$, Y ⟶ $(00100+j^*)_L$; |
| 74* | OUTput • $C^n$ (without monitor mode) | Buffer OUT on $C^{j*}$; $k^*=3$, (Y) ⟶ $(00120+j^*)$;<br>$k^*=1$, $(Y)_L$ ⟶ $(00120+j^*)_L$;<br>$k^*=0$, Y ⟶ $(00120+j^*)_L$; |
| 75* | INput • $C^n$ (with • MONITOR mode) | Buffer IN on $C^{j*}$; $k^*=3$, (Y) ⟶ $(00100+j^*)$;<br>$k^*=1$, $(Y)_L$ ⟶ $(00100+j^*)_L$;<br>$k^*=0$, Y ⟶ $(00100+j^*)_L$; |
| 76* | OUTput • $C^n$ (with • MONITOR mode) | Buffer OUT on $C^{j*}$; $k^*=3$, (Y) ⟶ $(00120+j^*)$;<br>$k^*=1$, $(Y)_L$ ⟶ $(00120+j^*)_L$;<br>$k^*=0$, Y ⟶ $(00120+j^*)_L$.<br>mon. inter. at $00060+j^*$ |

REPERTOIRE OF INSTRUCTIONS $\Delta\Delta$:
- LP - Logical Product
- CP - Complement
- SU - Substitute
- CL - Clear Y - The operand; Y or (Y)

*, $\Delta$ - Special j & k Designators

NOTE:

Skip NI if other Computer (on channel 0 or 1) has input buffer active. Execute twice.

Fig. 5b

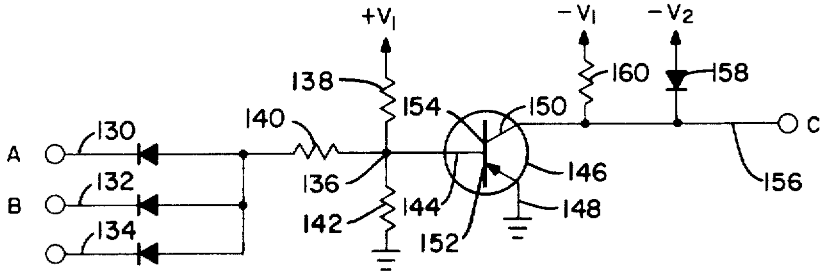
Fig. 6
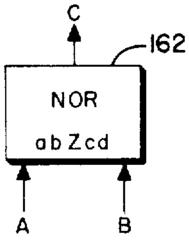
Fig. 7
| A | B | C |
|---|---|---|
| 0 | 0 | 1 |
| 0 | 1 | 0 |
| 1 | 0 | 0 |
| 1 | 1 | 0 |
$C = \overline{A+B} = \bar{A}\bar{B}$
Fig. 8
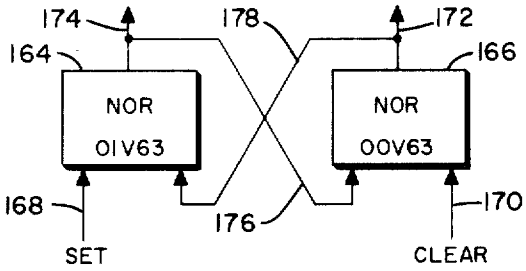
Fig. 9
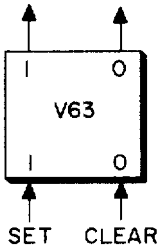
Fig. 10
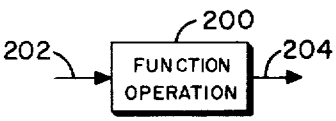
Fig. 11a
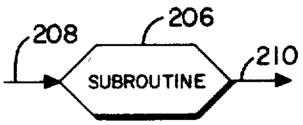
Fig. 11b
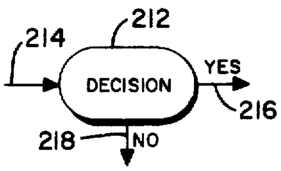
Fig. 11c
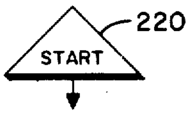
Fig. 11d
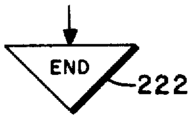
Fig. 11e
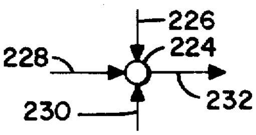
Fig. 11f March 31, 1970 E. J. FARRELL ET AL 3,504,164

DATA PROCESSING SYSTEM FOR CLASSIFYING UNKNOWN WAVE FORM

Filed April 10, 1964 28 Sheets-Sheet 8

March 31, 1970 E. J. FARRELL ET AL 3,504,164

DATA PROCESSING SYSTEM FOR CLASSIFYING UNKNOWN WAVE FORM

Filed April 10, 1964 28 Sheets-Sheet 9

March 31, 1970 E. J. FARRELL ET AL 3,504,164

DATA PROCESSING SYSTEM FOR CLASSIFYING UNKNOWN WAVE FORM

Filed April 10, 1964 28 Sheets-Sheet 18

I $(b_0 \times 2^0 + b_1 \times 2^1 + b_2 2^2 + b_3 2^3 + b_4 2^4)^2 = C_0 2^0 + C_1 2^1 + C_2 2^2 + C_3 2^3 + C_4 2^4 + C_5 2^5 + C_6 2^6 + C_7 2^7 + C_8 2^8 + C_9 2^9$

| | | | | | | | | | | |
|---|---|---|---|---|---|---|---|---|---|---|
| II | $b_0 b_0 2^0$ | $+b_0 b_1 2^1$ | $+b_0 b_2 2^2$ | $+b_0 b_3 2^3$ | $+b_0 b_4 2^4$ | | | | | |
| | | $+b_0 b_1$ | $+b_1 b_1$ | $+b_1 b_2$ | $+b_1 b_3$ | $+b_1 b_4 2^5$ | | | | |
| | | | $+b_0 b_2$ | $+b_1 b_2$ | $+b_2 b_2$ | $+b_2 b_3$ | $+b_2 b_4 2^6$ | | | |
| | | | | $+b_0 b_3$ | $+b_1 b_3$ | $+b_2 b_3$ | $+b_3 b_3$ | $+b_3 b_4 2^7$ | | |
| | | | | | $+b_0 b_4$ | $+b_1 b_4$ | $+b_2 b_4$ | $+b_3 b_4$ | $+b_4 b_4 2^8$ | |
| III | $C_0$ | $C_1$ | $C_2$ | $C_3$ | $C_4$ | $C_5$ | $C_6$ | $C_7$ | $C_8$ | $C_9$ |

IV $C_0 = b_0$ $C_1 = 0$ $C_2 = b_1 \bar{b}_0$ $C_3 = b_0(b_2 \bar{b}_1 + \bar{b}_2 b_1) = b_0 b_2 \bar{b}_1 + b_0 \bar{b}_2 b_1$ $C_4 = b_0(b_3 \bar{b}_2 + \bar{b}_3 b_2) + b_2 \bar{b}_1 \bar{b}_0 = b_0 b_3 \bar{b}_2 + b_0 \bar{b}_3 b_2 + b_2 \bar{b}_1 \bar{b}_0$ $C_5 = \bar{b}_4 b_1 (b_3 \bar{b}_2 + \bar{b}_3 b_2) + b_4 \bar{b}_3 b_0 (\bar{b}_2 + \bar{b}_1) + b_1 \bar{b}_0 (\bar{b}_3 b_2 + b_3 \bar{b}_2) + \bar{b}_4 b_3 b_2 b_0 + b_4 \bar{b}_2 \bar{b}_1 b_0$ $= \bar{b}_4 b_1 b_3 \bar{b}_2 + \bar{b}_4 b_1 \bar{b}_3 b_2 + b_4 \bar{b}_3 b_0 \bar{b}_2 + b_4 \bar{b}_3 b_0 \bar{b}_1 + b_1 \bar{b}_0 \bar{b}_3 b_2 + b_1 \bar{b}_0 b_3 \bar{b}_2 + \bar{b}_4 b_3 b_2 b_0 + b_4 \bar{b}_2 \bar{b}_1 b_0$ $C_6 = \bar{b}_4 b_3 \bar{b}_2 + \bar{b}_4 b_3 b_1 + b_4 \bar{b}_3 \bar{b}_2 b_1 + b_4 \bar{b}_3 b_1 \bar{b}_0 + b_4 b_3 b_2 b_0 + b_3 b_1 b_0 + b_3 \bar{b}_2 \bar{b}_1$ $C_7 = \bar{b}_4 b_3 b_2 + b_4 \bar{b}_3 b_2 b_1 + b_4 \bar{b}_3 b_2 \bar{b}_0 + b_4 b_3 b_1$ $C_8 = b_4 \bar{b}_3 \bar{b}_2 + b_4 \bar{b}_3 b_2 \bar{b}_1 + b_4 \bar{b}_3 b_2 \bar{b}_0 + b_4 b_3 b_2$ $C_9 = b_4 b_3 + b_4 b_2 b_1 b_0$

Fig. 27

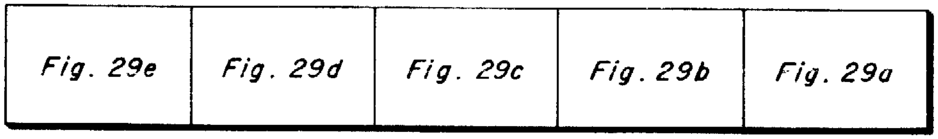

Fig. 28

DATA PROCESSING SYSTEM FOR CLASSIFYING UNKNOWN WAVE FORM

Filed April 10, 1964 28 Sheets-Sheet 25

DATA PROCESSING SYSTEM FOR CLASSIFYING UNKNOWN WAVE FORM

Filed April 10, 1964 28 Sheets-Sheet 28

United States Patent Office 3,504,164
Patented Mar. 31, 1970

3,504,164

DATA PROCESSING SYSTEM FOR CLASSIFYING UNKNOWN WAVEFORM

Edward J. Farrell and Richard R. Lachenmayer, St. Paul, and George F. Marette, Minneapolis, Minn., assignors to Sperry Rand Corporation, New York, N.Y., a corporation of Delaware Filed Apr. 10, 1964, Ser. No. 358,918
Int. Cl. G06f *15/34;* G06g *7/19;* G06k *9/00*
U.S. Cl. 235—150 19 Claims

ABSTRACT OF THE DISCLOSURE

A system utilizing digital data processing techniques for classifying unknown wave forms, which have been quantized, by comparison to a class of known or reference wave forms, and determining the identification of the unknown wave forms by the correlation factors generated by the digital circuitry as a result of the comparison.

A digital waveform classifier, or identifier, has several applications. For example, it can be applied to electrocardiographs, electroencephalographs, seismographs, sonar, and many other areas of interest. A digital waveform classifier can also be used in the operation of matching numbers where waveforms are in no way involved. For certain of these applications, it is necessary to accomplish the identification in real-time, while in others, there is a large amount of data to be analyzed without real-time being a factor. In each of these situations, the classifier must operate at high computer rates.

To simplify the discussion of the inventive concept the description will be directed to the particular application of underwater object classification utilizing sonar signals, but limitation thereto is in no way intended.

The device performs the function of analyzing segments of an input waveform by comparing such segments to a set of reference waveforms to determine which, if any, reference waveform is present in the segment of the input waveform. As stated above, the waveform classifier utilizes digital techniques. The input waveforms are sampled at a fixed rate, and the identification is based on a comparison of the samples to the set of reference waveforms.

The determination of the characteristics of the reference waveforms depends on the type of identification problem. In certain types of applications the reference waveforms can be determined in advance. For example, if only triangular waveforms with specified characteristics are to be classified, the nature of the reference waveforms may be accurately determined. In other problems, the reference waveforms are unknown and must be derived empirically. The application of these inventive concepts to the identification of underwater objects using sonar is this type of a problem. A given submarine at a given position will have a "characteristic" sonar return, while the actual return waveform will be different for each sonar echo because of noise in the system and random changes which can be traced to the medium. In such a case, the reference waveforms are obtained by combining and averaging several returns from known objects at known positions.

Waveform identification as such is not a new idea or problem. In the past, however, the primary emphasis on such identification has been on the use of analog techniques. Such applications have found wide use in the fields of seismic investigation, servo-system analysis, and the like. In most of these applications a record of the detected waveforms is made and the analysis carried on separately. Analysis in real-time is a relatively new concept coming into existence with the advent of computer-assigned analysis of data. A "real-time system" is defined as a system in which the delay in responding to a stimulus is negligible in the time reference of the user equipment. When solving a problem in real-time, the equipment must operate at rates sufficient to give an answer in the actual time during which the problem must be solved. More precisely, real-time operation is the processing of data in time with a physical process, so that the results of the data-processing are useful in guiding the physical operation. The development of this invention permits complex analysis of detected waveforms and identification in real-time. It should be noted that this system can be utilized in either real-time or independently of time according to the physical application.

Accordingly, a primary object of this invention is to provide an improved system of waveform identification.

Yet another object of this invention is to provide a waveform identification system which identifies detected waveforms by comparison of the detected waveforms to a predetermined number of known reference waveforms.

Another object of this invention is to provide a waveform identification system which is operable to perform identification in real-time.

Systems have been developed which identify waveforms, but these systems are usually limited to a consideration of the unknown waveform in a known relationship with standards to which it is being compared. This invention is not so limited, and can operate to identify detected waveforms independently of the registration or time position of the object waveform in the period of the detected waveform. This means that when a waveform is detected which has a portion thereof representing a particular object or condition and occurring anywhere in the detected waveform, this invention provides a system for examining the entire detected waveform to identify the particular condition wherever it occurs.

Therefore, another object of this invention is to provide a waveform identification system for identifying object waveforms independently of their position or registration in the detected waveforms.

Still another object of this invention is to provide a waveform identification system for classifying object waveforms of a predetermined class of known waveforms independently of their registration in the detected waveforms.

As mentioned above, considerable work has been done in the field of waveform analysis by analog techniques. Such systems do not, however, lend themselves to real-time identification, nor do they lend themselves to computer-assigned systems whereby large numbers of types of waveforms can be considered at high rates of speed. This invention applies digital techniques to the identification system, thereby permitting the simultaneous consideration of large numbers of waveform types while maintaining high rates of identification.

Another object of this invention, then, is to provide a waveform classification system which utilizes digital techniques.

Still another object of this invention is to provide a waveform classification system which quantizes detected waveforms into discrete digital signals for identification by numerical comparison to a predetermined class of digitally represented reference waveforms.

It is well known that statistical evaluations have been applied to an ever widening number of scientific systems. Whenever large quantities of data are to be considered, or whenever a wide variety of waveform types are to be analyzed, statistical concepts can be brought into use with beneficial results. When a history is known or determined concerning the frequencies of occurrence of certain conditions, statistical weighting can be employed to overcome system deficiencies such as noise in the identification system. In the field of waveform classification, statistical parameters are employed by this invention to assist in the actual identification process by providing "likelihood"

factors for each of the waveform types. This tends to weight the identification in a manner which reflects the likelihood of occurrence of the various waveforms.

Yet another object, therefore, is to provide a waveform identification system which utilizes statistical parameters to aid in the identification of detected object waveforms.

Still another object of this invention is to provide a waveform identification system in which varying effects of noise in the detected waveform can be partially compensated for by utilization of statistical occurrence parameters for each waveform type.

Many correlation systems have been developed using variations of the well-known product-sum correlation procedure. Such a system is feasible when the numbers being utilized are relatively small, but when larger numbers are used, and the number of waveform types increases, it becomes expensive to implement. This invention utilizes the least squared deviation computation system for determining the identification of the detected waveforms. This system allows for handling smaller numbers because in all cases differences are being squared. The unique circuit arrangement provided to perform the difference and squaring calculation is advantageous in that fewer circuit elements are required than are needed in prior art devices, and the rate of calculation is faster than the product-sum correlation procedure.

Therefore, yet another object of this invention is to provide a waveform classification system which can be economically constructed while being capable of performing the identification operation at high computation rates.

Still a further object of this invention is to provide unique circuitry for performing calculations of the mean squared deviations necessary for the waveform identification according to these inventive concepts.

Yet another object of this invention is to provide an improved waveform identification system in which quantized values of detected waveforms are compared numerically to a predetermined set of reference waveforms by circuitry which squares the sample differences and accumulates the numerical indication of the degree of similarity of the detected waveforms to each reference waveform.

In most data handling design problems points are reached where decisions must be made between use of existing general purpose equipment for a cost savings as opposed to using specially built equipment for attaining higher operating rates. In this invention the embodiment primarily described utilizes a general purpose computer for the storage of operands and to provide the sequential functional control of the waveform identification operation. This is a design choice and the classification equipment can be made to operate at higher rates if storage separate from the computer is provided and the control made an integral part of the classifier. With a computer available and having the time to perform the additional control and storage operations required for the waveform identification operations, it is more economical that it be utilized than to construct a completely independent classifier.

Yet another object of this invention is to provide a waveform classification system which utilizes a computer to provide the storage facility for operands and to direct the sequence of the classification operation thereby providing an economy of hardware usage.

Still a further object of this invention is to provide a waveform classification system operable at high rates of calculation and having its own storage and control apparatus.

DRAWINGS

The above and other more detailed and specific objects will be disclosed in the course of the following specification, reference being had to the accompanying drawings in which.

Figure 12A:
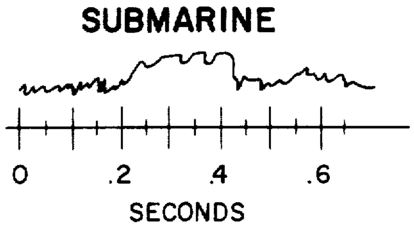
Figure 12B:
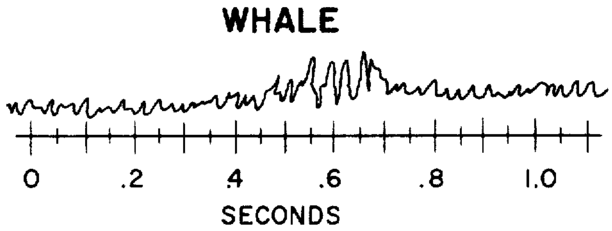
Figure 13:
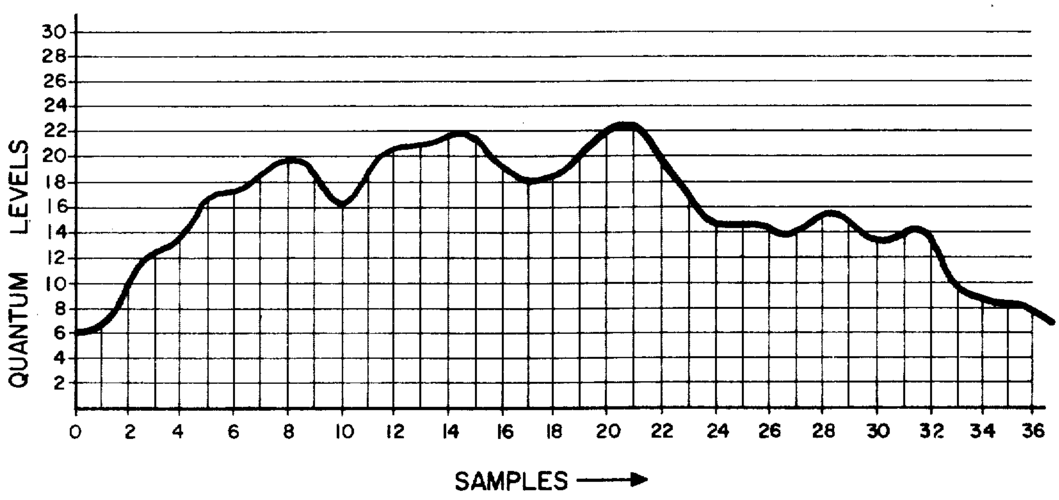
Figure 14:
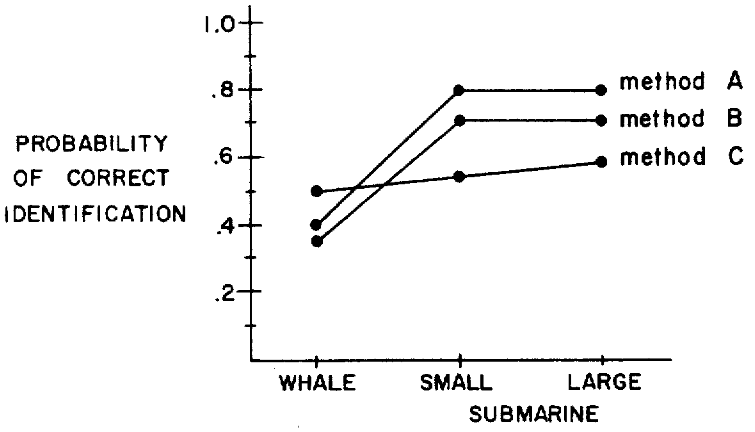
Figure 15:
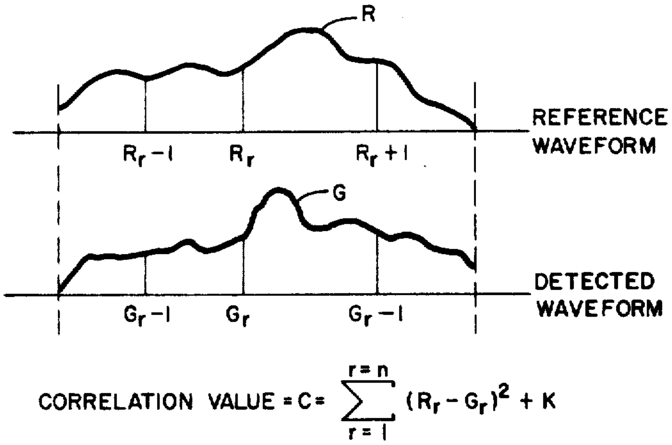
Figure 20:
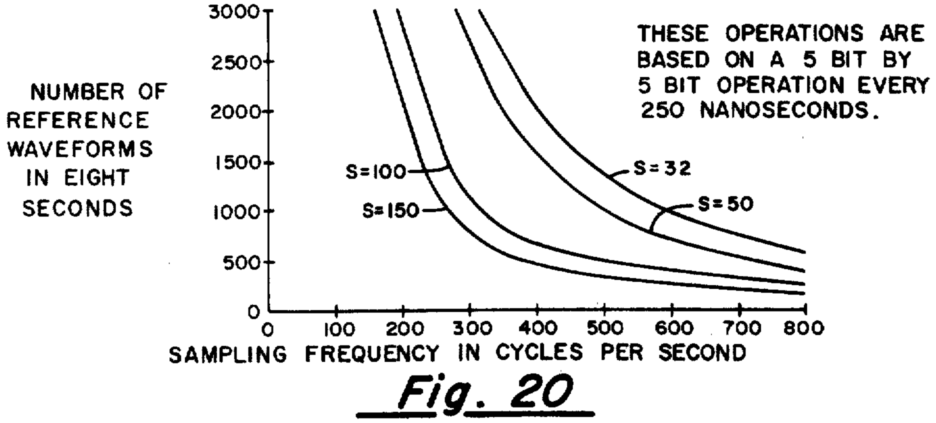
Figure 16:
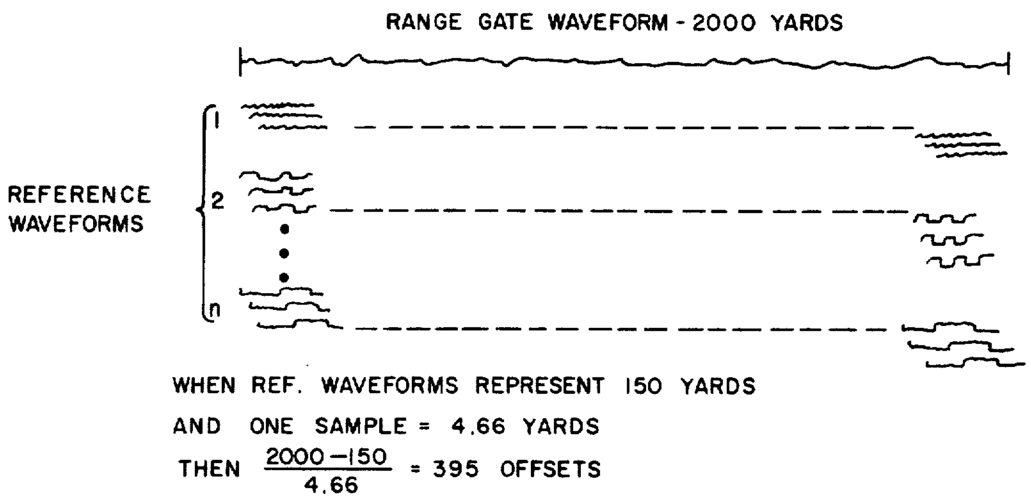
Figure 17:
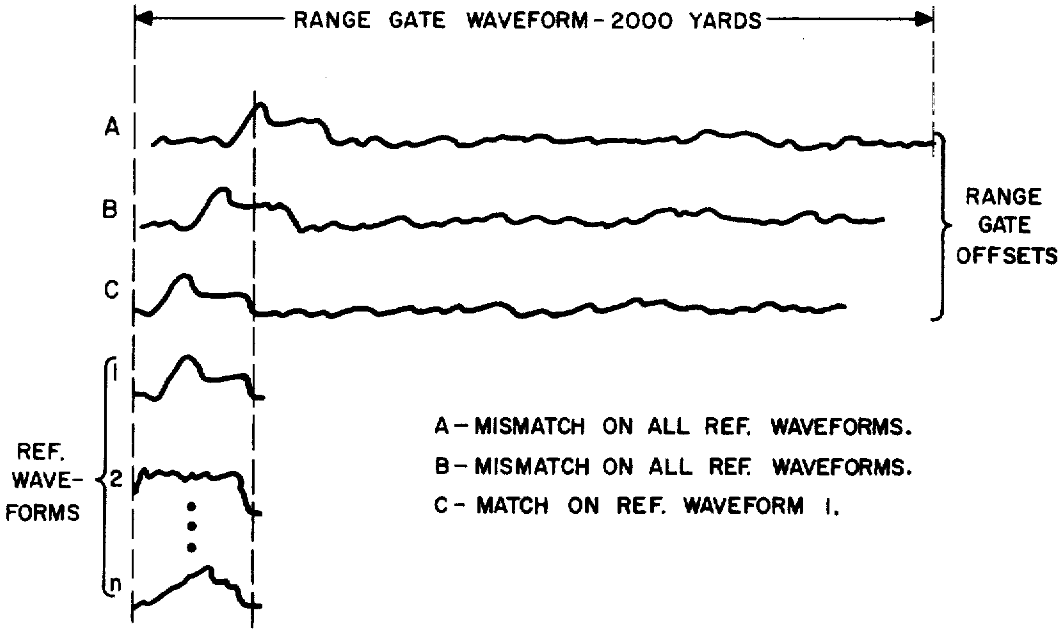
Figure 18:
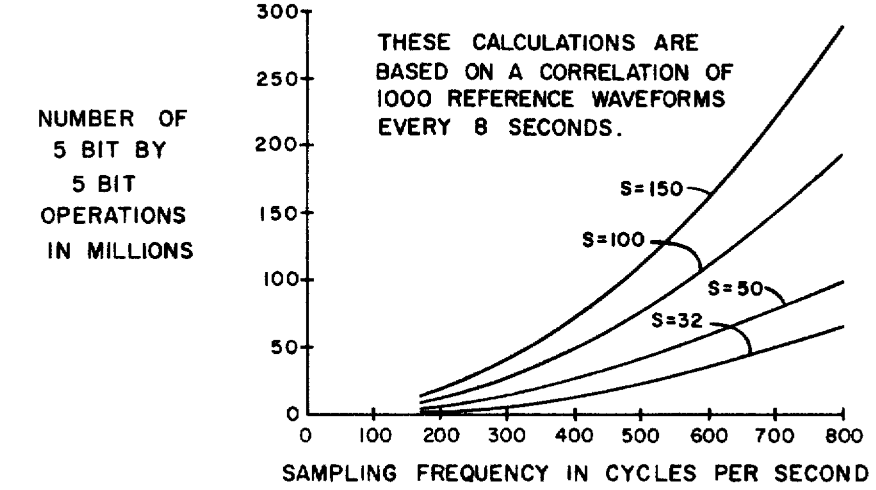
Figure 19:
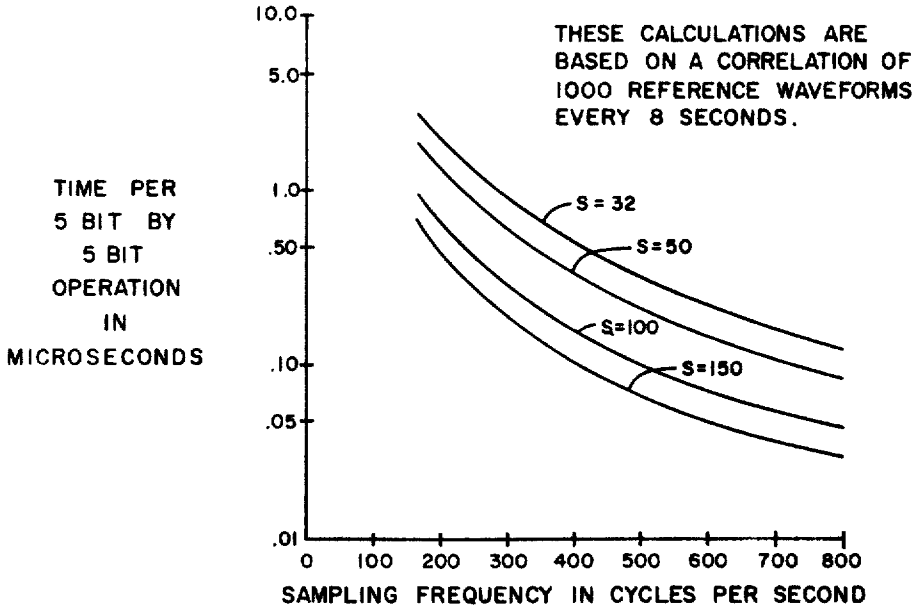
Figure 21:
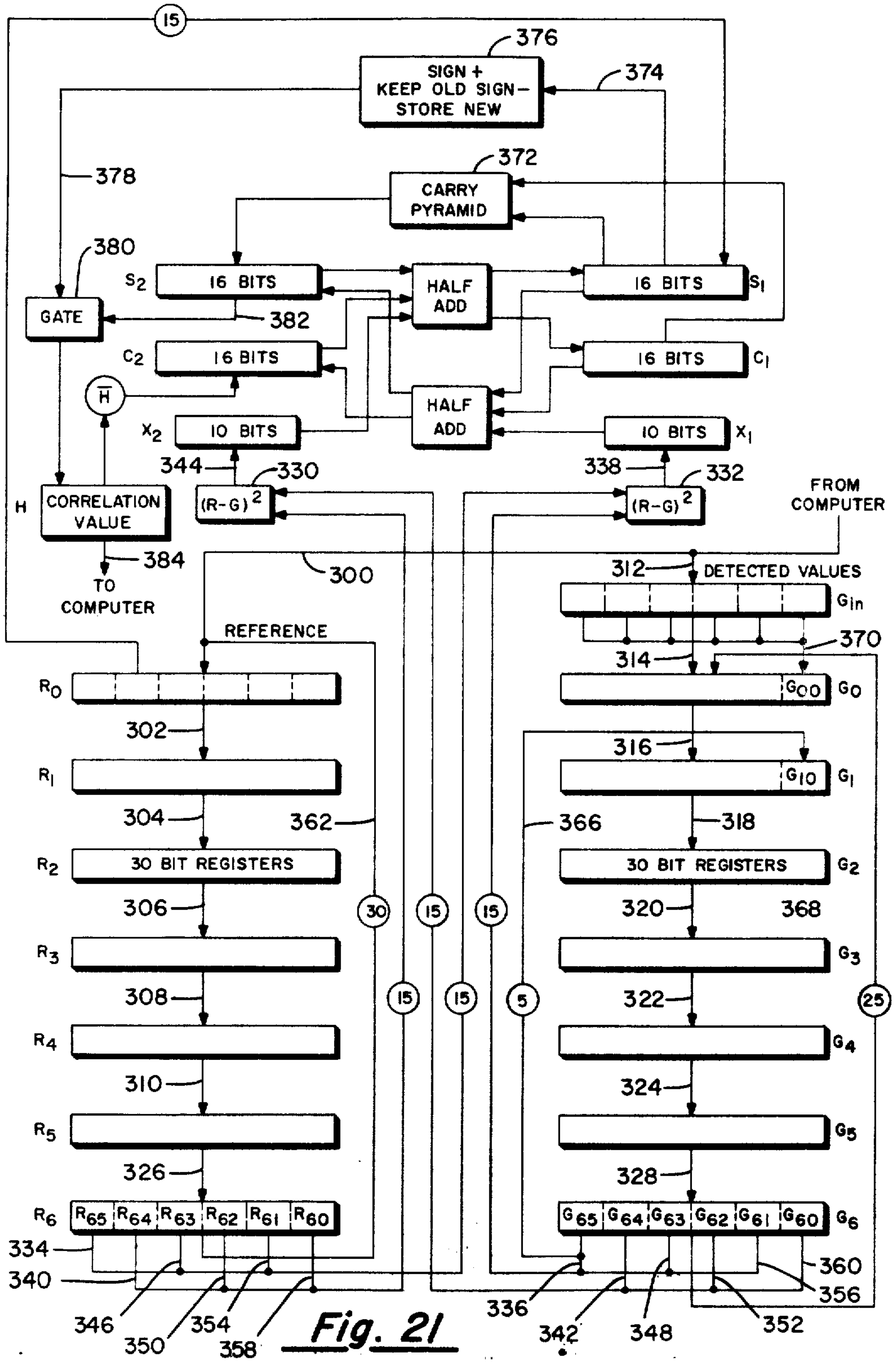
Figure 22:
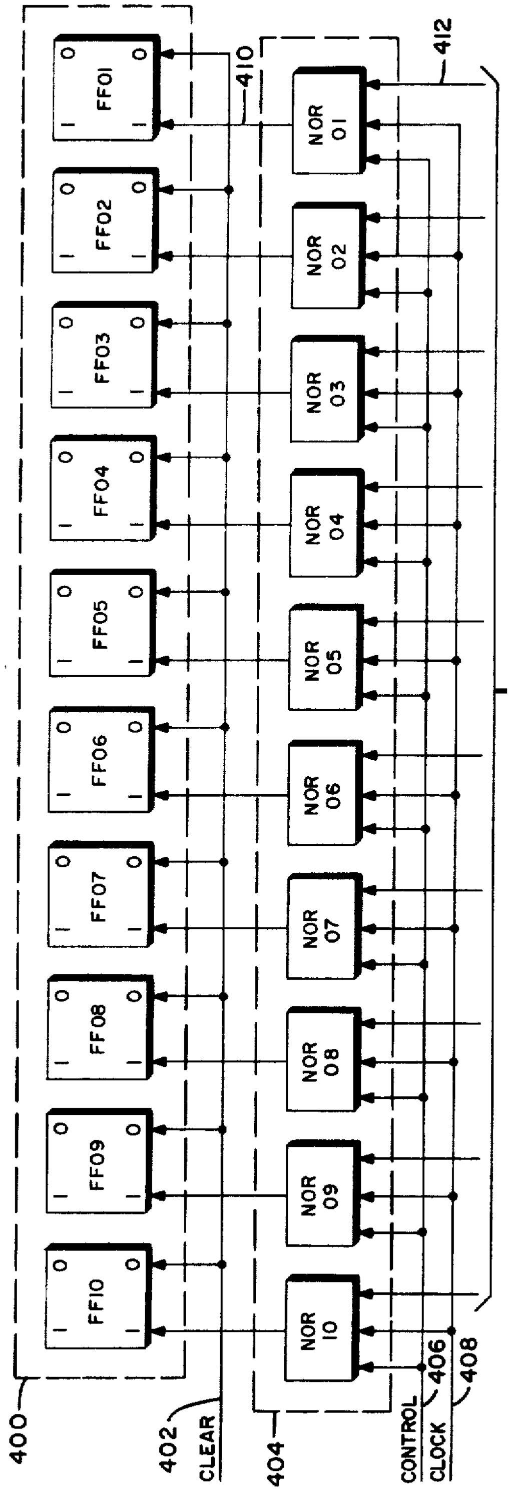
Figure 23:
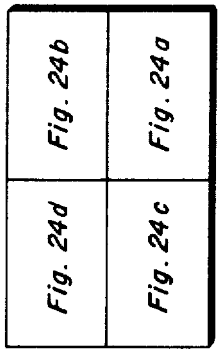

FIGS. 5*a* and 5*b* are a listing of the repertoire of instructions available for use with the computer with a description of their functions;

FIG. 6 is a schematic diagram of the NOR building block circuit utilized in this invention;

FIG. 7 shows the logic diagram symbol utilized to represent a NOR circuit;

FIG. 8 is the logical truth-table for the basic NOR circuit where two inputs are illustrated;

FIG. 9 is a block diagram of a flip-flop circuit comprised of cross-coupled NOR circuits;

FIG. 10 is a simplified block diagram symbolic representation of a flip-flop;

FIGS. 11*a* through 11*f* illustrate flow diagram symbols used to describe program operations;

FIG. 12*a* and FIG. 12*b* are charactreistic sonar waveforms for submarines and whales, respectively;

FIG. 13 is an illustrative waveform illustrating sampling and quantizing of the samples;

FIG. 14 illustrates various probabilities of correct identification of objects for three different identification criterions;

FIG. 15 illustrates the correlation technique of this invention;

FIG. 16 illustrates the off-set procedure of locating the portion of the detected waveform which represents the object to be identified;

FIG. 17 illustrates the system of range gate off-sets used to form the correlation values for the reference waveforms;

FIG. 18 is a plot of five (5) bit by five (5) bit operations as a function of sampling frequency for various waveform sizes;

FIG. 19 is a plot of time per five (5) bit by five (5) bit operation as a function of sampling frequency for various waveform sizes;

FIG. 20 is a plot of the number of reference waveforms to be handled per 8 second calculation period as a function of sampling frequency for various waveform sizes;

FIG. 21 is a simplified block diagram of the digital waveform classifier;

FIG. 22 is a logic block diagram of an exemplary register, as utilized in the embodiment of this invention;

FIG. 23 illustrates how FIGS. 24*a*, 24*b*, 24*c* and 24*d* should be viewed.

Figure 25:
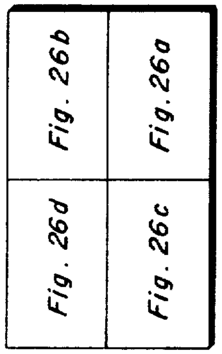
Figure 24A:
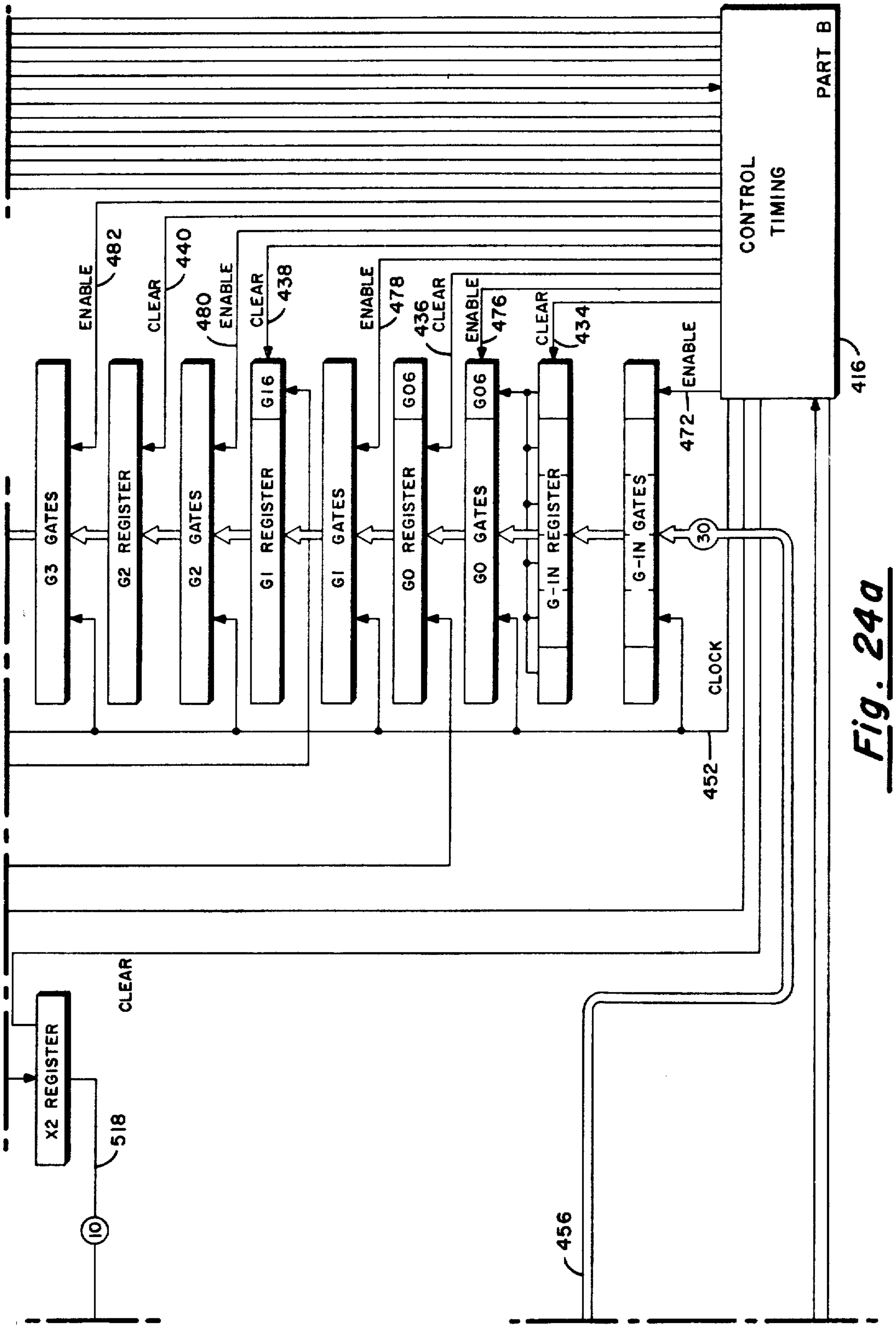
Figure 24B:
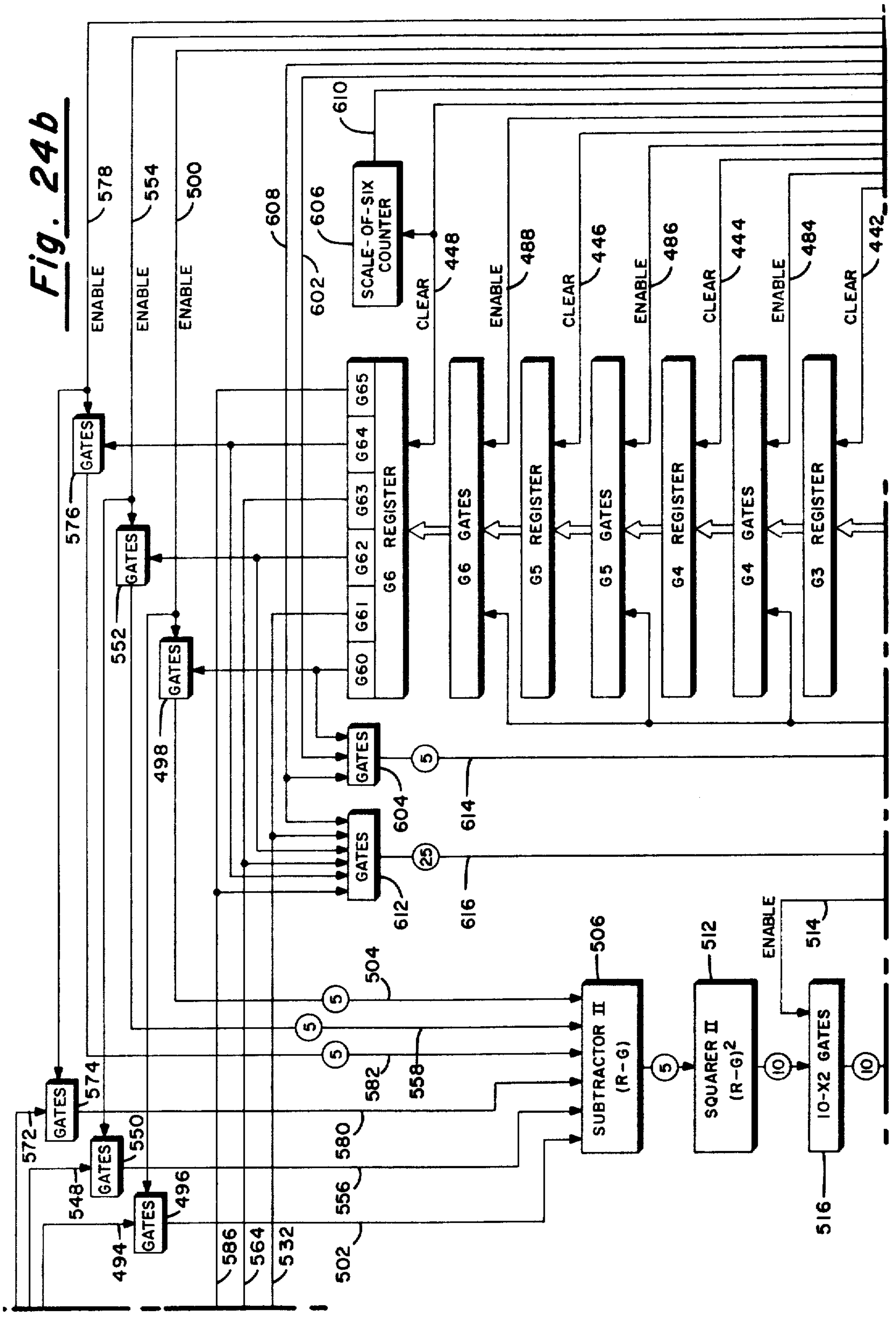
Figure 24C:
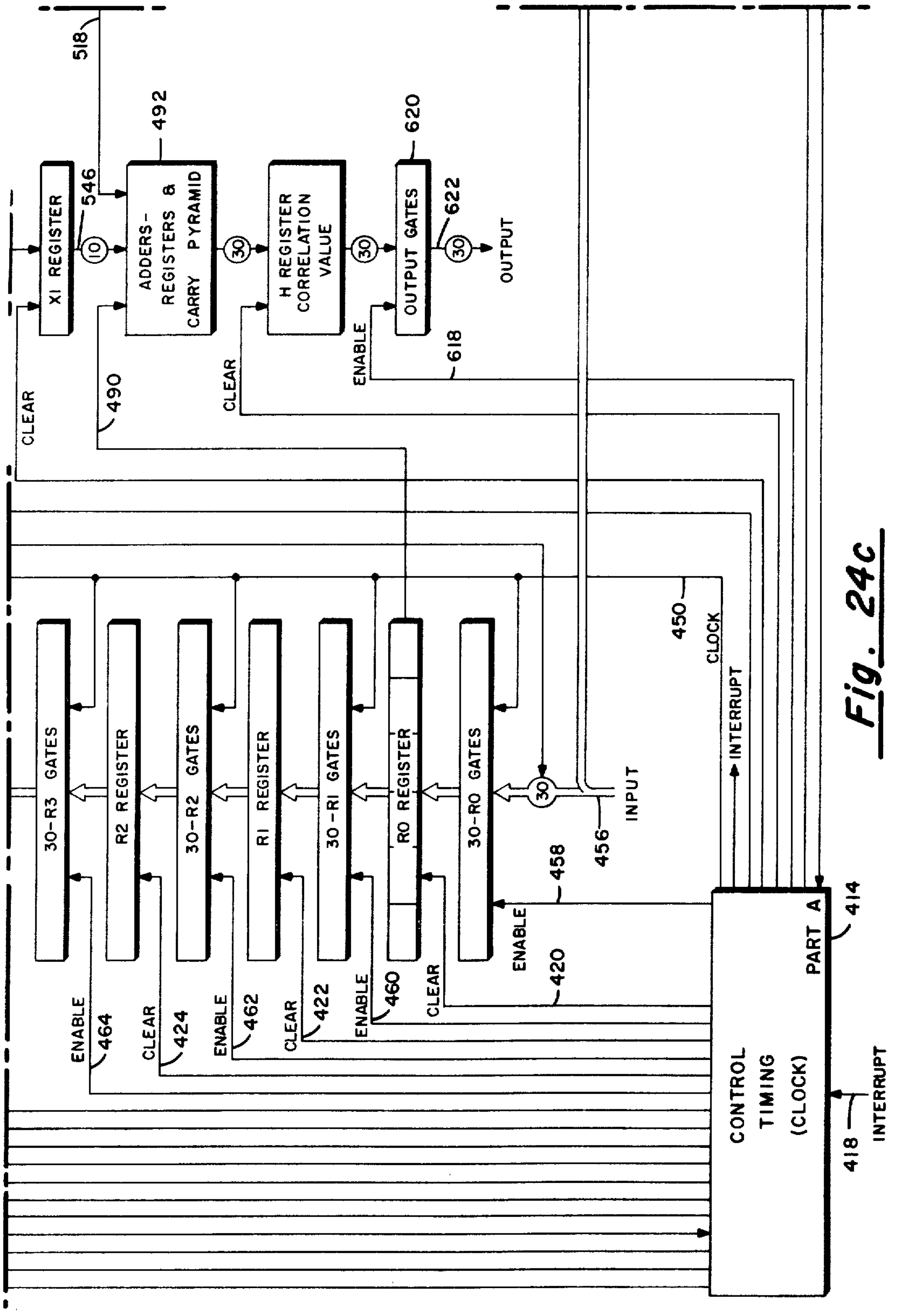
Figure 24D:
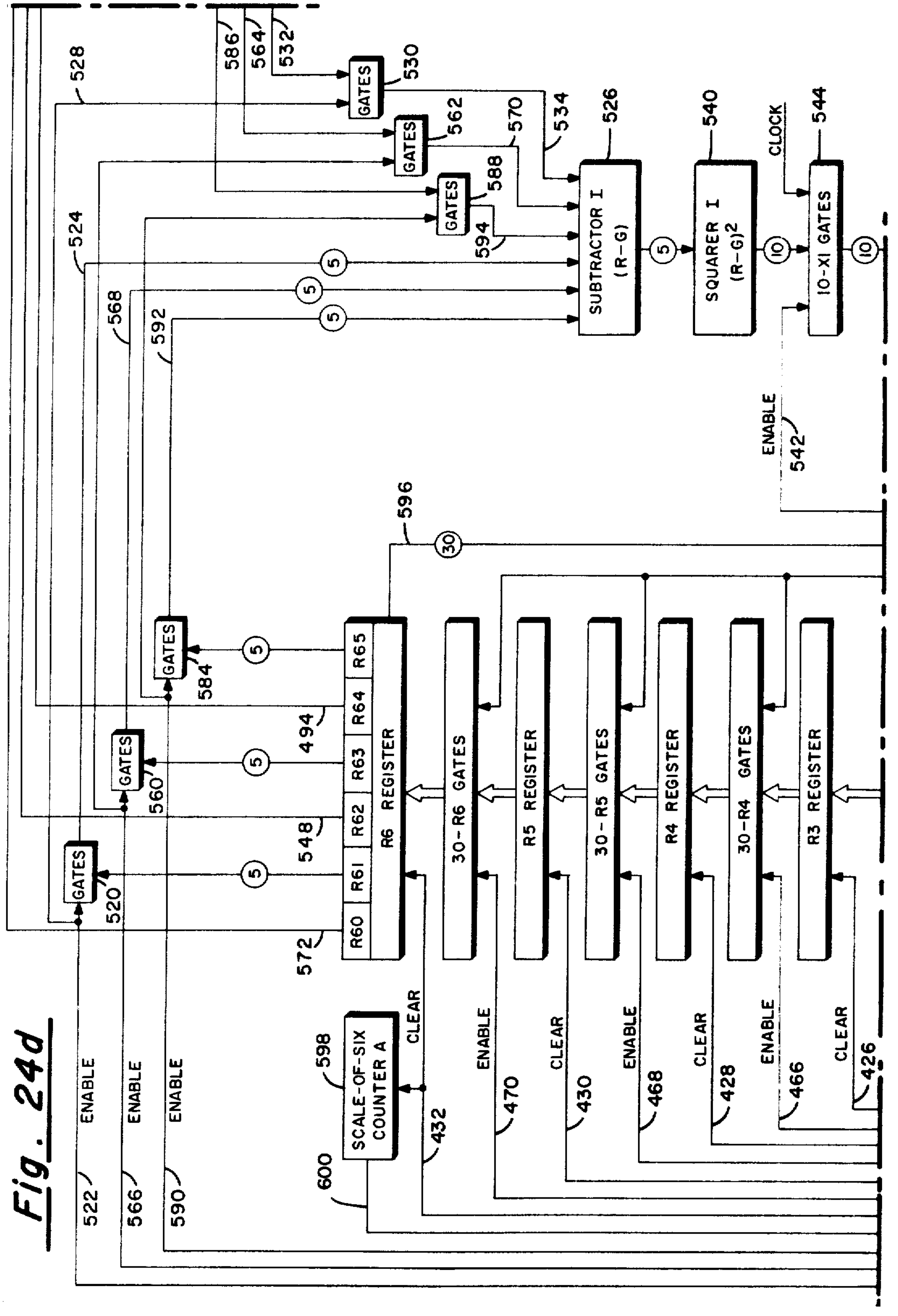
Figure 24E:
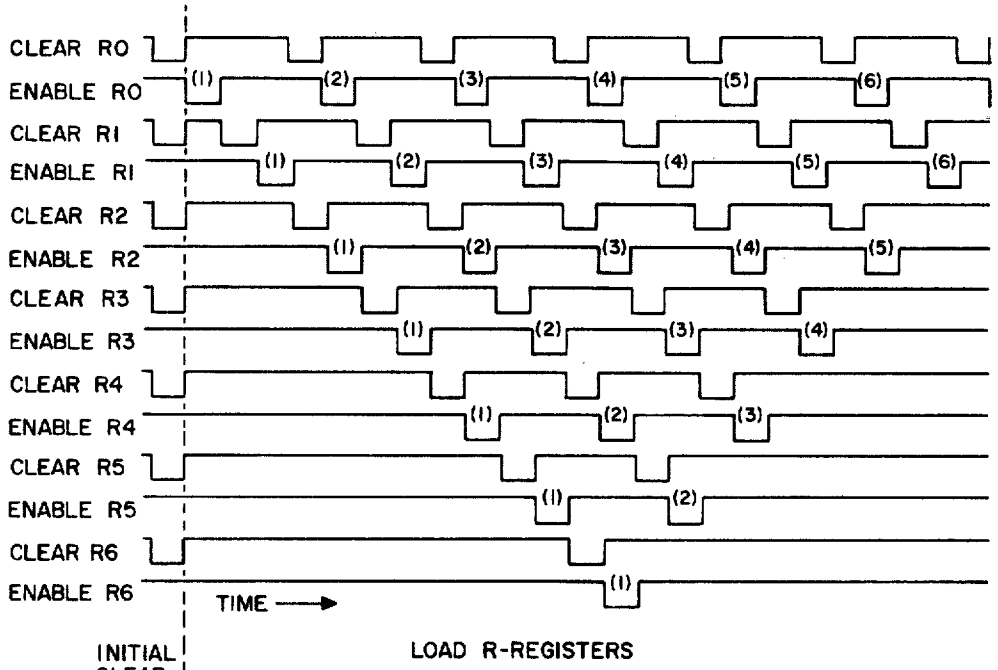
Figure 24F:
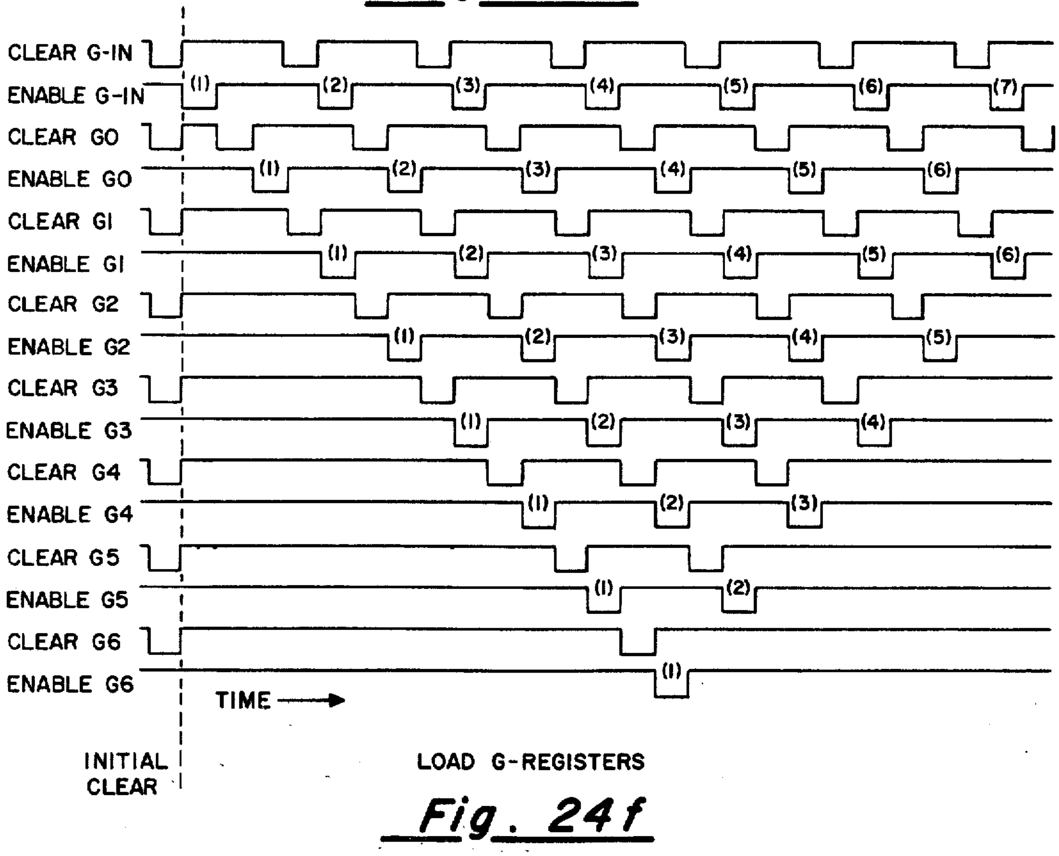
Figure 30:
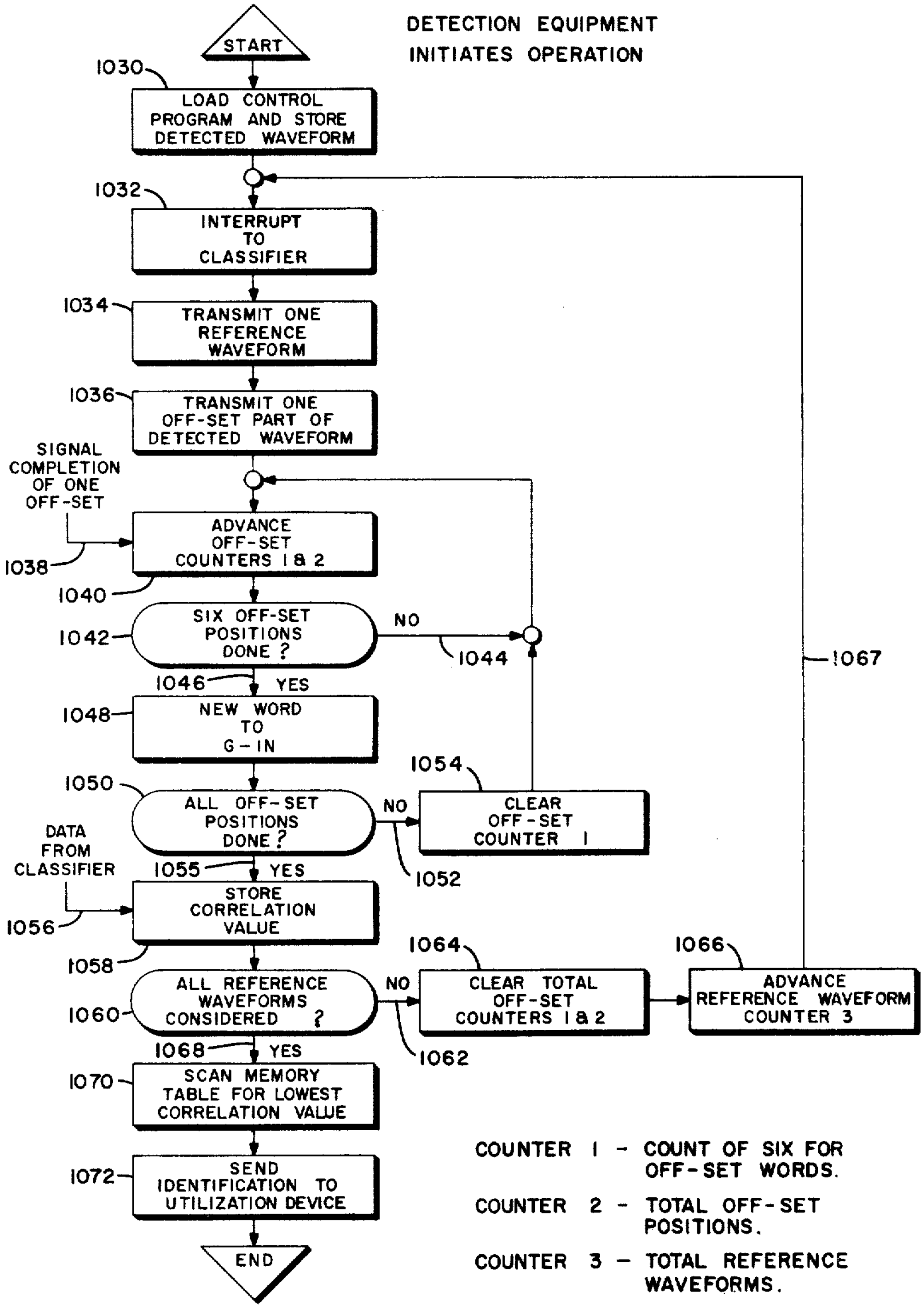
Figure 31:
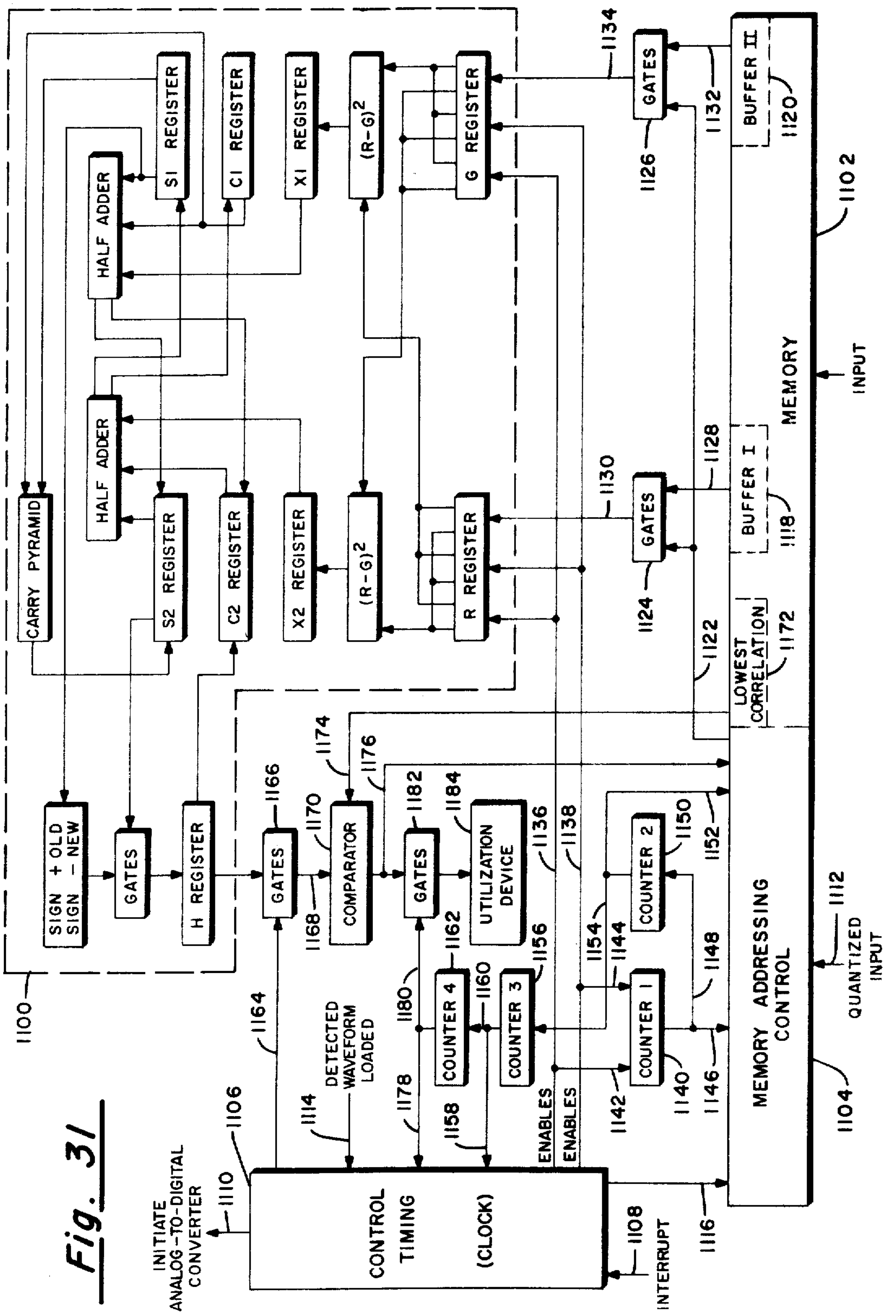

FIGS. 24*a*, 24*b*, 24*c* and 24*d* together are a block diagram of the control circuitry necessary to perform the correlation value calculation;

FIG. 24*e* illustrates the control pulse relationship for controlling the R Registers;

FIG. 24*f* illustrates the control pulse relationship for controlling the G Registers;

FIG. 25 illustrates how FIG. 26*a*, FIG. 26*b*, FIG. 26*c*, and FIG. 26*d* should be arranged for consideration;

FIG. 26*a* through FIG. 26*d* are collectively a block diagram of the Subtractor Circuitry;

FIG. 27 describes the logic relationships which define the Squaring logic;

FIG. 28 illustrates how FIG. 29*a* through FIG. 29*e* should be arranged for consideration;

FIG. 29*a* through FIG. 29*e* collectively are a block diagram of the Squaring Circuitry;

FIG. 30 is a logic block diagram of the Programmed Control which controls the operation of the Digital Waveform Classifier; and FIG. 31 is a simplified block diagram of the Digital Waveform Classifier with its own memory and control system included.

The invention will appear more clearly from the following detailed description when taken in connection with the accompanying drawings of the preferred embodiment of the inventive idea. The teachings of this invention are primarily applicable to waveform identification systems which employ digital circuitry.

Figure 1:
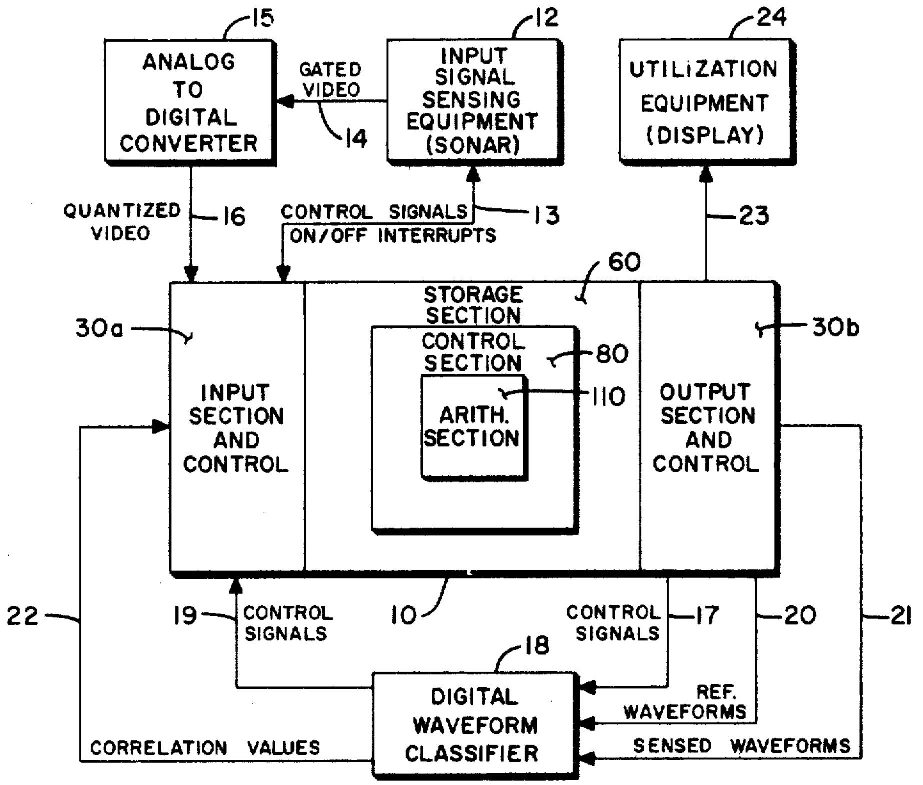
FIG. 1 is a block diagram of a system illustrating the data flow paths and the equipment used in this embodiment.

FIG. 1 is a block diagram which illustrates the types of equipment which are utilized in one embodiment of this invention. The arrowed lines illustrate paths of information flow, and in the physical equipment often are comprised of a plurality of conductors or cables. A general purpose digital computer 10 is the main coordinating device in this embodiment. It is utilized to receive and store detected waveforms which are to be classified, to store the listing of reference waveforms, and to make the final selection of the classification to be attributed to the waveforms that are classified. The Input Section 30*a*, the Output Section 30*b*, the Storage Section 60, the Control Section 80, and the Arithmetic Section 110 will be described in summary form in conjunction with FIG. 2, as will the nature of the control that is required for data transmission both to and from the computer. The characteristics of the various waveforms mentioned above will also be described in detail below.

It is necessary to provide a sensing device, as illustrated by block 12, to detect power signals which represent the waveforms to be classified. This sensing device will be selected according to the nature of the waveforms which are to be classified. In this illustrative embodiment, the sensing equipment is comprised of sonar equipment which is well known in the art. If electrocardiogram waveforms were to be classified, a completely different type of sensing device would be utilized. Upon detection of input waveform power, the sensing equipment provides an interrupt on control line 13 to the computer's Input Section 30*a*, which informs the computer 10 that a waveform is available for classification. The computer in turn signals the sensing equipment to provide the waveform via information path 14 to the analog-to-digital converter 15. In this embodiment, the signals provided on path 14 will be gated video. It is the function of the analog-to-digital converter 15 to provide quantized video signals to the Input Section 30*a* of the computer 10 at signal levels which are compatible with the computer circuitry. This quantized video is supplied via path 16, and the exact nature of these quantized video signals will be described below.

Having received the quantized video, which represents the detected waveform, the computer 10 stores the digital signals in designated storage addresses in its Storage Section 60. Prior to the initiation of the classification operation it is necessary to provide the desired digital representations of the standards, which will be designated reference waveforms, and which comprise the predetermined possible types of waveforms which can be classified by the particular embodiment. This is done by having stored such digital reference waveforms in the Storage Section 60 of the computer 10 at the outset.

For this embodiment of the inventive concepts, a stored program within the computer 10 guides and controls the initiation of the classification operation. Having stored the detected waveform, a control signal is issued on control line 17 to activate the Digital Waveform Classifier 18, which, having been activated, so advises the computer by issuing a signal on control path 19 to the Input Section 30*a* of the computer. Having thus initiated the Digital Waveform Classifier 18, the computer 10 supplies one of the reference waveforms via information path 20. This reference waveform is stored in a holding register, to be described below. Following this operation, a portion of the detected waveform is transmitted via information path 21 to the holding registers in the Digital Waveform Classifier 18. The classification operation is then initiated, with the reference waveform being compared to the entire unknown detected waveform, and a correlation value calculated as a result of such comparison. The best correlation value of the various comparison passes is transmitted to the computer 10 via information path 22, and stored in the Storage Section 60 of the computer. Having completed the comparison of the first reference waveform to the data signals which represent the detected waveform, and having calculated the correlation value, a new reference waveform is supplied from the computer via path 20 and the operation repeated. This continues until all of the stored reference waveforms have been compared to the detected waveform and a correlation value calculated for each such comparison. It then remains only to make the identification or classification of the detected waveform by examining the correlation values. For this embodiment, this is accomplished by selecting the lowest valued correlation value. When a degree of operator participation is desired, it is possible to select more than one possible identification by selecting the two, three, or more sequentially lowest valued correlation values, and providing an output in a manner which will allow the system operator to make the final determination of the exact identification. Such a technique is employed in this embodiment, and the three lowest correlation values are utilized to select their corresponding reference waveforms for transmission via data path 23 to the utilization device 24. In this embodiment the utilization device is a display console of a type well known in the art which visually displays the three selected waveforms. This allows the operator to view the selections for reasonability in light of his experience, and to act accordingly. With the foregoing summary description of one embodiment of this inventive concept in mind, the details of the system will be described and disclosed below.

UNIT COMPUTER CHARACTERISTICS

This embodiment of the invention utilizes a large-scale general-purpose high-speed digital computer which will be termed a "Unit computer" in this discussion. This computer emphasizes rapid communication with external devices and implies a large arbitrarily accessible internal storage. The Unit computer is of the stored program type. That is, once the program of instructions is written and coded in a form acceptable to the computer, it is entered into the storage section of the computer via one of the pieces of the peripheral equipment. From this point on, the computer, upon proper initiation, will execute the series of instructions which make up the program, and thereby perform its intended function. Single-address instructions are employed and have an average execution time of 13 microseconds. These instruction words are the same number of bits (binary digits) as are utilized in the memory registers of the computer. Each memory section register is selectively addressable either as a single 30-bit word, or as two independent 15-bit words.

The Unit computer utilizes the parallel binary mode in the performance of arithmetic and logical operations. A one's complement subtractive arithmetic system of modulus $2^{30}-1$ is used.

Communication between the Unit computer and its associated external equipment is normally handled by a block transfer of data, with timing under control of the external device. Such transfers of data have independent access to storage to thereby allow asynchronous operation with the main computer program. A communication path is established by a sequence of request and response signals between the selected external equipment and the computer. Such signals may originate in either the computer or the external device. The main computer program is interrupted by external request signals and a communication channel is established. Once the link has been created the computer returns to the main program sequence and the block transfer of input or output data proceeds without program reference until completed. The Unit computer employs 14 input and 14 output channels each comprised of 30 parallel lines. Two input and two output channels are reserved for communication with other computers. Output channels can carry external function words as well as data words, and can thereby specify the function desired of the selected external equipment.

Figure 2:
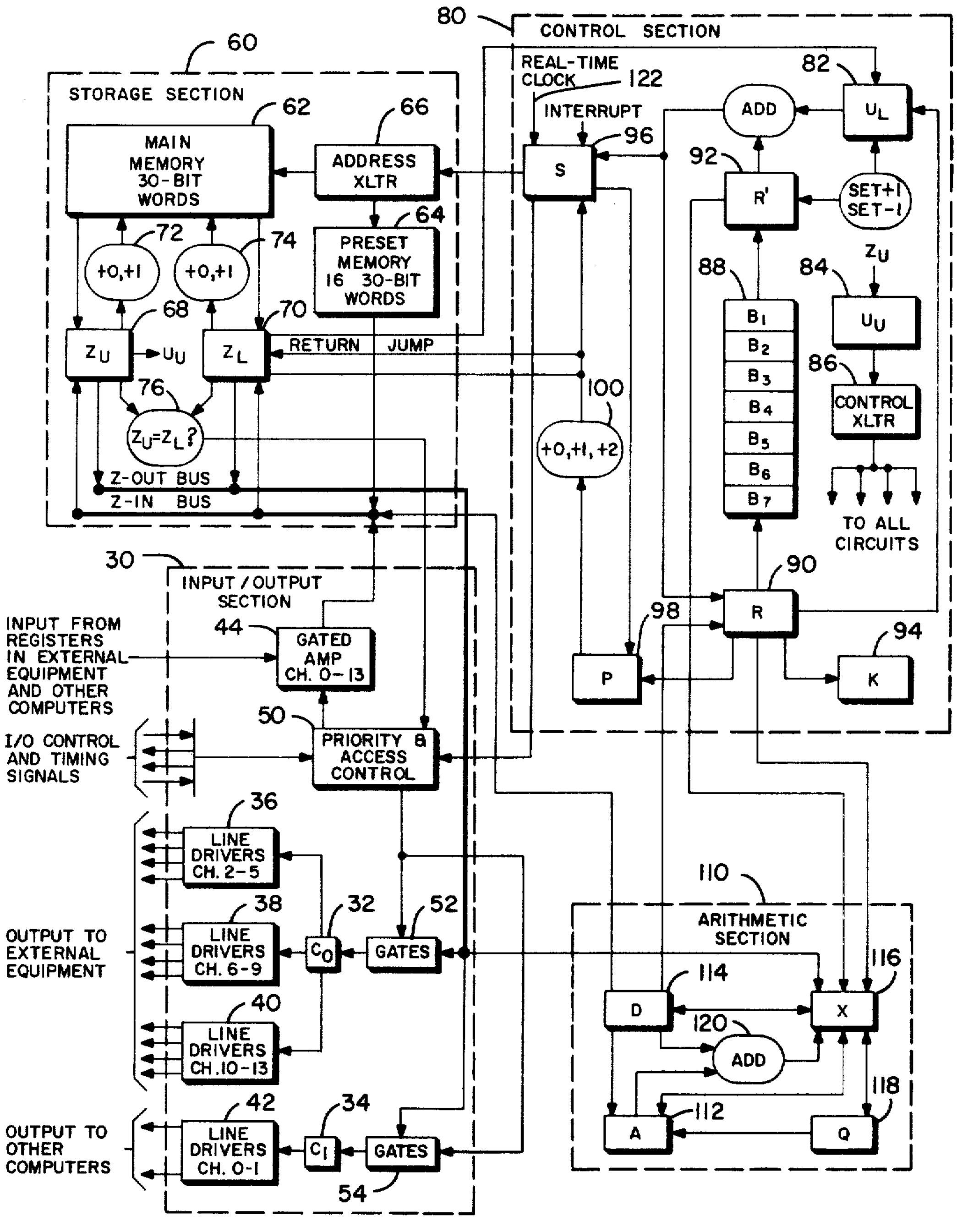
FIG. 2 is a simplified functional block diagram of the computer showing the relationship of the major functional sections.

A simplified block diagram of a Unit computer appears in FIG. 2, and for explanatory purposes may be described in four main sections: Input/Output, Storage, Control, and Arithmetic. FIG. 1 shows in block form 10 the operational relationship of parts of the computer and will be used in system diagrams. The reference numbering corresponds to that used for the respective sections in FIG. 2. Abbreviations on the diagram are explained as the various sections are discussed.

INPUT/OUTPUT SECTION

The Input/Output section includes those data paths and control circuits used by the computer for communicating with external equipment, and is shown enclosed in block 30 in FIG. 2. The detailed operation of the Input/Output section of the Unit computer is described in copending application entitled Computer Input-Output System, Ser. No. 156,375, filed Dec. 1, 1961 now U.S. Patent 3,251,040, issued May 10, 1966, and is assigned to the assignee of this invention. In FIG. 1 the block symbol of the computer shows the functional operation separately such that the Input section is represented by block 30*a* and the Output section is represented by block 30*b*. The main parts of the Input/Output section are: (1) Two output registers consisting of the C0-register 32, and the C1-registers 34 with their associated line drivers 36–40, and 42 respectively; (2) 14 sets of gated input amplifiers 44 and (3) priority and access control circuits 50.

The C0-register 32 is used for transmission to all external devices except other computers. As illustrated in FIG. 2, the C0-register 32 receives inputs directly from Storage section via gates 52 which are controlled by the priority and access circuits 50. Three sets of line drivers 36, 38 and 40 branch from the output C0-register 32; each set being utilized to drive four output channels with gated registers located in the external device.

The C1-register 34 handles the transmission of data between computers over two special output channels. Operation of this register is similar to that of the C0-register 32 in that data words enter the C1-register from Storage via gates 54 which are controlled by the priority and access circuitry 50 and are transmitted over the active channel by a set of 30 line drivers.

The output channels of this embodiment are numbered from 0 to 13, and if two or more transmissions are simultaneously requested, the channel with the highest number is granted priority with the others following in order. A set of 30 gated amplifiers 44 is provided for each of the 14 input channels. These gates are controlled by the priority and access circuits 50, with the channel having the highest number being given priority for the instance when two or more channels are simultaneously requested. As in the case of output channels, channels 0 and 1 are used for inter-computer communication, and therefore receive the lowest priority. It should be noted that this method of treating input data eliminates the need for input buffer registers and gives the external equipment direct access to the computer's internal memory.

Some functions of the priority and access circuits 50, such as gating input and output transmissions and assigning priorities to the channels, have previously been described. Additionally, these circuits operate to accept and transmit the control and timing signals which must be exchanged between computer and equipment with which it communicates. A further function includes a means of testing the various channels to determine whether they are currently being utilized to thereby prevent the computer from attempting to communicate over a channel already in use.

The main memory addresses referenced during the particular input or output transfer are determined by a special I/O control word. One such word is assigned to each channel. It is sufficient for this summary to note that a signal generated by the I/O control word is used by the priority and access circuits 50 to de-activate the channel after the proper number of words has been transferred.

STORAGE SECTION

The Storage section of the Unit computer is enclosed in dashed line 60 in FIG. 2, and consists of the main memory 62, wired auxiliary memory 64, and the associated address transfer circuits 66, and control circuits. The main memory 62 is constructed of a modular array of ferrite cores for this embodiment. It is coincident-current-driven, and is addressed via the address translator 66. The contents of the referenced address is read into the 30-bit Z-register which is comprised of two 15-bit sections termed Z upper ($Z_U$) 68, and Z lower ($Z_L$) 70 to provide for the optional use of 15-bit half words as described above. The main memory operates in the destructive read-out mode, with the time required for the read-restore cycle being approximately 8 microseconds. During the restore portion of the cycle, the contents of the 15-bit $Z_U$-register 68, or the 15-bit $Z_L$-register 70 may be increased by one as indicated by the +0, +1 modifier boxes 72, 74. This facility is utilized in conjunction with the Input/Output section 30 for automatically increasing the I/O control words, with the result that addresses referenced during a block transfer of data are automatically advanced. In conjunction with these modifier boxes 72, 74, the comparator, $Z_U = Z_L$—labeled 76, is used to detect coindence between the two halves of the I/O control word. When such coincidence occurs, a signal is generated to terminate the I/O transfer.

CONTROL SECTION

The control section of the Unit computer illustrated in FIG. 2 is enclosed by dashed line 80 and consists of those registers and circuits necessary to procure, modify, and execute instructions of the stored program. Control is synchronized by means of a clock (not shown) which operates to produce pulses at a predetermined frequency. Each instruction word to be executed is transmitted to the program-control register, designated the U-register, which is divided into two 15-bit registers, the $U_L$-register 82 and the $U_U$-register 84. The function code and the various execution modifiers are translated by the Control Translator 86 from the appropriate section of this register. The $U_L$-register has addition properties, modulus $2^{15}-1$, and is utilized when address modification is required before execution of the instruction by the contents of one of the appropriate B-registers 88.

The 15-bit R-register 90 and the 15-bit R′-register 92 operate as communication registers for the B-registers 88 such that all internal transmission to or from the B-registers pass through them. The 6-bit K-register 94 operates as a shift counter for all arithmetic operations that involve shifts. The 15-bit 5-register 96 holds the storage address during a memory reference and is utilized in conjunction with the Storage section 60 to gain access to the main memory 62. Instruction words are obtained from the Storage section of the computer under control of the storage address register 96 and are loaded into the instruction register where they are retained during the execution of the instruction. As was stated above, the Unit computer is concerned and operates as a stored program device, hence, once the program is written and stored in the computer in the appropriate form in the Storage section 60, it is free to operate automatically. Upon proper initiation, the Unit computer will execute the series of instructions making up the program. Normally, the instructions of the program are stored in the main memory 62 of the Unit computer in a sequential manner, such that the computer will first execute the instruction whose address has initially been set in the program address counter, or P-register 98. It then proceeds in an instruction-by-instruction manner to the highest address. The modifier box 100 is included to indicate that as each instruction is executed, the address of the current instruction is incremented by +0 in a case of a repeat, by +1 in cases where the execution of instructions has to take place in sequential order, and by +2 in a case where a SKIP condition is satisfied.

ARITHMETIC SECTION

The Arithmetic section of the Unit computer is shown enclosed by dashed line 110 and is that part of the computer which performs the numeric and logical calculation. Though greatly simplified, FIG. 2 shows the important components of the Arithmetic sections which are the A-register 112, the D-register 114, the X-register 116, the Q-register 118, and the ADD circuitry 120. The 30-bit A-register 112 may be thought of for programming purposes as a conventional accumulator register, but because of the logic employed, the A-register is actually only the primary rank of the accumulator. In addition to the A-register, the accumulator utilizes the D-register 114 as a second rank. This yields a configuration which is different from former and the so-called "usual" arrangements, but permits the use of a more reliable logical building-block circuit. To illustrate the interrelationship of these registers consider the ADD operation, wherein the augend is placed in the A-register 112 and the addend is placed initially in the D-register 114. As the addition is performed by the ADD tree 120 the sum is formed in parallel and placed in the X-register 116, and at completion is transmitted back to the A-register. The utilization of the 30-bit Q-register 118 is primarily during the Multiply and Divide operations to yield a double-length register in conjunction with the A-register 112. The Q-register is also used extensively in the many logical instructions available in the Unit computer.

REAL-TIME CLOCK

In addition to the four main sections of the computer just described, the Unit computer has a real-time clock 122 which is incremented automatically by the computer upon signal of a 1/1024 c.p.s. crystal oscillator to be maintained accurate to the nearest $2^{-10}$ second, and is utilized to maintain an accurate record of time. This clock may be used to log the receipt times of a periodic real-time input. Each message and its receipt time may be recorded together. Another use of the clock is to initiate periodic programmed operations without requiring more than occasional attention of the main program. Since the clock re-cycles only once in approximately a week, it is suitable for use where the computer is used on an around-the-clock basis. This provides a function which is readily adaptable to the use in process control and many other real-time operational functions.

INSTRUCTION WORD FORMAT

Figure 3:
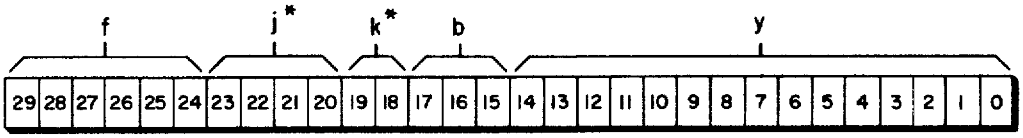
FIG. 3 is an illustration of the instruction word format utilized in conjunction with input/output instructions.
Figure 4:
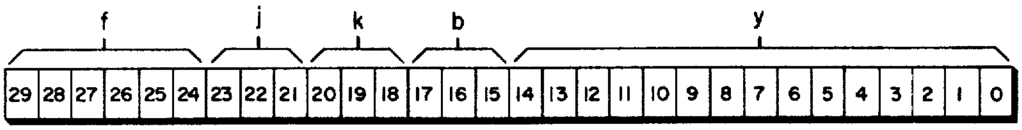
FIG. 4 is an illustration of the instruction word format utilized with all other instructions for the computer.

In FIG. 3 is shown a format of the instruction word employed in association with the Input/Output section of the Unit computer. In FIG. 4 is shown the format of the instruction word used with all other instructions for the Unit computer. The term "instruction" as used herein signifies a predetermined timed sequence of events to be performed within the computer. Each instruction is represented initially by what is commonly termed an "instruction word," which is represented by a predetermined set of electrical signals included to represent either variable or invariable instructions, and appears as a configuration in the binary number system. An instruction word is 30-bits in length and is made to be able to be stored in one memory section register. An instruction word is the primary indication to the computer of a sequence of events which it is to perform. When the instruction word is translated by the control translator 86 the electronic and electrical hardware in the computer causes a succession of signals termed "commands" or "command enables" to be developed to cause the execution of sequences which will result in the performance of the functions designated by the instruction. The terms "program" or "routine" refer to a predetermined set of instructions arranged in a particular manner to affect the solution of a desired problem or to execute a given action.

As can be seen from FIG. 4, the instruction word is comprised of five sections termed "designators," which are the *f, j, k, b* and *y* designators. It will be noted that the same designators appear in FIG. 3 with the variation being that the *j* designator shown in FIG. 4 appears as the *j** designator in FIG. 3 and the *k* designator in FIG. 4 appears as the *k** designator in FIG. 3. The reason for this variation will be discussed later. The *f* designator is normally 6-bits in length and indicates the particular instruction to be executed, such as ADD, SUBTRACT, etc., and is commonly termed the "operation" code, which is abbreviated to "OP" code. The *j, k, b,* and *y* designators allow modifications of the basic computer sequence specified by the *f* designator. For all instructions except the Input/Output instructions, the length of the *j* designator is 3 bits, and is used in the majority of instructions for jump and skip determination, for instruction operand modification selection, and for repeat status interpretation. When the Unit computer is executing an Input/Output type instruction, the configuration illustrated in FIG. 3 prevails and the *j* designator is denoted by *j** and is increased in size to 4 bits to thereby allow the designation of the 0–13 Input/Output channels. The *k* (or K* in the case of I/O instructions) designator controls the interpretation of the operand. The *b* designator appears in bit positions 17, 16 and 15 of the instruction word and specifies which one of the B-registers 88, which are labeled B1 through B7, will be used to modify the operand designator *y*. The operand designator termed the *y* designator is utilized to indicate the address in the memory section 62 where the operand is stored, or may itself be a 15-bit operand, as designated by the particular *k* designator.

Associating FIGS. 3 and 4 to FIG. 2, it can be seen that the upper half of the instruction will be stored in the $U_U$-register 84, and will thereby contain the *f, j,* or *j**, *k* or *k**, and *b* designators. The lower half of the instruction will be stored in the $U_L$-register 82, which will thereby contain the Operand Designator *y*. The control translator 86 is connected to the output of the $U_U$-register 84, and is utilized to interpret the function code to determine the computational operation designated by the *f* designator, with the various execution modifiers to produce the proper command enable signals to execute the total instruction as specified. If address modification is required prior to the execution of the instruction, the contents of a predetermined one of the B-registers 88, as specified by the *b* designator, is added to the contents of the lower order 15-bits of the instruction word, which is stored in the $U_L$-register 82, before execution. Not shown in the block diagram of FIG. 2 in the control section 80 are the circuits required for the timing and execution of the instructions.

INSTRUCTION SEQUENCES

The executions of the instruction in the Unit computer are carried on in response to clocked major "sequences." The timing is such that the utilization of these sequences may in effect cause instructions to slightly overlap thereby optimizing the speed of calculation of the Unit computer. The major sequences are termed A, B, C, and D, each of which performs a logical portion of an instruction. The A sequence controls the timing necessary to obtain an instruction from the memory which is to be executed, and places it in the 30-bit U-register (see FIG. 2). Following the completion of this sequence, the B sequence timing will select the operand, as controlled by the *k* designator, and place it in the D-register 114 (assuming an operand is required). The arithmetic computations are initiated under the control of the C sequence. In the event that the instruction to be executed is of the "store" class, the D sequence will be initiated thereby controlling the storage of the resulting operand in the main memory.

The major sequences, A, B, C, and D are performed successively to execute an instruction. While the execution of every instruction is accomplished by means of A, B, and C, many instructions do not utilize the D sequence. As was mentioned above, only those instructions which store an operand use the D sequence.

In addition to the major sequences, there are minor sequences which generally perform specific and more simple operations. All subsequences are initiated by a major sequence. For example, during the B sequence the operand referenced for arithmetic operation is read to the D-register. This transmission of data is accomplished by initiation of the "read as modified by *k*" subsequence.

In general it can be said that the major sequences accomplish the following:

(1) A sequence—read the next instruction as designated by the P-register from memory, and modify $U_L$ as directed by the index modifier *b* (*xx xxb xxxxx*).

(2) B sequence—read a specified operand as controlled by the *k* designator to the D-register (*xx xkx xxxxx*).

(3) C sequence—accomplish the arithmetic computation and sense for the *j* designator conditions (*xx jxx xxxxx*).

(4) D sequence—store operand (if applicable) as controlled by the *k* designator, providing the OP code portion designates a store instruction.

With respect to the overlapping capability available in the execution of instruction, it can readily be seen that once an instruction has proceeded to the point that the operand is being stored by the D sequence that the next instruction can be partially selected via the A sequence. It should be noted further that optimum usage of time exists in that the D sequence does not occur in the event that an operand is not referenced to be stored by the particular instructions.

REPERTOIRE OF INSTRUCTIONS

This portion of the specification presents the instruction repertoire for the Unit computer. Details presented herein are limited to the needs of the programmer and list only symbols, registers, terms, and instruction characteristics pertinent to programming the computer.

As mentioned previously, the Unit computer is a self-modifying, single-address computer. Although this means that one reference or address is provided for the execution of an instruction, this reference can be modified automatically during a programmed sequence. The references are modified by using the B (index) registers 88 one through seven, which contain any previously stored constants. To modify the address, the content of a selected B-register is added to the Operand Designator *y*.

A programmed address is coded using octal notation with each octal digit denoting three binary digits. The instructions are read sequentially from Magnetic Core Storage 62 except after Jump or Skip instructions.

FIGS. 5*a* and 5*b* together are a listing of all of the instructions available in the Unit computer, and provide the discrete steps which must be used in combination in the solution of a specified problem. The OP Code column gives the numerical reference that must be present in bits 29–24 of the instruction word to perform the desired computational function. The bold face letters in the Mnemonic Instruction column are the symbolic representation of the respective instructions which are utilized in conjunction with automated-programming routines to specify the computer operation to be performed. This system is utilized as a memory aid in the preparation of computer programs, rather than having to recall the numerical reference designation of each instruction utilized by the computer. The Instruction Function column provides in a short-hand summary form the function that each instruction is to perform. It should be noted that A, Q, and B refer to registers in the Unit computer, as they are explained above, and that (A) is read as the "contents of A," thereby designating the numerical value stored in the A-register.

SYMBOL CONVENTIONS

The following symbols are used throughout the descriptive material on instructions:

$\alpha=\alpha$ register (A, Q, $B^n$), a memory location Y, or a constant.
$(\alpha)$=content of $\alpha$.
$(\alpha)_i$=initial content of $\alpha$.
$(\alpha)_f$=final content of $\alpha$.
$\alpha_n$=the *n*th bit of $\alpha$.
$(\alpha)_n$=the *n*th bit of the content of $\alpha$.
*f*=Function Code Designator ($i_{29}, \ldots, i_{24}$).
*j*=Branch Condition Designator ($i_{23}, \ldots, i_{21}$).
*j**=Input/Output Channel Designator ($i_{23}, \ldots, i_{20}$).
*k*=Operand Interpretation Designator ($i_{20}, \ldots, i_{18}$).
*k**=Operand Interpretation Designator ($i_{19}, \ldots, i_{18}$).
*b*=Index Designator ($i_{17}, i_{16}, i_{15}$).
*y*=Operand Designator ($i_{14}, \ldots, i_0$).

*i* is the *n*th bit position in an instruction

Y=The Operand (regardless of source)
$Y=y+(B^b)$
(1) The operand or address of the operand for the Read portion of an instruction, or
(2) The destination address for the Store portion of an instruction.
(Y)=Content of memory address Y
L(Y)(Q)=Bit-by-bit multiplication, logical multiply of $Y_n$, and $(Q)_n$.
NI=Next Instruction.
A=A-register or accumulator (30-bit arithmetic register)
B=Seven B-register (15 bits each). B-registers are address-modifying registers generally used for indexing loops in a program; in addition B7 serves as a repeat counter. (The address modification does not alter the instructions as stored in memory). A *b* or *j* designator specifies the B-register used.
Q=Q-register (30-bit arithmetic register).
U=U-register (30 bits). The U-register holds the instruction word during execution of an operation. If address modification is required before execution, the appropriate B-register content is added to the lower-order 15 bits of the U-register before execution.
P=P-register (15 bits). The P-register is the Program Address Register. This register holds the address of the current instruction throughout the program except for Jump instructions where the P-register is cleared and the new program address is entered.
C=The 14 Decimal input/output channels (30 lines each). Channels consist of transmission lines, therefore they cannot be considered registers. The designator *j** specifies (in octal) the channel used.

FIGS. 4*a* and 4*b* illustrate bit configuration of instruction designators in two forms:

FUNCTION CODE DESIGNATOR—*f*

The *f* designator (6 bits) appears in bit-positions 29 through 24 of the U-register, or an instruction, designating the function to be performed by that instruction. All values of *f* other than 00 and 77 are defined in the instruction list. The two codes 00 and 77 are *fault conditions* which, if executed, will cause a fault interrupt. This results in a jump to address 00014, the Fault Entrance Register or address 00014 of wired memory depending on the Automatic Recover Switch setting.

BRANCH CONDITION DESIGNATOR—*j*

The *j* designator (3 bits) appears in bit-positions 23, 22, and 21 of the U-register, or an instruction; it is used in a majority of the instructions (see FIG. 4*b*). There are three primary categories of use: (1) for Jump and Skip determination, (2) for B-register specification, and (3) for repeat status interpretation. Appropriate interpretations of the *j* designator are listed either below or under the descriptions of the individual instructions.

For those instructions in which the *j* designator has no special interpretation, it specifies the condition under which the next sequential instruction in the program will be skipped. This provides for branching from a sequence without executing a Jump instruction, as would normally occur if a Skip condition were not satisfied.

Skip of the next sequential instruction is determined by the following rules in all instructions except 04, 12, 13, 16, 17, 26, 27, 60 through 67, and 70 through 76.

$j=0$: Do not skip the next instruction.
$j=1$: Skip the next instruction.
$j=2$: Skip the next instruction if (Q) is positive.
$j=3$: Skip the next instruction if (Q) is negative.
$j=4$: Skip the next instruction if (A) is zero (positive zero).
$j=5$: Skip the next instruction if (A) is nonzero.
$j=6$: Skip the next instruction if (A) is positive.
$j=7$: Skip the next instruction if (A) is negative.

When the branch (Skip or Jump) condition involves the sign of the quantity in A or Q, the evaluation examines the sign bit of these quantities; hence, a positive zero (all zeros) is considered a positive quantity, and a negative zero (all ones) is considered a negative quantity.

INPUT/OUTPUT CHANNEL DESIGNATOR—*j**

The *j designator (4 bits) appears in bit-positions 23, 22, 21 and 20** of the U-register, or an input-output instruction, specifying the C-channel for the instruction (see FIG. 4*a*). Bit 23 assumes a value of eight, bit 22 a value of four, bit 21 a value of two, and bit 20 a value of one; thus the *j designator provides accessibility to the 14** (decimal) Input/Output channels numbered $0–15_8$.

Instructions 13, 17, 62, 63, 66, 67, 73, 74, 75 and 76 use the *j** designator configuration.

OPERAND INTERPRETATION DESIGNATOR—*k* or *k**

The *k* designator (3 bits) or *k designator (2 bits) appears in bit-positions 20, 19 and 18** of the U-register, or an instruction; a *k designator appears only in bit-positions 19 and 18, since bit 20** is a portion of the *j** designator (see FIG. 4*a*). Instructions 13, 17, 62, and 73 through 76 use the *k** designator configuration since they perform input/output activities and require a *j** designator for channel specification.

The *k* and *k** designators control operand interpretation. Those instructions which read an operand but do not replace it after the arithmetic is performed are designated Read instructions. Those instructions which do not read an operand but store one are designated Store instructions. Instructions which both read and store operands are classified as Replace instructions.

The various values of *k* or *k** affect the operand in the following list except where otherwise noted under individual instruction descriptions.

(1) Read instructions (01 through 13, 20 through 23, 26, 27, 30, 31, 40 through 43, 50 through 53, and 60 through 76):

$k$ or $k^*=0$: $\underline{Y}_U=0$'s; $\underline{Y}_L=Y$
$k$ or $k^*=1$: $\underline{Y}_U=0$'s; $\underline{Y}_L=(Y)_L$
$k$ or $k^*=2$: $\underline{Y}_U=0$'s; $\underline{Y}_L=(Y)_U$
$k$ or $k^*=3$: $\underline{Y}=Y$
$k=5$: $\underline{Y}_U=$same bits as $Y_{14}$; $\underline{Y}_L=Y$
$k=5$: $\underline{Y}_U=$same bits as $Y_{14}$; $\underline{Y}_L=(Y)_L$
$k=6$: $\underline{Y}_U=$same as $Y_{29}$; $\underline{Y}_L=(Y)_U$
$k=7$: $\underline{Y}=(A)$
For instructions 23, 52, and 53, $k=7$ is not used.
For instruction 13, only $k^*=3$ is permitted.
For instructions 73 through 76, $k^*=2$ is not used.

(2) Store instructions (14 through 16, 17, 32, 33, and 47):

$k=0$: Store (A or $B^j$) in Q. [Addr. 14 000 00000 complements (Q)]
$k=1$: Store ($A_L$, $Q_L$, or $B^j$) in $Y_L$, leaving $(Y)_U$ undisturbed.
$k=2$: Store ()$A_L$, $Q_L$ or $B^j$) in $Y_U$, leaving $(Y)_L$ undisturbed.
$k$ or $k^*=3$: Store (A, Q, $C^j$ or $B^j$) in Y.
$k=4$: Store (Q or $B^j$) in A. [Addr. 15 040 00000 complements (A)]
$k=5$: Store complements of ($A_L$, $Q_L$, or $B^j$) in $Y_L$, leaving $(Y)_U$ undisturbed.
$k=6$: Store complement of ($A_L$, $Q_L$, $B^j$) in $Y_U$, leaving $(Y)_L$ undisturbed.
$k=7$: Store complement of (A, Q, or $B^j$) in Y. (Storing the complement of $B^j$ is the same complement as for a 30-bit register).
For instruction 17, only $k^*=3$ is permitted.

(3) Replace instructions (24, 25, 34 through 37, 44 through 46, 54 through 57):

$k=0$: Not used.
$k=1$: Read portion—$\underline{Y}_U=0$'s; $\underline{Y}_L=(Y)_L$. Store portion—stores ($A_L$, $Q_L$, or $B^j$) in $Y_L$, leaving $(Y)_U$ undisturbed.
$k=2$: Read portion—$\underline{Y}_U=0$'s; $\underline{Y}=(Y)_U$. Store portion—stores ($A_L$, $Q_L$, or $B^j$) in $Y_U$, leaving $(Y)_U$ undisturbed.
$k=3$: Read portion—$\underline{Y}=Y$. Store portion—stores (A, Q or $B^j$) in Y.
$k=4$: Not used.
$k=5$: Read portion—$\underline{Y}_U=$same bits at $Y_{14}$; $Y_L=(Y)_L$. Store portion—stores ($A_L$, $Q_L$, or $B^j$) in $Y_L$, leaving $(Y)_U$ undisturbed.
$k=6$: Read portion—$\underline{Y}_U=$same bits as $Y_{29}$; $Y_L=Y_U$. Store portion—stores ($A_L$ $Q_L$, or $B^j$) in $Y_L$, leaving $(Y)_U$ undisturbed.
$k=7$: Not used.

The Repeat instruction requires special interpretation when followed by a Replace instruction. See details under Instruction No. 70, Repeat.

INDEX DESIGNATOR—*b*

The *b* designator (3 bits) appears in bit-positions 17, 16, and 15 of the U-register, or an instruction (see FIG. 4), specifying which of the B-registers, if any, will be used to modify the Operand Designator, *y*, to form $$Y=y+(B^b).$$

This operation employs an additive accumulator; hence, a quantity consisting of all zeros cannot result unless the bits of both the Operand Designator, *y*, and $(B_b)$ are all zeros.

Effect of the various values of $b$, the Index Designator, is summarized:

$b=0$: Do not modify $y$.
$b=1$: Add (B1) to $y$ (modulo $2^{15}-1$).
$b=2$: Add (B2) to $y$ (modulo $2^{15}-1$).
$b=3$: Add (B3) to $y$ (modulo $2^{15}-1$).
$b=4$: Add (B4) to $y$ (modulo $2^{15}-1$).
$b=5$: Add (B5) to $y$ (modulo $2^{15}-1$).
$b=6$: Add (B6) to $y$ (modulo $2^{15}-1$).
$b=7$: Add (B7) to $y$ (modulo $2^{15}-1$).

OPERAND DESIGNATOR—$y$

The $y$ designator (15 bits) appears in bit-positions 14 through 0 of an instruction (see FIG. 4). The operand ($\underline{Y}$) or address of the operand (Y) is relative to $y$ since $\underline{Y}=y+(B^b)$.

LOGICAL BUILDING-BLOCK CHARACTERISTICS

To implement the overall logic of the Unit computer described in block-diagram form in FIG. 2 and the waveform classifier to be described below, it is felt that a description of the basic logical building-block circuit diagram for implementing the OR-INVERTER or NOR logic. This is also referred by by logicians as the Pierce Function. Since other circuits can be devised for performing this type of logic, the circuit illustrated schematically is only typical, and limitation thereto is not intended. The Unit compueter and the waveform classifier utilize the binary number system for their internal calculation and represent a logical "1" signal by a potential of approximately—3 volts while a logical "0" is represented by a potential of approximately 0 volts. When a zero potental (logical "0") is present on all of the input terminals 130, 132, and 134 the junction 136 in the circuit diagram is maintained slightly positive by means of the voltage source $+V_1$ and the voltage divider comprised of resistors 138, 140, and 142. Since the base 144 of the transistor 146 is positive with respect to its emitter electrode 148 (maintained at ground potential), the emitter-to-base junction 152 is biased in the reverse direction, and, therefore, the impedance between its emitter 148 and collector 150 is relatively high. The base-to-collector junction 154 is always reverse biased by means of the voltage source $-V_1$, thereby causing the current to flow across the collector junction 154 only when the bias is reversed on the base-to-emitter junction 152. For purposes of this explanation, leakage currents are ignored. The output line 156 is clamped at approximately $-3$ volts ($-V_2$), representing a logical "1," by the clamping diode 158 connected to the $-V_2$ supply. Resistor 160 connected between the collector 150 and $-V_1$ supply is provided as a load.

In the instance when a negative potential (logical "1") signal is applied to any one of the input terminals 130, 132, or 134, the base 144 of the transistor 146 becomes negative with respect to its emitter 148. This presents the proper bias condition such that a relatively large current can flow between the emitter 148 and the collector 150, such that the output voltage rises to almost ground, and thereby represents a logical "0." While only three input terminals are illustrated in the schematic diagram of FIG. 3, it should be understood that a greater or fewer number may be employed. The output 156 may be utilized in a manner such that it will drive several other similar NOR circuits.

FIG. 7 illustrates the block diagram symbol 162 that is utilized to represent the basic building-block circuit illustrated in FIG. 3. This block 162 is utilized to represent the NOR circuit, which may have a plurality of input terminals, such as A and B, with a single output terminal, such as C. The truth-table of FIG. 8, with the Boolean equations that accompany it, indicate that if a logical "1" signal is applied to one or more of the input terminals, the output appearing at the output terminal is a logical "0." Only for the situation where all of the inputs are logical "0's" will a logical "1" appear at the output terminal.

FIG. 9 indicates the manner in which two NOR circuits 164 and 166 of the type described above may be interconnected to obtain a bistable multivibrator or flip-flop. NOR circuit 166 is labeled 00V63, and NOR circuit 164 is labeled 01V63. In order to set inforamtion into the flip-flop a logical "1" is placed on the Set line 168, and to clear the flip-flop it is necessary to place a logical "1" on the Clear input line 170. Referring to the truth-table of FIG. 8, it can be seen that a "1" input on the Clear line 170 will result in a "0" output on output line 172. This output is also applied as an input on wire 178 to NOR circuit 164. Since a Set and Clear pulse may not appear simultaneously, the input on line 168 will be held to a logical "0" so that when it is coupled with the "0" output of NOR circuit 166 the output from NOR circuit 164 will be a logical "1" signal on wire 174. To set the flip-flop it is necessary to apply a logical "1" signal on wire 168 while applying a "0" signal on line 170, which will result in a "0" on output line 174. This output is applied as an input on wire 176 to NOR circuit 166, thereby causing a "1" on output line 172.

The flip-flop illustrated in FIG. 9 may be simplified as illustrated in FIG. 10 into a single block to be utilized on the logic diagrams.

The number-letter-number notation illustrated within the NOR circuit blocks indicate the point of reference of the particular circuit with which it is associated. The capital letter specifies an overall category of logic or a particular register in the Unit computer and the waveform classifier, for example, Z in FIG. 7 could refer to the Z-register. The $ab$ refers to two numerical characters located at the left of the capital letter. These characters describe, in most cases, the function of the inverter circuit. If the circuit is part of a particular register the following combination is used:

00="0" or Clear side of a bit-register
01="1" or Set side of a bit-register
02, 04, 06, 08=slaves off "1" side of a bit-register
03, 05, 07, 09=slaves off "0" side of a bit-register The remaining values of the $ab$ are employed for gates and other logic circuits associated with the particular register designated by the capital letter.

The indicators $cd$ are also two numeric characters located to the right of the capital letter, and generally indicate the particular stage of the register in which they are employed. For example, an inverter 03Z05 would be connected to the zero side of the fifth stage of the Z-register.

Registers within the Unit computer consist of cross-coupled NOR circuits to form a flip-flop as illustrated in FIG. 9. This provides both the normal and complement values of each bit. The registers in the memory section referred to above, consist of an array of ferrite cores, 30 bits in length.

FLOW DIAGRAM SYMBOL DESCRIPTION

As was mentioned above, the Unit computer is a stored program device. A program may be defined generally as the plans for the solution of a specified problem. A complete program includes plans for the transcription of data, coding of instructions for the computer, and plans for the utilization of the results by the system. The listing of coded instructions utilized to solve the problem as specified by the programmed approach is called a "program" or a "routine." In other words, it can be said that programming consists of the planning and design for the solution of a problem which includes ultimately the coding of individual computer instructions in a predetermined order such that the solution of the problem as planned can be implemented. The overall planning may include numerical analysis, systems analysis, specification of various output formats, the relationship of the computer to the connected external equipment, and many other functions necessary for the integration of the individual computer into the system.

In programming, as in other forms of designs, it is desirable to have a distinct symbology whereby the steps in the solution of a problem may be shown pictorially. The flow diagram symbols utilized in the specification are illustrated in FIGS. 11*a* through 11*f*, and will be described individually below.

The flow diagram symbol illustrated in FIG. 11*a* is utilized to describe one step in the solution of the problem Box 200 normally will contain a brief statement of the function to be accomplished. Each of these function operation boxes will normally contain one input 202 and one output 204. The amount of detail of the descriptive matter contained in the function operation box 200 will depend on the level of the solution of the problem. By this it is meant that the block may contain the statement of a single computer instruction at the lowest level, or it may state a general proposition at a higher system level. Examples of both of these levels will be described in later sections.

The flow diagram symbol illustrated in FIG. 11*b* labeled 206 is utilized to designate a subroutine in the process of solution of the problem. A subroutine normally exists when the situation arises where the same sequence of instruction may be utilized several times at various points within a routine. A situation such as this makes it an inefficient use of the computer memory to re-list the entire set of instructions each time it occurs. The solution to the problem is to list the set of instructions once and provide various points of entrance to this subroutine from the points in the routine where it is necessary. The subroutine flow diagram symbol will normally have one illustrated line of input 208 and one illustrated line of output 210. This indicates a common entrance and common exit for all portions of the routine that utilize the subroutine.

The flow diagram symbol illustrated in FIG. 11*c* is utilized to indicate when a decision must be made. The decision symbol 212 will normally have one line of input 214, but will have two lines of output 216 and 218, to represent the alternatives in the decision. Within the symbol will be stated the question to be answered, this question normally being of a nature such that it can receive a yes or no answer. These alternative paths correspond to the two possible output lines 216 or 218. The statement of the question to be answered can be of a type illustrating a single computer operation, or it may be a higher level system decision. Examples of these will be illustrated in later sections.

The flow diagram symbol illustrated in FIG. 11*d* is utilized to indicate the starting point of a particular sequence of instructions. The symbol is herein designated 220.

The flow diagram symbol illustrated in FIG. 11*e* is utilized to designate the end of a particular sequence of flow diagram operations, and is designated by label 222.

The flow diagram symbol illustrated in FIG. 11*f* consists of the method of illustrating the junction of several input lines 224 which consist of such inputs as 226, 228, and 230. A single resultant line 232 is utilized as an input to the various flow diagram symbols that were described above. This method alleviates the problem of having several input lines coming together at the symbol boundary. It should be noted that though three inputs are shown, this is not limitative but intended only to be illustrative. Any number of inputs that may be desired may be brought together at a common junction point such as 224.

As was stated above, this inventive concept is readily adaptable to a variety of waveform classification situations, but for this embodiment its operation will be described for the particular application of underwater object classification using Sonar. Sonar as such is well known, and the many concepts involved therewith do not form a part of this invention, but are merely used as the detection means which provides the input to the subject invention. At the outset it is desirable to place restraints on the scope of the system parameters, and to set them out with reasonable clarity so that the operation of the classification system may be understood. This embodiment of the invention complies with the following system parameters:

(1) The highest frequency component in the detected input waveforms will be limited to 400 cycles per second;
(2) Waveform samples are quantized into 32 levels (5 binary bits);
(3) The amount of the detected input waveform which will be sampled and analyzed will be limited to 1.25 seconds of Sonar return (approximately a 2000 yard range gate); and
(4) Identification of each detected input waveform must be completed in less than 8 seconds.

It will be noticed that other values for the foregoing will require appropriate adjustment of the system parameters, but will not alter the nature of the inventive concept.

FIG. 12*a* illustrates a characteristic detected waveform of the Sonar return for a submarine, and FIG. 12*b* illustrates a characteristic Sonar return for a whale. Consideration of these two examples indicates that there are periods of time during the detection of these waveforms which do not indicate any useful data with respect to identification of the return. Further, the amount of the return which can be utilized for identification varies in length of time from one type of object to the next. For instance the length of time of the Submarine waveform can be seen to be about 0.25 second, while the time of the Whale waveform can be seen to be about 0.35 second. For this reason a maximum period of time for any one of the objects to be identified must be provided, and for sake of simplicity the reference waveforms will uniformly be made to utilize this maximum period of time. As was stated above, the reference waveforms are the digitally represented data which are stored in the memory section of the computer to be used to identify the detected waveform.

FIG. 13 is an illustrative waveform which could be considered to be either one of the reference waveforms or a portion of a detected waveform. The waveform is sampled along the *x*-axis at a rate which allows the waveform to be reproduced. It is well known that in order to accurately reproduce a given waveform that the samples must be taken according to the following relationship:

Sample frequency$\geqslant$twice maximum frequency component

It will be recalled that for this embodiment the maximum frequency of a waveform component is limited to 400 cycles per second, hence the waveform must be sampled at a rate of at least 800 cycles per second. Referring to FIG. 1, it is the function of the analog-to-digital converter 15 to perform this sampling of the detected waveform.

Each sample of the waveform can be given a numerical value which characterizes the distance of the waveform from the *x*-axis at that sample point. These numerical values are termed quantum levels, and for FIG. 13 can be read from the vertical axis scale. One of the system parameters set out above was that the waveform samples would be quantized into 32 levels, which is capable of being expressed in 5 binary digits. This means that a minimum quantum level would be zero, or the situation when no waveform power is present, and the maximum quantum level would be 31, or 11111 in the binary representation.

The following table illustrates the Quantized values for each sample of the waveform of FIG. 13, in both the decimal and binary values.

| Sample | Quantized value | |
|---|---|---|
| | Binary | Decimal |
| 1 | 00110 | 6 |
| 2 | 01001 | 9 |
| 3 | 01100 | 12 |
| 4 | 01101 | 13 |
| 5 | 10000 | 16 |
| 6 | 10000 | 16 |
| 7 | 10001 | 17 |
| 8 | 10011 | 19 |
| 9 | 10011 | 19 |
| 10 | 10000 | 16 |
| 11 | 10011 | 19 |
| 12 | 10101 | 21 |
| 13 | 10101 | 21 |
| 14 | 10110 | 22 |
| 15 | 10101 | 21 |
| 16 | 10010 | 18 |
| 17 | 10001 | 17 |
| 18 | 10010 | 18 |
| 19 | 10100 | 20 |
| 20 | 10110 | 22 |
| 21 | 10110 | 22 |
| 22 | 10100 | 20 |
| 23 | 10000 | 16 |
| 24 | 01110 | 14 |
| 25 | 01110 | 14 |
| 26 | 01101 | 13 |
| 27 | 01101 | 13 |
| 28 | 01111 | 15 |
| 29 | 01110 | 14 |
| 30 | 01101 | 13 |
| 31 | 01110 | 14 |
| 32 | 01101 | 13 |
| 33 | 01001 | 9 |
| 34 | 01000 | 8 |
| 35 | 01000 | 8 |
| 36 | 00111 | 7 |

IDENTIFICATION METHOD

To facilitate an understanding of the discussion of the method of identification utilized in this invention, the following discussion will be based on specific examples. It is assumed that there are only three types of waveforms which will be classified or identified by the system. These types will be whales, small submarines, and large submarines. It is also assumed that there are three possible methods of identification, that is method A, method B, and method C. The concepts discussed can readily be extended to any number of types of waveforms, and methods of classification. Using method A, there is a certain probability for the correct identification of a whale given it is the detected underwater object; similarly, there are certain probabilities of correctly identifying small and large submarines when they are the detected objects. These probabilities are plotted in FIG. 14 for the three methods. Using these probabilities there are several criteria that can be used to select an identification method. In the following paragraphs three criteria are discussed, all of which lead to identification methods that have the same form and differ only in the value of certain parameters.

Average probability for correct identification can be used as a criterion. The goal in this system is to select the method that maximizes the average probability. From FIG. 14 it can be seen that method A has an average probability of correct identification of .67, method B has .58, and method C has .55. Therefore, method A is preferred over B and C. In this example, it is assumed that the three types of objects occur equally often. Since the criterion is based on average probability, the "optimum" method may have a very low probability of correctly identifying a whale, for example. The latter situation may very well be a disadvantage for many situations.

Minimum probability of correct identification can also be used as a criterion. The goal in this system is to select the method that maximizes the minimum probability.

From FIG. 14, it can be seen that method A has a minimum probability of correct identification of .4, method B has .35, and method C has .5. It follows then, that method C is preferred over A and B. This criterion does not have the disadvantage mentioned for the preceding criterion, but it too is extreme in that it considers only the worst case situations.

Ratio constraints will be the third criterion discussed which can be used in selecting an identification method. For example, it is decided that identification of submarines is more important than identification of whales and that the probability of correctly identifying a submarine should be twice that for a whale. In other words, only methods that emphasize submarine identification will be considered. From FIG. 14 it can be seen that method C is excluded from consideration because the probabilities of identification of the items are too close to satisfy the conditions set forth above. Further, it can be seen that method A is preferred over method B. For this criterion, the goal is to select a method that satisfies the ratio constraint such that there is no better method.

The foregoing criteria may all be adapted to a single identification method. In this identification method, each of the reference waveforms is compared numerically to the detected waveform. It will be recalled from the discussion of FIG. 13 that each waveform is quantized in that each sample is converted to a numerical value and stored. Referring now to FIG. 15, this method of identification, or correlation, is more fully described. Each reference waveform is compared numerically to the detected waveform at all possible positions or "off-sets." The method of off-setting the detected waveform for repeated comparisons is used to locate the portion of the detected waveform which represents the detected object. This procedure will be described in more detail in the discussion of FIG. 16 and FIG. 17. In general the detected waveform will be of a longer duration than that of the reference waveforms. In FIG. 15 the waveform R represents one of the reference waveforms, and the waveform G represents the portion of the detected waveform which is to be considered. To determine the degree of correlation between the waveforms R and G, a "correlation value" C is calculated according to the following relationship:

$$C=\sum_{r=1}^{r=r}(R_r-G_r)^2+K$$

where R1, R2, . . . , R$n$ are samples, as defined in the discussion of FIG. 13, for the reference waveform R; and where G1, G2, . . . , G$n$, are samples from the detected waveform G at the particular off-set, and K is a parameter which will be discussed below. In FIG. 15 only three samples, R$r$—1, R$r$, and R$r$+1, are illustrated for the reference waveform R; three samples, G$r$—1, G$r$, and G$r$+1, are illustrated for the detected waveform G.

Having calculated the correlation value for all possible off-sets for the first reference waveform, the procedure is repeated for each succeeding reference waveform in a similar fashion. The correlation value so found for each of the reference waveforms is stored, and the lowest valued one selected as identifying the detected waveform.

Turning now to a consideration of FIG. 16, the off-set procedure mentioned above will be described. It is this feature which permits identification to proceed without having the reference waveforms in registration with the exact portion of the detected waveform which represents the object to be identified. For this embodiment, the detected waveform is of a duration to represent a return of 2000 yards. The longest object to be detected and identified is taken to 150 yards, thereby yielding a condition where the desired portion of the detected waveform is only some small fraction thereof, and can occur anytime. For purposes of description, the reference waveforms are illustrated being shifted one sample position at a time across the length of the detected waveform. Considering the procedure in this light, it can be seen that many calculations must be made to arrive at a correlation value for each reference waveform. As an example, when the samples are taken at 4.66 yard intervals, and the reference waveforms are uniformly representative of 150 yards the number of off-set positions will be as follows:

$$\frac{2000-150}{4.66}=395 \text{ Off-sets}$$

It will be recalled from the discussion of FIG. 15, all samples of the reference waveform must be numerically compared to the associated samples of the portion of the detected waveform according to the relationship set forth, for each off-set position. As each new correlation value for the off-set position is calculated for a given reference waveform, it is compared to the previous lowest correlation value for that particular reference waveform. When a new correlation value is found to be of a lower numerical value than the previously recorded lowest value, the new value is saved for comparison with subsequent correlation values for the following off-set positions. The correlation value remaining when all off-set positions have been examined for the particular reference waveform, is the correlation value that is saved for the final selection or identification procedure. It is this off-set calculation operation which eliminates the requirement that the detected waveform be in registration with the reference waveforms, and permits the versatility of this invention. It is readily apparent that the number of off-set calculations will depend upon the length of the reference waveforms, the length of the detected waveform, and the frequency of the sampling.

For this embodiment, the reference waveforms are not shifted past the detected waveform as described above. Instead, the reference waveforms are held constant and the detected waveform shifted in off-set positions past them as illustrated in FIG. 17. The result is identical, but the implementation of this system is easier than that described above. Note that when the detected waveform is in position A, the portion which is compared to the reference waveforms is bounded by the two vertical dashed lines, and there is no match. When it is shifted one off-set position (one sample period), as in position B, there still is no match. When the detected waveform is shifted a second off-set position, as at C, a match is made with reference waveform 1. Since it is a close match the correlation value at that point will be a very low numerical value. When the detected waveform is shifted through the remainder of its off-set positions, no correlation value will be found to be of a lesser value, hence the value calculated at position C will be saved for the final identification selection.

The value of K for the calculation of the correlation values, will differ for various application. In this embodiment it is the product of the noise power and a probability factor which must be supplied for each of the types of objects the system will be called upon to identify.

For the average-probability criterion, described above, the parameters which enter into a determination of the value of K, for the identification method are the natural logarithms of the relative frequencies of occurrence of the various objects to be identified. For example, if one-half of the detected objects are whales, one-sixth of the detected objects are small submarines, and one-third of the detected objects are large submarines, the respective parameters are $-\ln \frac{1}{2}$, $\ln \frac{1}{6}$, and $\ln \frac{1}{3}$. The influence of these relative frequencies on the identification increases with noise power, such that when the noise power is high, the identification system relies strongly on these frequencies of occurrence.

For the minimum-probability criterion, the parameters are natural logarithms of numbers whose sum is one. The number of these numbers will depend upon the number of objects to be identified, and the values are selected so that the probabilities of correct identification have the same value.

For the ratio-constraint criterion, the parameters are selected so that the ratio constraint is satisfied. In addition, the parameters are of the form $\ln 2a$, $\ln b$, and $\ln c$, where $a+b+c=1$. The factor of 2 enters as a result of the ratio contraint for the above example.

Further requirements for the implementation of this system of waveform classification and identification are as follows:

(1) The input waveform must be corrected for systematic changes such as range attenuation;

(2) The input and reference waveforms must be comparable in amplitudes (if the waveforms are normalized with respect to power, the sum of the differences squared is proportional to cross-correlation. Nevertheless, it is simpler to implement the sum of the differences squared than the cross-correlation for small numbers. For example, there are 32 possible squares of a five-bit number, whereas the product of two positive five-bit numbers has 346 possible values.);

(3) The error introduced by quantizing the samples to 32 levels is small compared to other errors;

(4) The noise is a superposition of randomly positioned pulses with random amplitudes of a Gaussian nature such that over the range gate the average noise level is zero;

(5) The characteristics of the noise are constant over the range gate; and (6) The noise spectrum has a sharp high frequency cutoff, and the sampling frequency is twice this cutoff frequency.

The system parameters affecting the speed of operations are the 8 seconds alloted for identification, the length of the reference waveforms, the sampling frequency, and the number of stored reference waveforms. Assuming the number of stored reference waveforms to be 1000, the number of 5-bit operations and the time per operation are plotted as functions of sampling frequency and reference waveform size in FIG. 18 and FIG. 19, respectively. From FIG. 18 it can be seen that for a sampling frequency of 800 cycles per second and a reference waveform length of 150 yards, there would be $277\times10^6$ 5-bit operations in 8 seconds. For the same situation, FIG. 19 shows that this would allow a maximum of 30 nanoseconds for each summation and square of the difference operation.

The number of reference waveforms that can be correlated is a function of sampling frequency and the reference waveform sizes. FIG. 20 illustrates these relationships, and from this graph it can be seen that different configurations are possible at different sampling rates for the reference waveform sizes shown. For example, for a sampling frequency of 800 cycles per second and reference waveform size of 150 yards, there is time to perform correlations with 115 reference waveforms in 8 seconds. At a sampling frequency of 400 cycles per second and the same reference waveform size, the number of waveform types increases to 462. It should also be noted that as the size of the reference waveform decreases, the number of reference waveforms can be increased.

SYSTEM LOGIC

FIG. 21 is a block diagram which illustrates the logical manipulations performed by the waveform identification equipment, where the $\Sigma(R-G)^2+K$ process is formed. The carry-store addition method is used for the accumulation of the squared differences. In this method the squared differences are accumulated by a series of half adds, where the carries are stored, and are not allowed to propagate more than one stage for each half add. At the end of the last addition, for each off-set comparision, the carries are allowed to propagate through the carry pyramid to obtain the final correlation value. The amount of extra time required for the final propagation of carries is not significant; and, therefore, the total add time is essentially the time required to do the half adds.

The circuitry and functions illustrated in FIG. 21 are primarily logical in nature, and the requisite details of control and circuit configurations will be discussed in more detail below. The purpose of the circuitry represented by this logical diagram is to calculate the correlation value for a digitized reference waveform, and one off-set position of the detected waveform.

At the outset of the operation, the digital words which represent a reference waveform are transmitted from the memory section of the computer via cable 300 to the six 30-bit registers R0 through R5. This is accomplished by transmitting the highest ordered 30-bits in parallel via cable 300 to R0. This word is then transmitted from R0 to R1 via transmission path 302, and another word is transmitted from the computer via cable 300 to R0. When this is completed, the word in R1 is transmitted to R2 via path 304 and the new word in R0 is transmitted to R1 via path 302, as described above. This loading operation continues with the words being transmitted from R2 to R3 via path 306, from R3 to R4 via path 308, and from R4 to R5 via path 310. When the highest ordered word (the first six samples) reaches register R5, six words each representing six samples have been loaded. The transmission between registers is in parallel.

When the reference waveform has been loaded in registers R0 through R5, one off-set position of the detected waveform is loaded in a similar manner in registers G0 through G5. Each of these registers is also a 30-bit storage register, and are loaded in a sequential fashion, as described for R0 through R5. Each word represents six samples of the quantized detected waveform, and is transmitted via cable 312 from the computer memory to G-*in*, an additional 30-bit register. From G-*in* the 30-bit words are transmitted in parallel via path 314 to G0, from G0 to G1 via path 316, from G1 to G2 via path 318, from G2 to G3 via path 320, from G3 to G4 via path 322 and from G4 to G5 via path 324. An additional six sample word is loaded in G-*in* to provide additional samples for the sequential off-set situations.

When both the reference waveform and the off-set of the detected waveform have been respectively loaded, the word in R5 is transmitted in parallel to R6 via path 326 and the word in G5 is transmitted in parallel to G6 via path 328. All of the other words in R0 through R4 are likewise transmitted to the next sequential register, and all of the other words in G0 through G4 are also transmitted to the next sequential registers. R6 and G6 are the operational registers which operate to select the samples and direct them to the appropriate $(R-G)^2$ circuitry, labelled 330 and 332. It is the function of each of these circuits to subtract one five-bit sample in G6 from the corresponding five-bit sample in R6, square the difference, and then transfer the resultant to their respective X1 or X2 registers. The operation of this circuitry will be described in more detail below. It should be noted that the number of R registers required is a function of the number of samples in the reference waveform. In this particular example there are the 32 five-bit samples plus the "weighting" or probability constant K for each reference waveform. It should also be noted that the number of G registers will correspond to the number of R registers since they will be utilized to store a portion of the unknown detected waveform which is equal in length to the reference waveforms. It should be recalled at this point that the number of registers will depend upon the number and size of the samples to be evaluated for any given embodiment.

When the samples are to be compared numerically, the highest ordered, or first sample, in R6 illustrated as R60, is transmitted via path 340 to the $(R-G)^2$ circuitry labeled 330 at the same time that the corresponding sample from G6, labeled G60, is transmitted via path 360. Having formed the difference and squared the result, the value so calculated is transmitted to the X2 register via path 344. For this embodiment it has been assumed that all of the quantized samples are positive in value. When the difference (R–G) is formed, it can be seen that negative numbers can occur. This does not create any problem; however, since when the negative number is squared it automatically becomes positive and there is no need to consider the handling of the negative numbers.

When the sample stored in R61 is transmitted via path 334 and the sample stored in G61 is transmitted via path 356 to the $(R-G)^2$ circuitry labeled 332, the value so calculated is transmitted via path 338 to the X1 register.

The S1, and S2 registers contain the stored bit sums from previous half add operations for the off-set waveform under consideration, and the C1 and C2 registers contain the stored carries from the previous operations. The half add circuitry is of a type well-known in the art, and operates in parallel.

In a manner similar to that described above, the sample from R62 is transmitted via path 350 and the sample from G62 is transmitted via path 352 to difference circuitry 330; the sample from R63 is transmitted via path 346 and the sample from G63 is transmitted via path 352 to difference circuitry 332; the sample from R64 is transmitted via path 340 and the sample from G64 is transmitted via path 342 to the difference circuitry 330; and the sample from R65 is transmitted via path 334 and the sample from G65 is transmitted via path 336 to difference circuitry 332. It will be noted that the samples are alternated between $(R-G)^2$ labeled 332 and $(R-G)^2$ labeled 330. This is done to provide an overlap in the computation time such that while one difference squared value is being calculated, the previous operation can be propagating through the associated registers and half add circuitry. By providing this parallel set of circuitry the operation time can be materially reduced since there is no need to wait for one operation to be completed before starting the formation of the difference squared value for the next sample.

Having completed the examination of the first six samples, the six samples stored in R6 are transmitted in parallel via path 362 to the R0 register, and each of the groupings of six samples stored in R0 through R5 are moved to the next sequentially higher ordered register. In this manner the samples which represent the reference waveform are maintained in sequence, and the second group of six samples is positioned for comparison with the second group of six samples for the off-set position of the detected waveform. When the second six samples have all been evaluated as described above, this shifting of storage to the next higher ordered register is repeated, and the cycle is repeated until all six of the six sample groups have been evaluated.

The operation of the G registers is easiest understood by discussion of a specific example. Accordingly, the values set out in the table above, which refers to the waveform illustrated in FIG. 13, are shown in the following Register Listing, with the first sample of the waveform being the highest ordered sample in G6, and the last sample being the lowest ordered sample in G0. The arrowed lines indicate the sequence of the samples as they are stored for this evaluation. The highest ordered sample in G-*in*, the 6, is the next sequential sample outside of the specified off-set, and will be included as the lowest ordered sample for the second off-set evaluation.

REGISTER LISTING

| | A | | | | | | |
|---|---|---|---|---|---|---|---|
| Gin | 6 | X | X | X | X | X | Initial conditions |
| G0 | 14 | 13 | 9 | 8 | 8 | 7 | |
| G1 | 14 | 13 | 13 | 15 | 14 | 13 | |
| G2 | 20 | 22 | 22 | 20 | 16 | 14 | |
| G3 | 21 | 22 | 21 | 18 | 17 | 18 | |
| G4 | 17 | 19 | 19 | 16 | 19 | 21 | |
| G5 | 6 | 9 | 12 | 13 | 16 | 16 | |
| G6 | 0 | 0 | 0 | 0 | 0 | 0 | |

REGISTER LISTING—Continued

B

| | | | | | | |
|---|---|---|---|---|---|---|
| Gin | 6 | X | X | X | X | X |
| G0 | 14 | 13 | 9 | 8 | 8 | 7 |
| G1 | 14 | 13 | 9 | 8 | 8 | 7 |
| G2 | 14 | 13 | 13 | 15 | 14 | 13 |
| G3 | 20 | 22 | 22 | 20 | 16 | 14 |
| G4 | 21 | 22 | 21 | 18 | 17 | 18 |
| G5 | 17 | 19 | 19 | 16 | 19 | 21 |
| G6 | 6 | 9 | 12 | 13 | 16 | 16 |
| | a | | b | | | |

Move into position

At completion of examination of first six samples:
1. Discard a sample
2. Move b samples to go

C

| | | | | | | |
|---|---|---|---|---|---|---|
| Gin | 6 | X | X | X | X | X |
| G0 | 9 | 12 | 13 | 16 | 16 | 0 |
| G1 | 14 | 13 | 9 | 8 | 8 | 7 |
| G2 | 14 | 13 | 13 | 15 | 14 | 13 |
| G3 | 20 | 22 | 22 | 20 | 16 | 14 |
| G4 | 21 | 22 | 21 | 18 | 17 | 18 |
| G5 | 17 | 19 | 19 | 16 | 19 | 21 |
| G6 | 6 | 9 | 12 | 13 | 16 | 16 |

D

| | | | | | | |
|---|---|---|---|---|---|---|
| Gin | 6 | X | X | X | X | X |
| G0 | 9 | 12 | 13 | 16 | 16 | 0 |
| G1 | 9 | 12 | 13 | 16 | 16 | 0 |
| G2 | 14 | 13 | 9 | 8 | 8 | 7 |
| G3 | 14 | 13 | 13 | 15 | 14 | 13 |
| G4 | 20 | 22 | 22 | 20 | 16 | 14 |
| G5 | 21 | 22 | 21 | 18 | 17 | 18 |
| G6 | 17 | 19 | 19 | 16 | 19 | 21 |
| | c | | d | | | |

At completion of examination of second six samples:
1. Move c to G1;
2. Move d to G0.

E

| | | | | | | |
|---|---|---|---|---|---|---|
| Gin | 6 | X | X | X | X | X |
| G0 | 19 | 19 | 16 | 19 | 21 | 0 |
| G1 | 9 | 12 | 13 | 16 | 16 | 17 |
| G2 | 14 | 13 | 9 | 8 | 8 | 7 |
| G3 | 14 | 13 | 13 | 15 | 14 | 13 |
| G4 | 20 | 22 | 22 | 20 | 16 | 14 |
| G5 | 21 | 22 | 21 | 18 | 17 | 18 |
| G6 | 17 | 19 | 19 | 16 | 19 | 21 |

F

| | | | | | | |
|---|---|---|---|---|---|---|
| Gin | 6 | X | X | X | X | X |
| G0 | 19 | 19 | 16 | 19 | 21 | 0 |
| G1 | 19 | 19 | 16 | 19 | 21 | 0 |
| G2 | 9 | 12 | 13 | 16 | 16 | 17 |
| G3 | 14 | 13 | 9 | 8 | 8 | 7 |
| G4 | 14 | 13 | 13 | 15 | 14 | 13 |
| G5 | 20 | 22 | 22 | 20 | 16 | 14 |
| G6 | 21 | 22 | 21 | 18 | 17 | 18 |
| | e | | f | | | |

At completion of examination of third six samples:
1. Move e sample to G1;
2. Move f samples to G0.

H

| | | | | | | |
|---|---|---|---|---|---|---|
| Gin | 6 | X | X | X | X | X |
| G0 | 22 | 21 | 18 | 17 | 18 | 0 |
| G1 | 19 | 19 | 16 | 19 | 21 | 21 |
| G2 | 9 | 12 | 13 | 16 | 16 | 17 |
| G3 | 14 | 13 | 9 | 8 | 8 | 7 |
| G4 | 14 | 13 | 13 | 15 | 14 | 13 |
| G5 | 20 | 22 | 22 | 20 | 16 | 14 |
| G6 | 21 | 22 | 21 | 18 | 17 | 18 |

I

| | | | | | | |
|---|---|---|---|---|---|---|
| Gin | 6 | X | X | X | X | X |
| G0 | 22 | 21 | 18 | 17 | 18 | 0 |
| G1 | 22 | 21 | 18 | 17 | 18 | 0 |
| G2 | 19 | 19 | 16 | 19 | 21 | 21 |
| G3 | 9 | 12 | 13 | 16 | 16 | 17 |
| G4 | 14 | 13 | 9 | 8 | 8 | 7 |
| G5 | 14 | 13 | 13 | 15 | 14 | 13 |
| G6 | 20 | 22 | 22 | 20 | 16 | 14 |
| | g | | h | | | |

At completion of examination of fourth six samples:
1. Move g sample to G1;
2. Move h samples to G0.

J

| | | | | | | |
|---|---|---|---|---|---|---|
| Gin | 6 | X | X | X | X | X |
| G0 | 22 | 22 | 20 | 16 | 14 | 0 |
| G1 | 22 | 21 | 18 | 17 | 18 | 20 |
| G2 | 19 | 19 | 16 | 19 | 21 | 21 |
| G3 | 9 | 12 | 13 | 16 | 16 | 17 |
| G4 | 14 | 13 | 9 | 8 | 8 | 7 |
| G5 | 14 | 13 | 13 | 15 | 14 | 13 |
| G6 | 20 | 22 | 22 | 20 | 16 | 14 |

K

| | | | | | | |
|---|---|---|---|---|---|---|
| Gin | 6 | X | X | X | X | X |
| G0 | 22 | 22 | 20 | 16 | 14 | 0 |
| G1 | 22 | 22 | 20 | 16 | 14 | 0 |
| G2 | 22 | 21 | 18 | 17 | 18 | 20 |
| G3 | 19 | 19 | 16 | 19 | 21 | 21 |
| G4 | 9 | 12 | 13 | 16 | 16 | 17 |
| G5 | 14 | 13 | 9 | 8 | 8 | 7 |
| G6 | 14 | 13 | 13 | 15 | 14 | 13 |
| | i | | j | | | |

At completion of examination of fifth six samples:
1. Move i sample to G1;
2. Move j samples to G0.

L

| | | | | | | |
|---|---|---|---|---|---|---|
| Gin | 6 | X | X | X | X | X |
| G0 | 13 | 13 | 15 | 14 | 13 | 0 |
| G1 | 22 | 22 | 20 | 16 | 14 | 14 |
| G2 | 22 | 21 | 18 | 17 | 18 | 20 |
| G3 | 19 | 19 | 16 | 19 | 21 | 21 |
| G4 | 9 | 12 | 13 | 16 | 16 | 17 |
| G5 | 14 | 13 | 9 | 8 | 8 | 7 |
| G6 | 14 | 13 | 13 | 15 | 14 | 13 |

M

| | | | | | | |
|---|---|---|---|---|---|---|
| Gin | 6 | X | X | X | X | X |
| G0 | 13 | 13 | 15 | 14 | 13 | 0 |
| G1 | 13 | 13 | 15 | 14 | 13 | 0 |
| G2 | 22 | 22 | 20 | 16 | 14 | 14 |
| G3 | 22 | 21 | 18 | 17 | 18 | 20 |
| G4 | 19 | 19 | 16 | 19 | 21 | 21 |
| G5 | 9 | 12 | 13 | 16 | 16 | 17 |
| G6 | 14 | 13 | 9 | 8 | 8 | 7 |
| | k | | l | | | |

At completion of examination of sixth six samples:
1. Move k sample to G1;
2. Move l samples to G0.

N

| | | | | | | |
|---|---|---|---|---|---|---|
| Gin | 6 | X | X | X | X | X |
| | m | | | | | |
| G0 | 13 | 9 | 8 | 8 | 7 | 6 |
| G1 | 13 | 13 | 15 | 14 | 13 | 14 |
| G2 | 22 | 22 | 20 | 16 | 14 | 14 |
| G3 | 22 | 21 | 18 | 17 | 18 | 20 |
| G4 | 19 | 19 | 16 | 19 | 21 | 21 |
| G5 | 9 | 12 | 13 | 16 | 16 | 17 |
| G6 | | | | | | |

Move new sample from Gin, such as sample m, to lowest position of G0. Registers are now in initial conditions for next off-set comparison to reference waveform.

PRECEDING SEQUENCE NOW CAN BE REPEATED

When the G registers are first loaded with the samples which represent one off-set condition of the detected waveform, they are in a condition illustrated by the A grouping in the Register Listing above. This is an initial condition. The next operation is to shift the contents of the G0 through G5 registers to the next sequentially ordered register in preparation for the evaluation of the first six samples. This condition is illustrated by the B grouping. At this point note that the contents of the G0 and the G1 registers are identical, due to the shifting action just described.

When all six of the samples in G6 have been evaluated as described above in conjunction with the samples in R6, the G registers must be adjusted for the next grouping of six samples. This adjustment results in the highest ordered, or first sample to be discarded. It will be recalled from discussion above that the detected waveform is evaluated for all possible off-set conditions, where an off-set was described as shifting the evaluation of the detected waveform by one sample position. At the B grouping, then, this means that the sample designated *a* will be descarded, since a new sample will be added on at the lowest ordered position for the next off-set evaluation. The samples designated *b* will be shifted into the highest ordered five sample positions in G0. The rearranged G registers are illustrated in the C grouping. In preparation for the evaluation of the second six samples, it is necessary that all of the samples be moved to the next sequentially higher ordered G register. The advanced samples are shown in the D grouping.

The G6 register now has the second group of six samples ready for evaluation with the second set of six samples of the reference waveform. Upon completion of this evaluation, the sample labeled *c* is moved to the lowest ordered position of the G1 register, and the samples labeled *d* are shifted to the highest ordered five sample positions in G0 in a manner similar to that described above. The shifted rearrangement of these samples is illustrated in the E grouping. In preparation for the examination of the third group of six samples, the contents of all of the registers G0 through G5 are moved to the next higher register, thereby loading the third group of six samples into the G6 register, as shown in the F grouping. Following the evaluation of the third group of six samples, the sample labeled *e* is moved from G1 and the samples labeled *f* are moved to G0. This condition is shown in the H grouping. The condition is such that the contents of the G0 through G5 registers must again be shifted to a higher ordered register such that the fourth group of six samples is placed in the G6 register, as illustrated in the I grouping.

When the fourth group of six samples has been evaluated, the sample labeled *g* is moved to G1 and the samples labeled *h* are moved to G0, as shown in the J grouping. The fifth group of six samples can now be moved into position by shifting all of the G registers as described above, and yielding the arrangement shown in the K grouping.

When the fifth group of six samples has been evaluated, the sample labeled *i* is moved to G1 and the samples labeled *j* are moved to G0, as shown in grouping L. The sixth group of six samples can now be moved into position in G6 by shifting the contents of R0 through R5 to the next higher ordered registers, thereby yielding the conditions illustrated in the M grouping.

When the sixth group of six samples has been evaluated, the sample labeled *k* is moved to G1 and the samples labeled *l* are moved to G0, as shown in the N grouping. At this time all of the samples for the off-set position have been evaluated with respect to their corresponding samples in the reference waveform, and the samples stored in the G registers have been shifted one position in preparation for the evaluation of the next off-set position. It is necessary only to provide the sample for the lowest ordered position of G0, which is done by selecting the appropriate sample from G–*in,* in this case the first sample, and transmitting it to G0. This operation is iluustrated in the N grouping. At this time the G0 through G5 registers are in the initial condition described with respect to the A grouping, and the second off-set position of the detected waveform is ready for evaluation in a manner identical to that just described.

The transmission of highest ordered sample of G6 to the lowest order of G1, labeled G15 in FIG. 21, is accomplished in parallel via path 366, and the transmission of the other five samples in G6 to the highest ordered five sample positions of G0 is accomplished in parallel via path 368. When the off-set position has been evaluated, the new sample from G–*in* is transmitted to the lowest order of G0, labeled G05, via path 370.

Recalling the earlier discussion of the formation of the summation of the squared differences of each of the samples, it was pointed out that the results of each computation were to be stored in the appropriate ones of S1, C1, or S2, C2 registers. When all of the samples have been evaluated in this fashion, the carries are allowed to propagate through the Carry Pyramid 372, to form the final correlation value for the off-set position S2. Having done this, it is necessary to compare the current correlation value represented in S2 with the previous low correlation value stored in Correlation Value register H. This comparison is accomplished by transmitting the complement of the previous correlation value, designated $\overline{H}$, to the C2 register. The complement of the previous correlation value and the current correlation value are then half added and the result stored in the S1 register. It will be noted that adding the complement of the previous correlation value to the current correlation value is the equivalent of subtracting the previous correlation value from the current value. Following this subtraction, the sign bit of S1 is tested and transmitted via path 374 to circuitry 376 which determines whether the sign bit is 1 or 0, and thereby whether the difference is positive or negative. If the circuitry 376 determines that the sign is negative, an enable is emitted on line 378 to Gate 380, thereby allowing the current correlation value to be stored in the Correlation Value register H from the S2 register via transmission paths 382. In the event that it is determined that the sign was positive, thereby indicating that the previous correlation value was lower in value than the current correlation value, the enable is not transmitted and the previous correlation value is retained in register H. After the entire detected waveform has been evaluated for all possible off-set positions the value remaining in the Correlation Value register H is transmitted via path 384 to the computer and stored for comparison to the correlation values for the other reference waveforms as they are calculated.

The entire process is repeated for each of the standard waveforms which is stored in the computer, and the lowest correlation value for each reference waveform is transmitted via path 384 to the computer for further evaluation when all of the reference waveforms have been analyzed. This further evaluation is comprised of the operation of selecting the lowest valued correlation value of the entire group as being indicative of the identity of the detected waveform. For this embodiment the three lowest values are selected and transmitted from the computer to the display console for further evaluation by an operator.

TIMING AND CONTROL

FIG. 22 is a logic diagram of a characteristic register of the type used to construct the embodiment of the subject invention. Ten stages are shown, as would be utilized in the X1 and X2 Registers, but the capacity is increased by adding more stages. The storage portion of the register is shown enclosed in dashed box 400, and is comprised of ten flip-flop circuits of the type described above. These flip-flops are labeled FF01 through FF10. It will be recalled that these flip-flops are of the Set-Clear type, and are not of the toggle type. This means that a signal must be impressed on the Set or ("1") input terminal to cause the flip-flop to store a logical 1. In order to cause the flip-flop to store a "0," it is necessary to impress a similar signal on the Clear or "0" input terminal. A CLEAR bus 402 is provided with connections to each Clear input of the flip-flops in the register, thereby providing a means for clearing the stored value of the register to zero. Such a zero condition is necessary in advance of setting a desired value for storage in the register. The signal on the CLEAR line 402 can be provided by either the control section of the waveform classifier, or from the logic circuitry which is performing the classification.

Each flip-flop stage of a storage register has associated therewith a gating circuit which provides timing and synchronization of the pulse propagation. These gating circuits are shown enclosed in dashed box 404, and are labeled NOR01 through NOR10. These are NOR circuits of the type described above. The gating is provided by applying an enabling pulse on CONTROL bus 406, which in turn provides an input signal to each NOR circuit of the gating circuit. Additionally, a signal must be applied on the CLOCK bus 408 simultaneously with the CONTROL signal in order for the timing conditions to be met, thereby allowing data signals to be propagated into the storage register stages. The Data Signals are applied to the terminals marked DATA LINES. Each of the gating NOR circuits, for instance NOR01, have their output terminals coupled directly to the Set, or "1," input terminal of the associated flip-flop. In the case just mentioned, wire 410 couples the output of NOR01 to the "1" input of FF01. A similar connection is made for each of the stages.

It will be noted that inversion takes place in the gate stage. Again referring to NOR01, it can be seen that a "0" on CONTROL, a "0" on CLOCK, and a "0" on input wire 412 will result in a "1" output signal on wire 410. Accordingly, when one register is to be transferred to a subsequent register, it is necessary to couple the output terminal into the gate circuitry, and in turn, get the desired value stored in the register.

FIG. 23 illustrates the relationship of FIG. 24*a*, FIG. 24*b*, FIG. 24*c* and FIG. 24*d* which together illustrate the control circuits necessary to perform the register shifting and data manipulation described above in conjunction with FIG. 21. The Timing Control illustrated in FIG. 24*a*, FIG. 24*b*, FIG. 24*c* and FIG. 24*d*, shown as Part A labeled 414 and Part B labeled 416, is comprised of timing chains of a type well-known in the art, utilized to control the generation and propagation of control pulses which in turn control the operation of the Waveform Classifier. The basic timing of the control circuitry comes from a four-phase clock. This clock is oscillator driven with self-contained shaping circuits. This clocking arrangement results in data transfer rates of four times the basic clock frequency.

When a signal is received on the Interrupt line 418 from the Output Section 30*b*, it activates the operation of Control Timing 414, 416. This activation causes the circuitry to prepare the R0 through R6 Registers for the reception of the first reference waveform. This is done by issuing CLEAR pulses on lines 420, 422, 424, 426, 428, 430, 432. Additionally, G–*in* and the G0 through G6 Registers are likewise cleared by the CLEAR pulses issued on lines 434, 436, 438, 440, 442, 444, 446 and 448. For purposes of uniformity in the logic, a Clock bus 450, supplying clock pulses of a predetermined phase, supplies the synchronization to the R0 through R6 Gates, and a Clock bus 452 supplies synchronization clock pulses to G–*in* and G0 through G6 Gates.

Having cleared the registers and prepared the circuitry for the classification operation, the Control Timing circuitry 414 issues a signal on Interrupt line 454, thereby informing the Computer that it can transmit a Reference Waveform into the classifier via Input Channel 456. The Enable pulse provided on wire 458 simultaneously with the Clock pulse on bus 450 causes the first word of Reference Waveform to be gated through the R0 Gates into the R0 Register. Sequential enables on wires 460 and 458 respectively enable the R1 Gates and the R0 Gates, thereby causing the first word of the Reference Waveform to be transmitted to R1, and a second word of the Reference Waveform to be loaded in the R0 Register. In a similar manner enable path 462 controls the R2 Gates; enable path 464 controls the R3 Gates; enable path 466 controls the R4 Gates; enable path 468 controls the R5 Gates; and enable path 470 controls the R6 Gates. FIG. 24*e* illustrates the relationship of the Clear and Enable pulses to the respective Gate circuits and Registers which are required to perform the loading of a Reference Waveform. It will be seen that as each new word (six samples) of the Reference Waveform is provided on Input Channel 456 that all preceding words are moved to the next successively higher ordered R Register.

The numbers in parenthesis just above each enable pulse in FIG. 24*e* and FIG. 24*f* indicate which word of the Reference Waveform is thereby stored in the associated Register, and illustrates how the words progress from register to register as they are loaded.

Having loaded a Reference Waveform in the R Registers, the Control Timing 416 (Part B) loads the six words which represent the off-set portion of the detected waveform which is to be analyzed first, and the additional word which is loaded in the G-*in* Register for supplying additional samples as the process proceeds. The relationship of the Clear pulses and the Enable pulses for loading the G Registers is illustrated in FIG. 24*f*. The concurrent application of the Clock pulse on bus 452, an input word on Input Channel 456, and an Enable pulse on line 472 causes the word to be gated through the G–*in* Gates to be stored in the G–*in* Register. Following this operation, an Enable is presented on wire 476, thereby moving the first word into the G0 Register (See FIG. 24*f*). Having moved the first word on, G–*in* is cleared and another Enable provided on wire 472. This causes the second word of the off-set position to be stored in the G–*in* Register. In a similar manner the G1 Register is supplied with Enable pulses via wire 478; the G2 Register is supplied with Enable pulses via wire 480; the G3 Register is supplied with Enable pulses via wire 482; the G4 Register is supplied with Enable pulses via wire 484; the G5 Register is supplied with Enable pulse via wire 486; and the G6 Register is supplied with Enable pulses via wire 488. It will be recalled that an extra word of six samples is loaded in the G–*in* Register to have additional samples available for subsequent off-set positions, and is illustrated in FIG. 24*f* as the (7) positions in the Enable G–*in* sequence of Enables.

It will be recalled that a probability factor K can be included in the calculation of the correlation values for each of the Reference Waveforms. For this embodiment, the factor K is stored in the lower ordered sample positions of the sixth word in the Reference Waveform, and appears in the lower end of the R0 Register. When the loading has been completed, the K factor is transmitted via cable 490 to the S1 Register, a part of the Adders-Registers & Carry Pyramid circuitry illustrated as box 492. This puts the K factor in the accumulation circuitry where it will be made a part of the calculation of the Correlation value.

To perform the actual operations on the samples to determine the correlation value, the samples stored in the R6 Register and G6 Register are paired off and the differences squared and accumulated. The highest ordered sample stored in R60 is transmitted via cable 494 to gates 496 while the sample stored in G60 is transmitted to gates 498. An Enable pulse carried on wire 500 is also transmitted to gates 496 and 498, thereby transmitting the R60 sample via cable 502 to Subtractor II 506 (to be described below), and the G60 sample via cable 504 to the same circuitry. The five digits which represent the sample stored in G60 are subtracted from the five digits which represent the sample stored in R60, and this difference is transmitted to Squarer II 512 (to be described below). The squaring circuitry squares the difference, and upon the issuance of an Enable on wire which enables the X2 Gates 516, the squared value is stored in the X2 Register. The squared value is then provided via cable 518 to the accumulation circuitry 492. This accumulation circuitry is composed of parallel half-adders of a type well known in the art, for instance as described in the textbook "Computer Logic," authored by Ivan Flores, published by Prentice-Hall, Inc., in 1960, at chapter 10, subdivision 10.2 starting at page 150. As was described above in conjunction with the discussion of FIG. 21, the dual registers and set of half-adders allows the formation of the summation of one of the values calculated, while another difference squared value is being calculated, thereby appreciably speeding the overall calculation procedure.

The R61 sample is transmitted to Gate 520, such that when an Enable pulse is provided on line 522, the sample is transmitted via cable 524 to the Subtractor I circuitry 526. The same Enable is transmitted via wire 528 to Gates 530, and G61 sample transmitted via cable 532 to Gates 530 are thereby caused to be applied to the Subtractor I circuitry 526 via cable 534. The difference is formed, and, it is transmitted into the Squarer I circuitry 540. The resultant squared value then awaits the occurrence of the Enable on wire 542 which causes it to be transmitted through the X1 Gates 544 into the X1 Register. This action being completed, the value is transmitted to the accumulation circuitry via cable 546, where it is made a part of the correlation value.

In a similar manner the R62 sample is transmitted via cable 548 to Gates 550, while the G62 sample is transmitted to Gates 552, such that when the Enable is provided on wire 554, the samples are respectively applied vai cables 556 and 558 to the Subtractor II circuitry 506, and difference squared formed. The R63 sample is applied to Gates 560, and the G63 sample is applied to Gates 562 via cable 564, such that when an Enable pulse occurs on wire 566, the samples are respectively transmitted via cables 568 and 570 to the Subtractor I circuitry 526, and squared difference formed.

The R64 Sample is applied via cable 572 to Gates 574 and the G64 sample is transmitted to Gates 576, such that when an Enable is applied on wire 578, they are respectively transmitted via cables 580 and 582 to the Subtractor II circuitry. Finally, the R65 sample is transmitted to Gates 584, and the G65 sample is transmitted via cable

586 to Gates 588, such that when an Enable pulse is provided on wire 590, they are respectively transmitted via cables 592 and 594 to the Subtractor I circuitry.

Having completed the calculations required for the consideration of the six samples, the R Registers are moved to the next higher ordered position, to allow the second six samples to be examined. The word stored in the R6 Register is transmitted via cable 596 to the input stages of the R0 Gates such that when the Enable occurs on wire 458, the word is loaded into the R0 Register. During this rotation of the registers, the timing operation is as described above in conjunction with FIG. 24*c*.

When the Clear pulse is present on line 432, it both clears the R6 Register and advances the scale-of-six counter 598. This arrangement is provided such when the counter has counted up to its capacity, thereby indicating that the whole Reference Waveform has been considered, it issues a pulse on wire 600 to the Control Timing circuitry 414, and causes the correlation value for the offset position to be compared to the previously low-valued number stored in the H Register. This procedure was described above.

In addition to the foregoing, the G Registers must be adjusted when the first word of six samples has been evaluated. On the first word, an Inhibit pulse is provided on wire 602 to Gates 604, thereby preventing the highest ordered sample from G60 from being passed therethrough. This causes the sample to be discarded because the G6 Register is subsequently cleared. For the other five words, an Enable is provided on wire 602. A scale-of-six count 606 similar to that described above, causes an Enable pulse to be emitted on wire 608 when all six words have been evaluated, thereby allowing a new sample to be added in for the new off-set position.

At the completion of the consideration of each word of six samples, an Enable pulse on wire 608 serves to enable Gates 604 and Gates 612. With the Enable pulses on wire 608 and wire 602, the sample from G60 is transmitted via cable 614 to the G6 stage of the G1 Register. In addition to the foregoing, the Enable pulse on wire 608 causes Gates 612 to pass the G61, G62, G63, G64, and G65 samples therethrough, and via cable 616 to the upper five sample positions of the G0 Register. A new sample is brought into the system when the entire off-set position has been considered by transmitting the appropriate one from the G–*in* Register to the G06 stage of the G0 Register, thereby compensating for the sample that was discarded off from the upper end.

Upon the completion of the consideration of all off-set positions for the Reference Waveform, the final correlation value is stored in the H Register. An Enable is then provided on wire 618 to the Output Gates 620 whereby the correlation value is transmitted on Output Channel 622 to the Computer for storage until all Reference Waveforms have been considered.

The foregoing operation is repeated for each off-set position of the detected waveform, and for each of the Reference Waveforms.

SUBTRACTOR CIRCUITRY

FIG. 25 illustrates how the drawings of the Subtractor Circuitry of FIG. 26*a* through FIG. 26*d* should be arranged and considered. This whole embodiment is arranged for handling of five-bit samples, but no limitation thereto is intended, since these same concepts and procedures can be applied equally as well to greater or fewer bits in the samples by expanding or reducing the circuitry.

The basic relationship which must be satisfied to perform the calculation of the difference between two binary numbers is as follows:

$$D=R_j\overline{G}_j+\overline{R}_jG_j$$
$$B=\overline{R}_jG_j$$

where

D represents the bit difference;
B represents the borrow condition;
R represents the true value of a reference sample digit;
$\overline{R}$ represents the complement of a reference sample digit;
G represents the true value of a detected digit;
$\overline{G}$ represents the complement value of a detected digit; and
*j* designates the digit position.

It is felt that an example is the best way to understand the operation of the Subtractor Circuitry, so in the following discussion the logic operation will be described for a specific case. The function that is being performed is (R–G), and the following sample will be considered.

| | R4 | R3 | R2 | R1 | R0 |
|---|---|---|---|---|---|
| R | 1 | 1 | 1 | 1 | 1 |

| | G4 | G3 | G2 | G1 | G0 |
|---|---|---|---|---|---|
| G | 1 | 0 | 0 | 1 | 1 |
| D | 0 | 1 | 1 | 0 | 0 |

The logical values of the input signals and the output signals will be shown adjacent the terminal portion of the respective lines on the drawings for ease in following the logical flow of the calculation for the one sample case. This is a parallel operation with the difference bits and the borrow bits being propagated through simultaneously, and the difference appearing at the output terminals.

To perform the subtraction function, both the true and complement values for each digit of the samples are applied as inputs. The Subtractor Circuitry is illustrated in FIG. 26*a*, FIG. 26*b*, FIG. 26*c*, and FIG. 26*d*. The NOR circuits which comprise this circuitry are all given an S letter designation.

To comply with the terms of the basic logic equation, the input stages of the Subtractor Circuitry are NOR circuits, each having two inputs. Starting at the lower ordered end of the sample, the R0 and $\overline{\text{G0}}$ signals are applied to S001; the $\overline{\text{R0}}$ and G0 signals are applied to S000; the R1 and $\overline{\text{G1}}$ signals are applied to S101; the $\overline{\text{R1}}$ and G1 signals are applied to S100; the R2 and $\overline{\text{G2}}$ signals are applied to S201; the $\overline{\text{R2}}$ and G2 signals are applied to S200; the R3 and $\overline{\text{G3}}$ signals are applied to S301; the $\overline{\text{R3}}$ and G3 signals are appled to the S300; the $\overline{\text{G4}}$ and R4 signals are applied to S401; and the $\overline{\text{R4}}$ and G4 signals are applied to S400.

The S000 NOR circuit is coupled to S007 via wire 650; to S103 via wire 651; to S104 via wire 652; to S105 via wire 653; to S106 via wire 654; to S203 via wire 655; to S204 via wire 656; to S205 via wire 657; to S303 via wire 658; to S304 via wire 659; to S403 via wire 660; whereby for this example a logical 0 is provided as an input.

The S001 NOR circuit has its output coupled to S002 via wire 662; to S007 via wire 663; and to S108 via wire 667, and for this example applies a logical 0 as an input to each of them. The logical 0 applied as an input to S002 is inverted and appears as a logical 1 output on wire 665. This output is coupled to S003 via wire 666; to S206 via wire 668; to S3005 via wire 669; and S404 via wire 670. It will be noted that since this is logical 1 input, that the output from these particular NOR circuits will be a logical 0 irrespective of the other input signals, since only when all input signals are logical 0 will a NOR circuit provide a logical 1 output.

The S100 NOR circuit has its output terminal coupled to S107 via wire 675; to S003 via wire 676; to S203 via wire 678; to S204 via wire 679; to S205 via wire 680; to S206 via wire 681; to S303 via 682; to S304 via wire 683; to S305 via wire 684; to S403 via wire 685; to S404 via wire 686; and to S111 via wire 687; and to S112 via wire 661; thereby providing a logical 0 to each of these circuits for this example.

The S101 NOR circuit has its output terminal coupled to S102 via wire 690; to S107 via wire 691; and to S111 via wire 692; and to S112 via wire 664; and to S208 via wire 696. The input signal applied to S102 is inverted, and for this example the output signal becomes a logical 1, and is provided on wire 693. The output signal from S102 is coupled to S004 via wire 694; to S103 via wire 695; to S306 via wire 697; and to S405 via wire 698. Again it will be noted that this logical 1 input signal will cause these NOR circuits to provide a logical 0 at their respective output terminals.

The S200 NOR circuit has its output terminal coupled to S207 via wire 700; to S003 via wire 701; to S004 via wire 702; to S103 via wire 703; to S303 via wire 704; to S304 via wire 705; to S305 via wire 706; to S306 via wire 707; to S403 via wire 708; to S404 via wire 709; to S405 via wire 710; and to S211 via wire 711; and to S212 via wire 1200.

The S201 NOR circuit has its output terminal coupled to S202 via wire 712; to S207 via wire 713; and to S211 via wire 714; to S212 via wire 1202; and to S308 via wire 719. For this example, the logical 0 signal appearing on these wires is supplied to the respective NOR circuits to which they are coupled. The signal applied to S202 is inverted (complemented) and applied as an input signal to S005 via wire 716; to S104 via wire 717; to S203 via wire 718; and to S406 via wire 720.

The S300 NOR circuit has its output terminal coupled to S307 via wire 722; to S003 via wire 723; to S004 via wire 724; to S005 via wire 725; to S103 via wire 726; to S104 via wire 727; to S203 via wire 728; to S403 via wire 729; to S404 via wire 730; to S405 via wire 731; and to S406 via wire 732; and to S311 via wire 733; and to S312 via wire 1204. The output terminal of NOR circuit S301 is coupled to S302 via wire 734; to S307 via wire 735; and to S311 via wire 736; and to S312 via wire 1206; and to S408 via wire 745.

The input signal to NOR circuit S302 is inverted and provided as an output signal on wire 740, and is provided as an input signal to S006 via wire 741; to S105 via wire 742; to S204 via wire 743; to S303 via wire 744.

The S400 NOR circuit has its output terminal coupled to S407 via wire 750; to S411 via wire 751; to S412 via wire 1208; to S003 via wire 752; to S004 via wire 753; to S005 via wire 754; to S006 via wire 755; to S103 via wire 756; to S104 via wire 757; to S105 via wire 758; to S203 via wire 759; to S204 via wire 760; and to S303 via wire 761.

The output terminal of the S401 NOR circuit is coupled to the S402 NOR circuit via wire 765; to S407 via wire 766; and to S411 via wire 767; to S412 via wire 1210; and to S008 via wire 773. Finally, the input signal applied to S402 is inverted and provided as an output signal on wire 768, and provided as an input to S403 via wire 769; to S304 via wire 770; to S205 via wire 771; to S106 via wire 772.

At this point, each of the input signals, both true and complement values, have been partially acted upon, and have been propagated into the Substractor Circuitry. The final combination of these propagated signals will now be described.

In addition to the input already described, NOR circuit S008 receives input signals from S003 via wire 775; from S004 via wire 776; from S005 via wire 777; and from S006 via wire 778. For this example the input signals result in a logical 1 output signal, which is provided on wire 1212 to S110; to S112 via wire 1214; to S210 via wire 1216; to S212 via wire 1218; to S310 via wire 1220; to S312 via wire 1222; to S410 via wire 1224; to S412 via wire 1226; and to S009 via wire 780. The output of S008 is used to enable complementing gates in the subtractor. When subtracting a number that is larger from another number, a negative difference would be obtained. Inasmuch as only the magnitude of the difference is required in the embodiment of this invention, means are provided to select the complemented difference where the result would have been negative. The presence of a logical 0 on the output of S008 would indicate that an end around borrow had occurred in the subtraction and that a negative difference would result. This logical 0 signal is thus used to enable gates S110, S112, S210, S212, S310, S312, S410, and S412 which form the complemented answer.

Similarly, if the output of S008 is a logical 1, a positive difference is indicated. This logical 1 is inverted by S009 and becomes a logical 0, which is used to enable the normal gages for a positive difference. The output of S009 is provided as an input to S111 via wire 1228; to S113 via wire 1230; to S211 via wire 1232; to S213 via wire 1233; to S311 via wire 1234; to S313 via wire 1236; to S411 via wire 1238; and to S413 via wire 1240. For the example considered, the value in G being subtracted from R is smaller and a positive difference will result. This is verified by the logical 1 output from S008 and a logical 0 output from S009.

S007 is used to determine the bit-difference of R0 and G0. The presence of a logical 0 on the output of S007 indicates a bit-difference of 1. For the lowest order bit in a positive number subtractor, it can be shown that the magnitude difference for that bit is equal to the bit-difference irrespective of the end around borrow (carry). As a result of the two logical 0 input signals to S007, a logical 1 output signal is provided on wire 781 to terminal ***b*0. This logical signal indicates the resultant difference bit for the lowest order bit is 0. The output of terminal *b*0** is supplied to the Squaring Circuitry to be described below.

Proceeding to the second stage for final consideration, the S108 NOR circuit receives input signals in addition to the one described, from S103 via wire 795; from S104 via wire 796; from S105 via wire 797; and from S106 via wire 798; and as a result thereof an output signal is provided from S108 on wire 799 to S109; on wire 1242 to S111; and on wire 800 to S110. S110 also receives an input signal from S107 via wire 1244, which for this example carries a logical 1 signal. The latter cause S110 to provide a logical 0 output signal to S114 via wire 802. The input signal applied to S109 is inverted and applied as the input signal to S113 via wire 803, and to S112 via wire 1246. S114 also has as inputs the output signals of S111 on wire 1248; S112 on wire 1250; and S113 on wire 1252. The output of S111 is also a logical 0 because of the logical 1 on its input from S108 via wire 1242. S112 has a logical 1 input on wire 1214 from S008 and its output is also a logical 0. S113 has a logical 1 input from S107 via wire 801 and also has a logical 0 output. Since all of the input signals to S114 are logical 0, its output supplied to terminal ***b*1 via wire 1254** is a logical 1. This means that the difference for this bit position is also a zero.

Considering now the final action of the middle stage, S208 receives input signals from S203 via wire 808; from S204 via wire 809; from S205 via wire 810; and from S206 via wire 811 in addition to the input previously mentioned. As a result of these input signals S208 provides an output signal on wire 812, which for this example is a logical 1, and it in turn is applied as an input signal to S211 via wire 1258 and to S210 via wire 1256. As a result of this logical 1 input, S210 has a logical 0 output signal which is supplied to S214 via wire 1260, and S211 has a logical 0 output signal which is supplied to S214 via wire 1262. S209 supplies a logical 0 on its output to S212 via wire 816 and to S213 via wire 1270. The output of S212 on wire 1264 is a logical 0 since there are logical 1 inputs on lines 1218 and 1200. S213 has as an input a logical 0 from S207 via wire 814. Since the other inputs to S213 are also logical 0, the output of S213 on wire 1266 is a logical 1. This logical 1 causes the output of S214 to be a logical 0, which is supplied to terminal ***b*2 via wire 1268. The presence of a logical 0 at terminal *b*2** indicates a difference of one for that bit position.

The fourth stage will now be considered in its final action. S308 receives input signals from S303 via wire 820; from S304 via wire 821; from S305 via wire 822; and from S306 via wire 823 in addition to the input previously described. S308 responds to these input signals, and provides an output signal on wire 824 which is applied as an input signal to S311; to S310 via wire 1272; and on wire 825 which is applied as input signal to S309. S310 also receives an input signal from S307 via wire 826, which is also supplied to S313 via wire 1274. The output of S310 and S311 are logical 0 because of the logical 1 inputs they receive from S308. The output of S310 is supplied to S314 via wire 1276 and the output of S311 is supplied to S314 via wire 1278. Other inputs to S314 are from the outputs of S312 via wire 1280; and S313 via wire 1282. Besides the previously mentioned inputs, S312 has an input S309 via wire 828. The output of S312 is a logical 0 because of logical 1 input signals on lines 1222 and 1204. S313 has as inputs besides those previously mentioned, S307 via wire 1274. Since all of the inputs to S313 are a logical 0, the output signal will be a logical 1. This logical 1 output causes the output of S314 to be a logical 0, this signal in turn being supplied to terminal *b*3 via wire 1284. The presence of logical 0 at terminal *b*3 indicates a difference of one for that bit position.

Turning now to the final consideration of the last stage of the Subtractor Circuitry, it can be seen that S408 receives input signals from S403 via wire 835; from S404 via wire 836; from S405 via wire 837; and from S408 via wire 838 in addition to the input signal previously described. In response to these signals, S408 provides an output signal on wire 839 which is applied as an input signal to S411; to S410 via wire 1286; and the same output signal is applied as an input signal to S409 via wire 840. S410 also receives an input signal from S407 via wire 841, which is also supplied to S413 via wire 1288. The outputs of S410 and S411 are logical 0 because of logical 1 inputs from S408. S410 is applied to S414 via wire 1290 and S411 is applied to S414 via wire 1292. The other input signals to S414 are provided by S412 via wire 1294; and S413 via wire 1296. The output of S409, which is a logical 0, is applied as inputs to S412 via wire 843 and S413 via wire 1300. S413 has a logical 0 output because of a logical 1 input signal on wire 1226. S413 also has a logical 0 output signal because of a logical 1 input on wire 1288. Since all inputs to S414 are logical 0, the output of S414 supplied to terminal *b*4 via wire 1298 is a logical 1. The presence of a logical 1 at terminal *b*4 indicates a difference of zero for that bit position.

It can be seen, then having traced the signals through the circuit connections, that the difference value is 01100 and that the logic signal levels supplied to the *b* terminals are

| *b*4 | *b*3 | *b*2 | *b*1 | *b*0 |
|---|---|---|---|---|
| 1 | 0 | 0 | 1 | 1 |

and have been calculated in parallel by the circuitry just described. It remains only to describe how the Squaring Circuitry operates to form the square of the difference. It will be noted that the operation of the Subtractor is a synchronous, and that there is no timing required in the transfer into the Squaring Circuitry.

SQUARING CIRCUITRY

It will be recalled that this whole embodiment of the inventive concepts is directed toward a consideration of five-bit quantized samples of the Reference Waveforms and of the detected waveforms. There is no intention to limit the scope of the invention to such an embodiment, since these concepts can be either expanded or reduced in a straight forward manner to accommodate larger or smaller sample sizes.

The portion of FIG. 27 designated I illustrates the squaring operation of a binary number. Since the only two digits used in the binary system are logical 0 and logical 1, it is a system readily adaptable to electronic expression by the presence or absence of electric pulse signals. For this embodiment, the presence of a pulse is defined as a logical 1, and the absence of a pulse is recognized as a logical 0, the voltage levels being −3 volts and 0 volts respectively.

The information contained within a grouping of binary digits (bits) may represent a numerical value, or an arbitrary combination meant to convey non-numerical information. The technique used to represent numerical data consists of the well-known system of positional notation, and is characterized by the arrangement of digits in sequence with the understanding that successive digits are to be interpreted as coefficients of successive powers of the base (radix) of the number system being employed; in the binary number system, the successive digits are interpreted as coefficient of successive powers of the base 2. For instance, the difference example described above—01100—would be understood to mean:

$$0(2)^4+1(2)^3+1(2)^2+0(2)^1+0(2)^0$$

The technique of utilizing an arbitrary combination of digits, as applied to the binary number system, to represent non-numerical information is well-known, and may be exemplified by the digital coding of alphabetic information. For example, the letter "*a*" may be represented by the binary digit grouping 01101, or some other arbitrarily chosen combination, and the remainder of the desired characters encoded in a similar manner. It can be seen, then, that messages can be transmitted as continuous waves, and decoded upon detection according to the teaching of this invention.

On the line designated I in FIG. 27 the coefficients of the powers of two are represented as $b_j$, where $j$ is equal to 0 through 4 for the respective digit positions. In the expanded form illustrated to the right of the equal sign in line I it can be seen that there are ten digits required to express the largest possible number resulting from squaring a five-digit number. Also, the coefficients of the right-hand term are designated as $C_i$ where $i$ is equal to 0 through 9 for the respective digit positions in the squared number. These C coefficients are also illustrated on line III of FIG. 27, beneath corresponding columns of the II portion of FIG. 27. The II portion illustrated the expansion of the squaring operation specified for line I, and defines the $b_j$ combinations which must be made for each of the $C_i$ coefficients to determine the squared value.

The portion of FIG. 27 designated as Part IV illustrates in combined and simplified form the combinations of $b_j$ and $\bar{b}_j$ terms which are required to form the squaring operation for the five-bit samples. Note that in all instances the $C_1$ coefficient is equal to logical 0. The equations specified in the Part IV portion of FIG. 27 define the circuit arrangement of the *s* Squaring Circuitry which is illustrated in FIG. 29*a* through FIG. 29*e*.

FIG. 28 illustrates the relationship of the drawings of FIG. 29*a*, FIG. 29*b*, FIG. 29*c*, FIG. 29*d*, and FIG. 29*e*, these figures being the illustration of the Squaring Circuitry, and will be discussed in detail below.

Figure 26A:
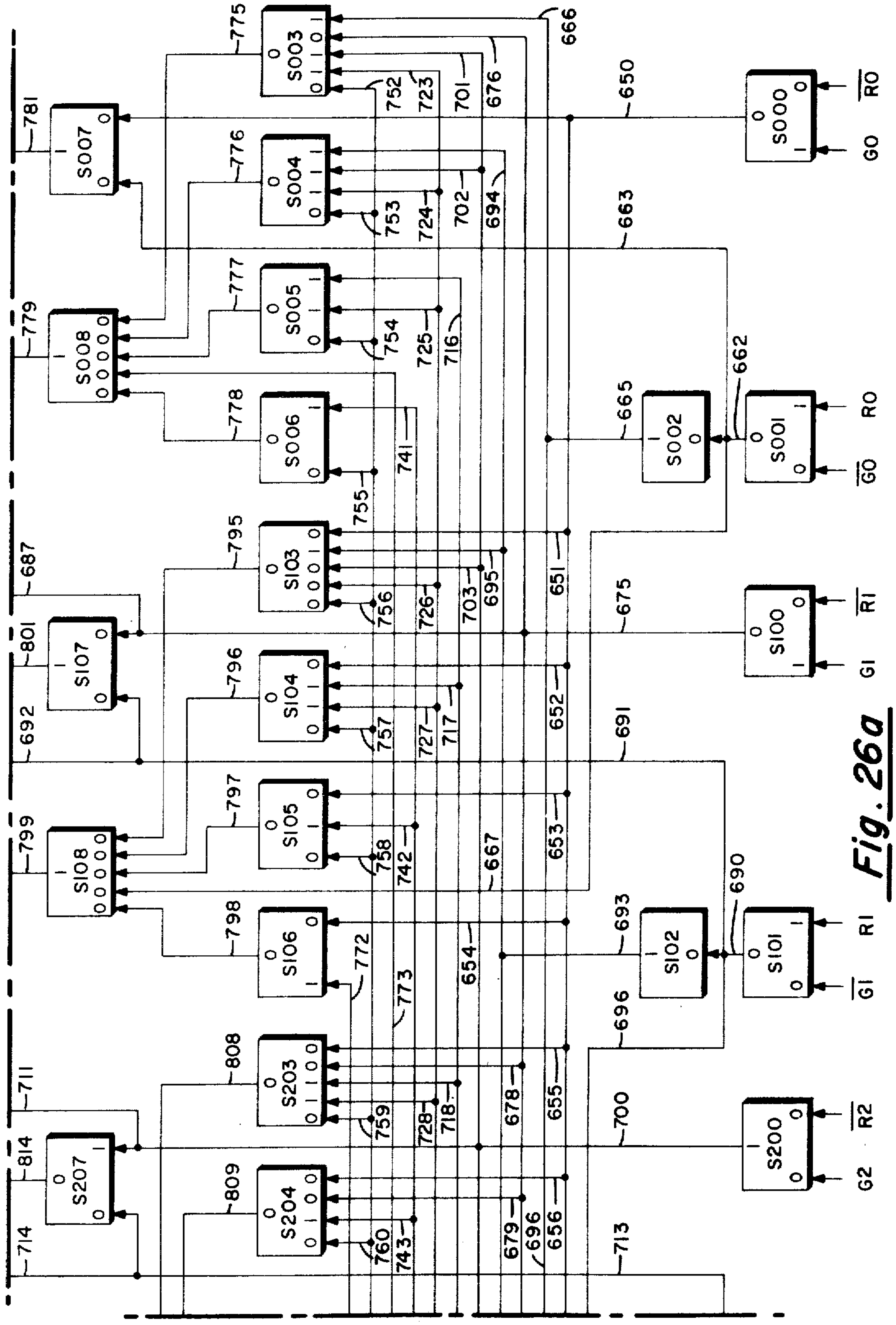
Figure 26B:
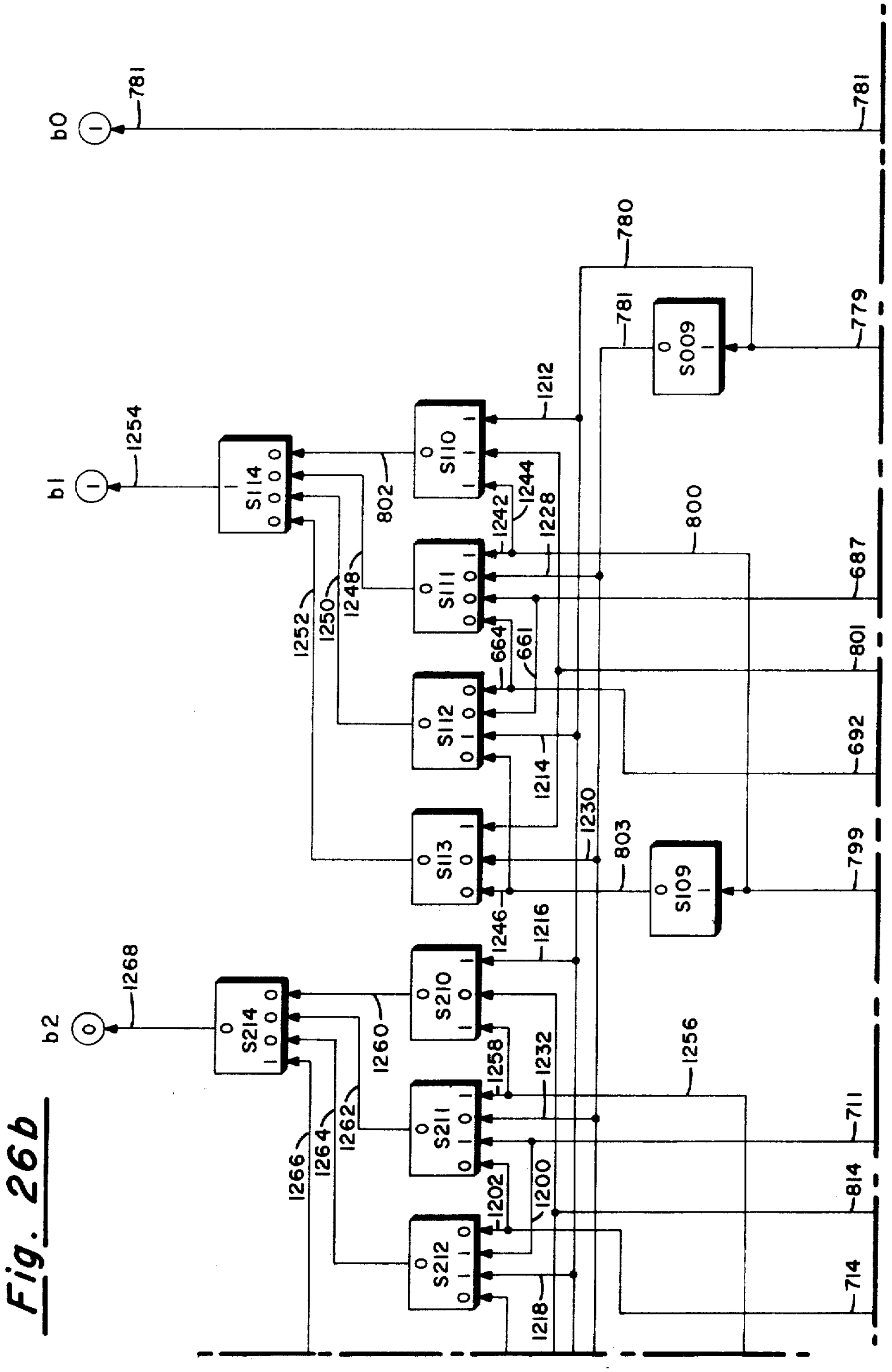
Figure 26C:
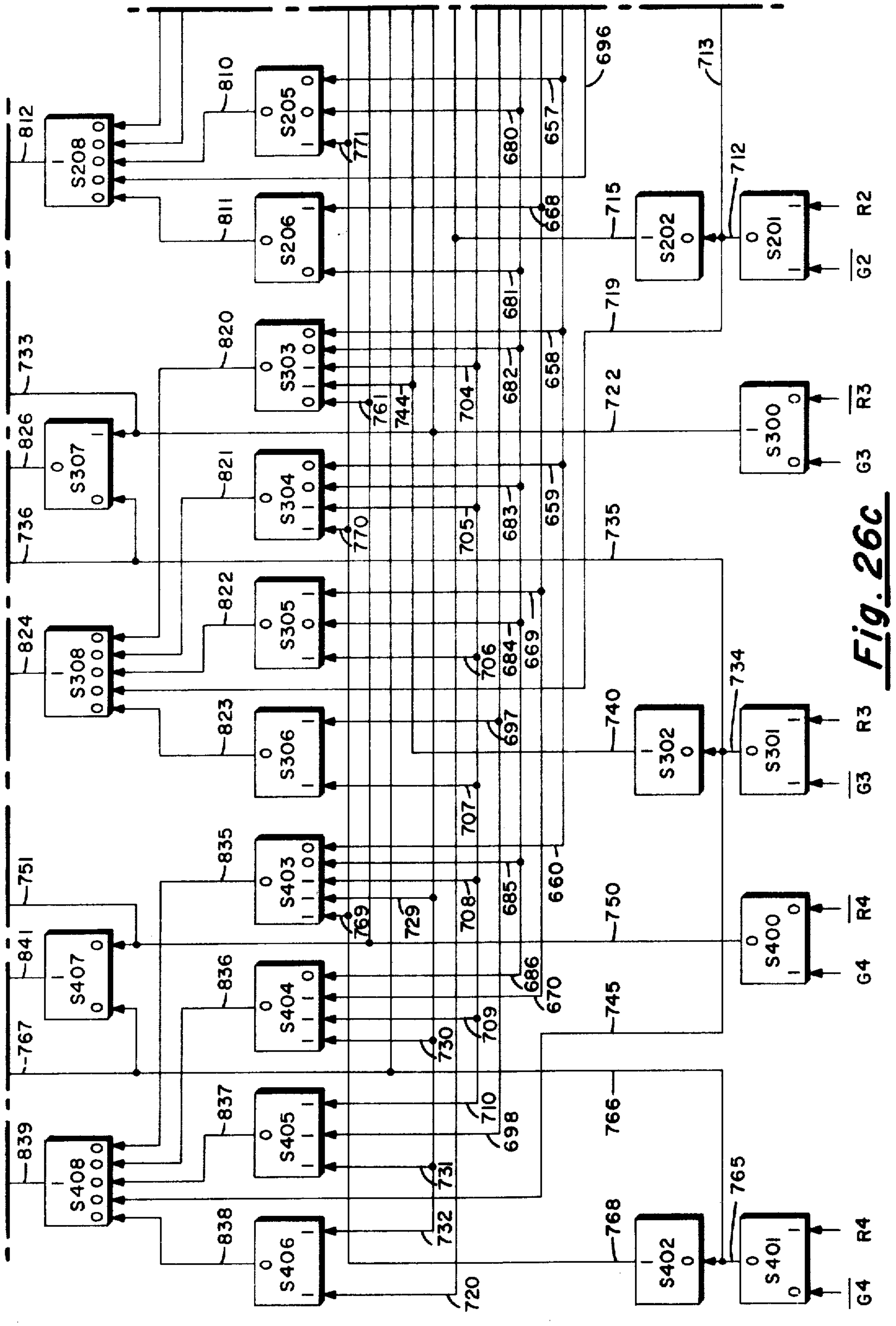
Figure 26D:
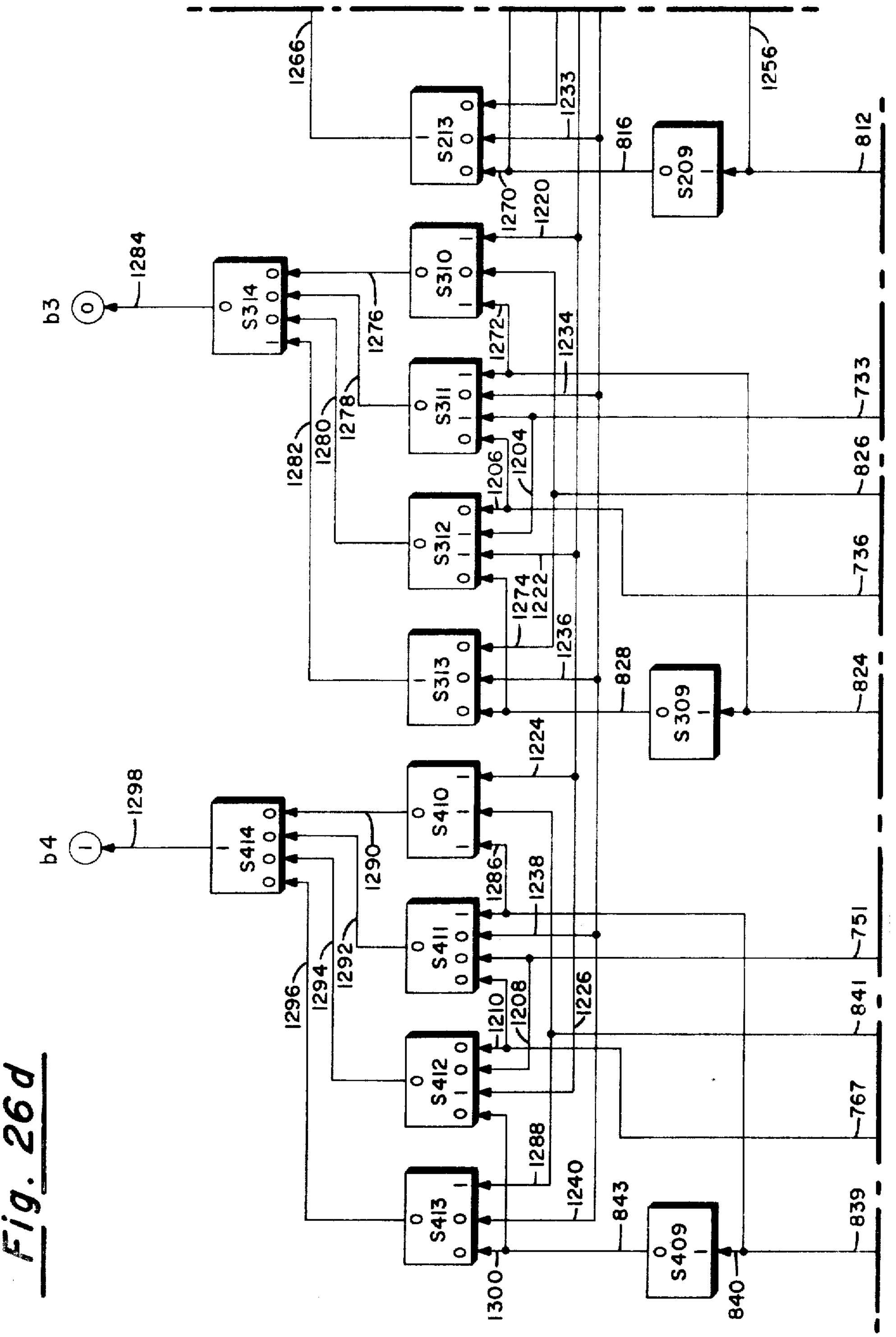

Turning now to a consideration of the Squaring Circuitry, the input signals are derived from the Subtractor Circuitry described above. The *b*0 and the *b*1 output terminals from FIG. 26*b* are respectively coupled to the *b*0 and *b*1 input terminals of FIG. 29*a*; and the *b*2 and *b*3 output terminals from FIG. 26*d* are respectively coupled to the *b*2 and *b*3 input terminals of FIG. 29*a*; and finally the *b*4 output terminal of FIG. 26*d* is coupled to the *b*4 input terminal on FIG. 29*b*. It will be seen, then, that the logical input signal arangement is—

| *b*4 | *b*3 | *b*2 | *b*1 | *b*0 |
|---|---|---|---|---|
| 1 | 0 | 0 | 1 | 1 |

for a difference of 01100.

Mathematically it can be seen that the following relationship exists, $$(01100_2)=14_8=12_{10}$$

and that the result of squaring the example value is $$(01100_2)=14_8=12_{20}$$
$$=220_8$$
$$=144_{10}$$

From the foregoing it can be seen that the signal arrangement that should occur at the output terminals of the Squaring Circuitry is as follows—

| C9 | C8 | C7 | C6 | C5 | C4 | C3 | C2 | C1 | C0 |
|---|---|---|---|---|---|---|---|---|---|
| 0 | 0 | 1 | 0 | 0 | 1 | 0 | 0 | 0 | 0 |

The logical values for the respective input and output signals are shown in the circles which represent the input and output terminals.

Figure 29A:
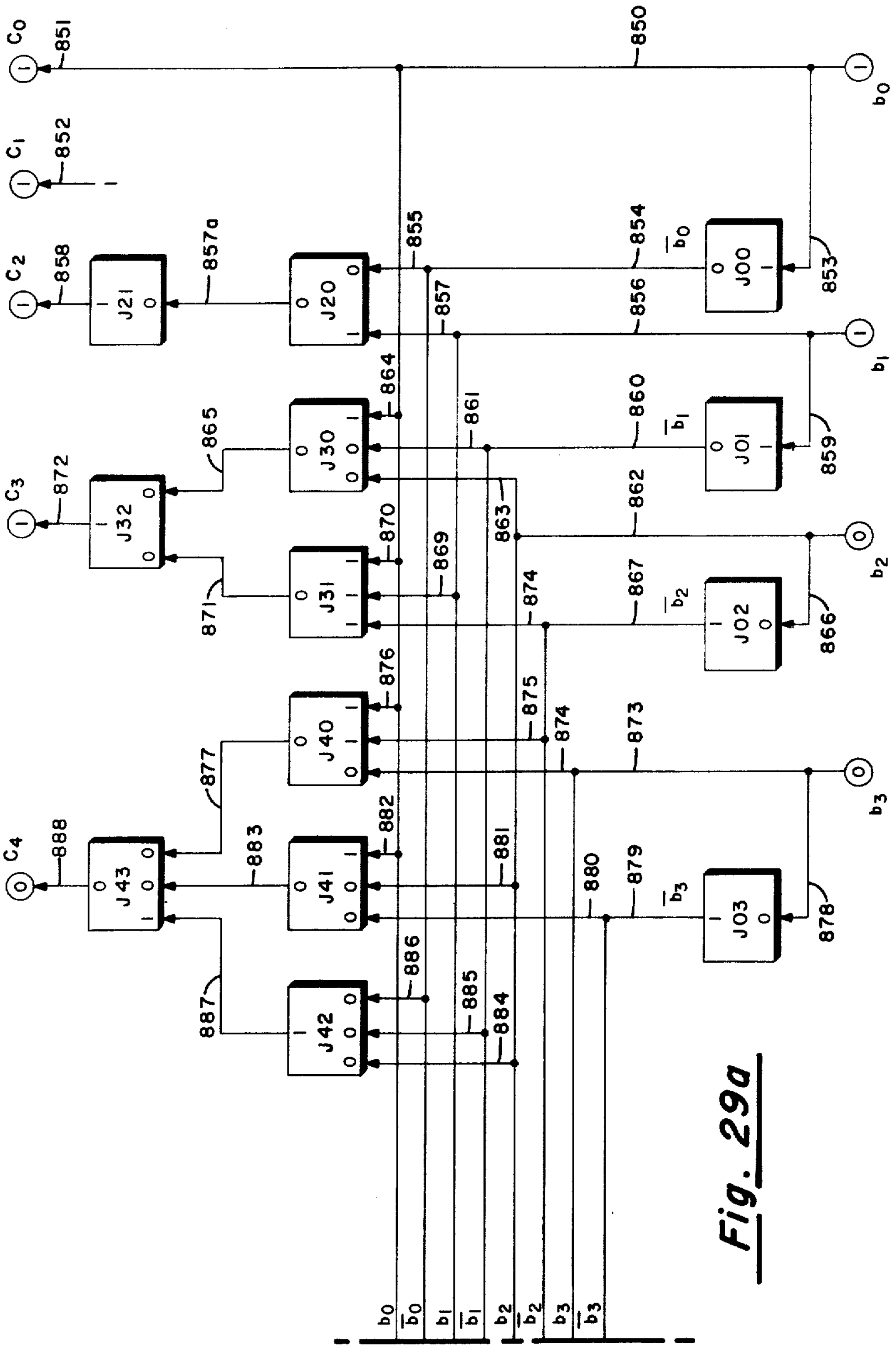
Figure 29B:
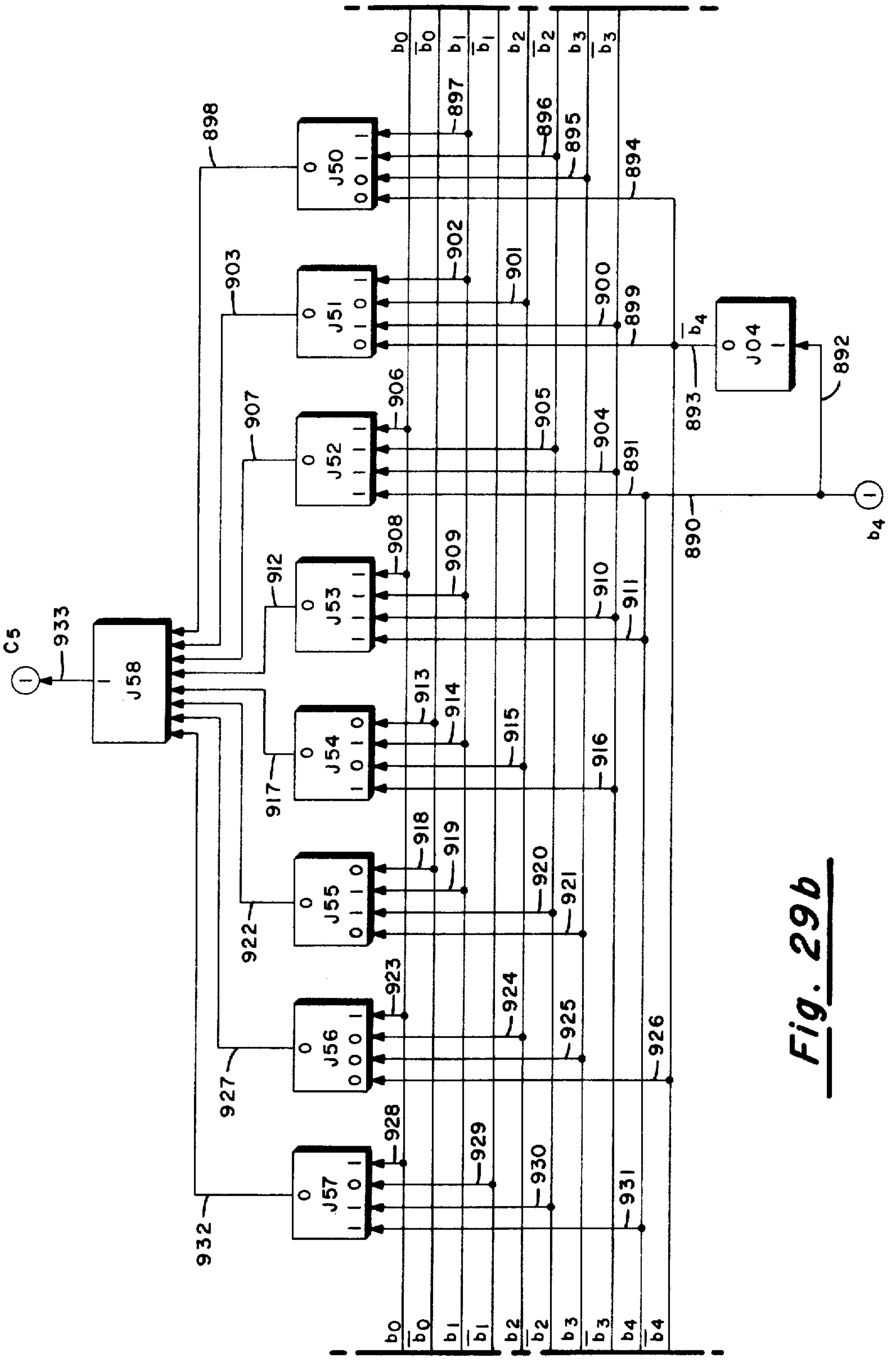

Considering now the determination of $C_i$ coefficients from lowest to highest order, and starting with the circuitry shown on FIG. 29*a*, it can be seen that the *b*0 signal is applied via wire 850 to the *b*0 bus, and via wire 851 to the C0 output terminal, which for this example is thereby provided with a logical 1 output signal.

As described above, C1 coefficient is in all cases a 0, hence wire 852 is coupled to a potential which for this embodiment represents a logical 1.

The *b*0 input signal is also provided as an input signal via wire 853 to inverter J00. The logic 1 provided in this example is inverted by J00, and appears a logical 0 at the output terminal. The $\bar{b}0$ signal is transmitted from J00 via wire 854 to the $\bar{b}0$ bus for further distribution, and via wire 855 as one of the input signals to J20. At the same time, the *b*1 input signal is provided via wire 856 to the *b*1 bus for further distribution, and via wire 857 as the other input signal to J20. Since the *b*1 signal is a logical 1 for this example, the output signal from J20 will be a logical 0, and will be provided to the J21 inverter via wire 857*a*. The output of J21 is a logical 1 and is supplied to the C2 output terminal via wire 858.

The *b*1 input signal is also applied to inverter J01 via wire 859, and the signal is inverted, thereby becoming logical 0, and applied to the $\bar{b}1$ bus via wire 860 and to J30 via wire 861. The *b*2 input signal is applied via wire 862 to the *b*2 bus for further distribution, and to J30 via wire 863. In addition to these two signals, J30 receives the *b*0 signal via wire 864. Since *b*0 is a logical 1 for this example, J30 provides a logical 0 output signal on wire 865 to be applied as an input signal to J32. The *b*2 input signal is also applied to inverter J02, which provides the $\bar{b}2$ signal (logical 1) to the $\bar{b}2$ bus via wire 867 for further distribution, and as an input signal to J31 via wire 868. In addition to $\bar{b}2$, J31 receives the *b*1 (logical 1) signal via wire 869 and the *b*0 signal (logical 1) via wire 870. Since all of the input signals are logical 1 for this example, J31 provides a logical 0 signal on wire 871 as the other input signal to J32. In response to these two input signals, J32 provides a logical 1 output signal on wire 872 to the C3 output terminal.

The *b*3 input signal is a logical 0 for this example and is applied via wire 873 to the *b*3 bus for further distribution, and to J40 via wire 874. In addition to *b*3, J40 receives the $\bar{b}2$ signal via wire 875, and the *b*0 signal via wire 876. In response to these input signals, J40 provides a logical 0 output signal for this example on wire 877, which is coupled to one of the input terminals of J43. The *b*3 input signal is also applied to inverter J03 via wire 878, where the $\bar{b}3$ signal is provided as an output on wire 879 to the $\bar{b}3$ bus, as an input to J41 via wire 880. In addition to this input, J41 also receives an input from the *b*0 bus, which for this case is a logical 1, via wire 882, and from the *b*2 bus via wire 881. Due to one of the input signals being a logical 1, J41 provides a logical 0 output signal on wire 883 as an input to J43. J42 receives input signals from the *b*2 bus via wire 884; from the $\bar{b}1$ bus via wire 885; and from the $\bar{b}0$ bus via wire 886. In response to these input signals, all of which are logical 0 signals, J42 provides an output signal on wire 887 which is a logical 1, and describes the only remaining input signal to J43. With one of the input signals being logical 1 for this example, J43 provides a logical 0 output signal on wire 888 to the C4 output terminal.

The *b*4 input signal is provided on wire 890 as an input to the *b*4 bus for further distribution, and as one of the input signals to J52 via wire 891. The *b*4 signal is also applied as an input signal to inverter J04 via wire 892, which in turn provides the complement, or $\bar{b}4$ signal, on wire 893, which is coupled to the $\bar{b}4$ bus for further distribution. The J50 NOR circuit receives input signals from $\bar{b}4$ bus via wire 894; from the *b*3 bus via wire 895; from $\bar{b}4$ bus via wire 896; and from the *b*1 bus via wire 897. Two of these input signals for this example are logical 1 signals, so J50 provides a logical 0 output signal on wire 898 which in turn is applied as one of the input signals to J58.

The J51 NOR circuit receives input signals from the $\bar{b}4$ bus via wire 899; from $\bar{b}3$ bus via wire 900; from the *b*2 bus via wire 901; and from the *b*1 bus via wire 902. For this example, two of the input signals are logical 1 signals, hence J51 provides a logical 0 on wire 903 as another one of the inputs to J58.

In addition to the *b*4 signal provided on wire 891, J52 receives input signals from the $\bar{b}3$ bus via wire 904, from the $\bar{b}2$ bus via wire 905; and from the *b*0 bus via wire 906. Since the signals provided are all logical 1 for this example, J52 provides a logical 0 output signal on wire 907 as another one of the input signals to J58.

The J53 NOR circuit receives input signals from the *b*0 bus via wire 908; from the *b*1 bus via wire 909; from the $\bar{b}3$ bus via wire 910; and from the *b*4 bus via wire 911. All of the input signals so provided are logical 1 for this example, hence J53 provides a logical 0 output signal on wire 912 as another of the input signals to J58.

The J54 NOR circuit receives input signals from the $\bar{b}0$ bus via wire 913; from the *b*1 bus via wire 914; from 916. For this example two of the input signals are logical 1 signals, hence J54 provides a logical 0 output signal on wire 917 as another of the input signals to J58.

The J55 NOR circuit receives input signals from the $\bar{b}0$ bus via wire 918; from the *b*1 bus via wire 919; from the $\bar{b}2$ bus via wire 920; and from the $\bar{b}3$ bus via wire 921. Two of these input signals are logical 1 signals for this example, hence J55 provides a logical 0 ouput signal on wire 922 as another of the input signals to 158.

The J56 NOR circuit receives input signals from the *b*0 bus via wire 923; from the *b*2 bus via wire 924; from the *b*3 bus via wire 925; and from the $\bar{b}4$ bus via wire 926. One of these input signals is a logical 1 signal for this example, so J56 provides a logical 0 output signal on wire 927 as another of the input signals to J58.

The J57 NOR circuit receives input signals from the *b*0 bus via wire 928; from the *b*1 bus via wire 929; from the $\bar{b}2$ bus via wire 930; and from the *b*4 bus via wire 931. Three of these input signals are logical 1 for this example, hence J57 provides a logical 0 output signal on wire 932, as the only remaining undefined input signal to J58.

All of the input signals to J58 described above are logical 0 signals for this example, so in response thereto J58 provides a logical 1 output signal on wire 933 to the C5 output terminal.

Figure 29C:
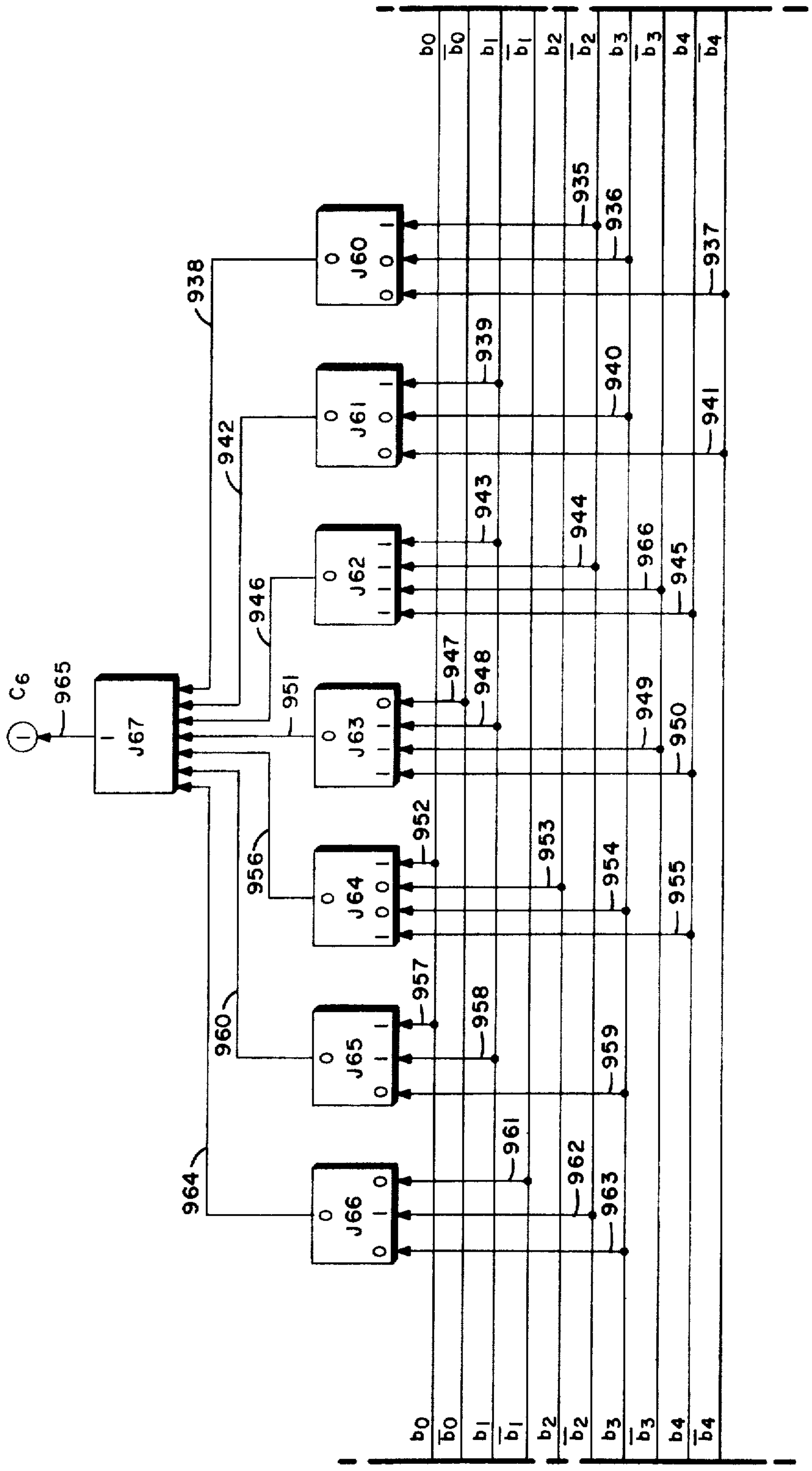

Turning now to a consideration of the circuitry shown on FIG. 29*c*, it can be seen that the J60 NOR circuit receives input signals from the $\bar{b}2$ bus via wire 935; from the *b*3 bus via wire 936; and from the $\bar{b}4$ bus via wire 937. These signals cause the J60 circuit to provide a logical 0 output signal on wire 938 as one of the input signals to J67.

The J61 NOR circuit receives input signals from the *b*1 bus via wire 939; from the *b*3 bus via wire 940; and from the $\bar{b}4$ bus via wire 941. For this example, one of these input signals is a logical 1 signal, hence J61 provides a logical 0 output signal on wire 942 as another of the input signals to J67.

The J62 NOR circuit receives input signals from the *b*1 bus via wire 943; from the $\bar{b}$3 bus via wire 966; from the $\bar{b}$2 bus via wire 944; and from the *b*4 bus via wire 945. For this example, all of these are logical 1 signals, thereby causing J62 to provide a logical 0 output signal on wire 946 as another of the input signals to J67.

The J63 NOR circuit receives its input signals from the $\bar{b}$0 bus via wire 947; from the *b*1 bus via wire 948; from the $\bar{b}$3 via wire 949; and from the *b*4 bus via wire 950. In response to these signals, one of which is a logical 1 signal for this example, J63 provides a logical 0 output signal on wire 951 as another of the input signals to J67.

The J64 NOR circuit receives its input signals from the *b*0 bus via wire 952; from the *b*2 bus via wire 953; from the *b*3 bus via wire 954; and from the *b*4 bus via wire 955. In response to these signals, two of which are logical 1 for this example, J64 provides a logical 0 output signal on wire 956 as another of the input signals to J67.

The J65 NOR circuit receives its input signals from the *b*0 bus via wire 957; from the *b*1 bus via wire 958; and from the *b*3 bus via wire 959. In response to these signals, two of which are logical 1 signals for this example, J65 provides a logical 0 output signal on wire 960 as another of the input signals to J67.

Finally, the J66 NOR circuit receives its input signals from the $\bar{b}$1 bus via wire 961; from the $\bar{b}$2 bus via wire 962; and from the *b*3 bus via wire 963. In response to these input signals, one of which is a logical 1 for this example, J66 provides a logical 0 output signal on wire 964 as the only remaining unexplained input signal to J67.

In response to the input signals described above, all of which are logical 0 for this example, J67 provides a logical 1 output signal on wire 965 to the C6 output terminal.

Figure 29D:
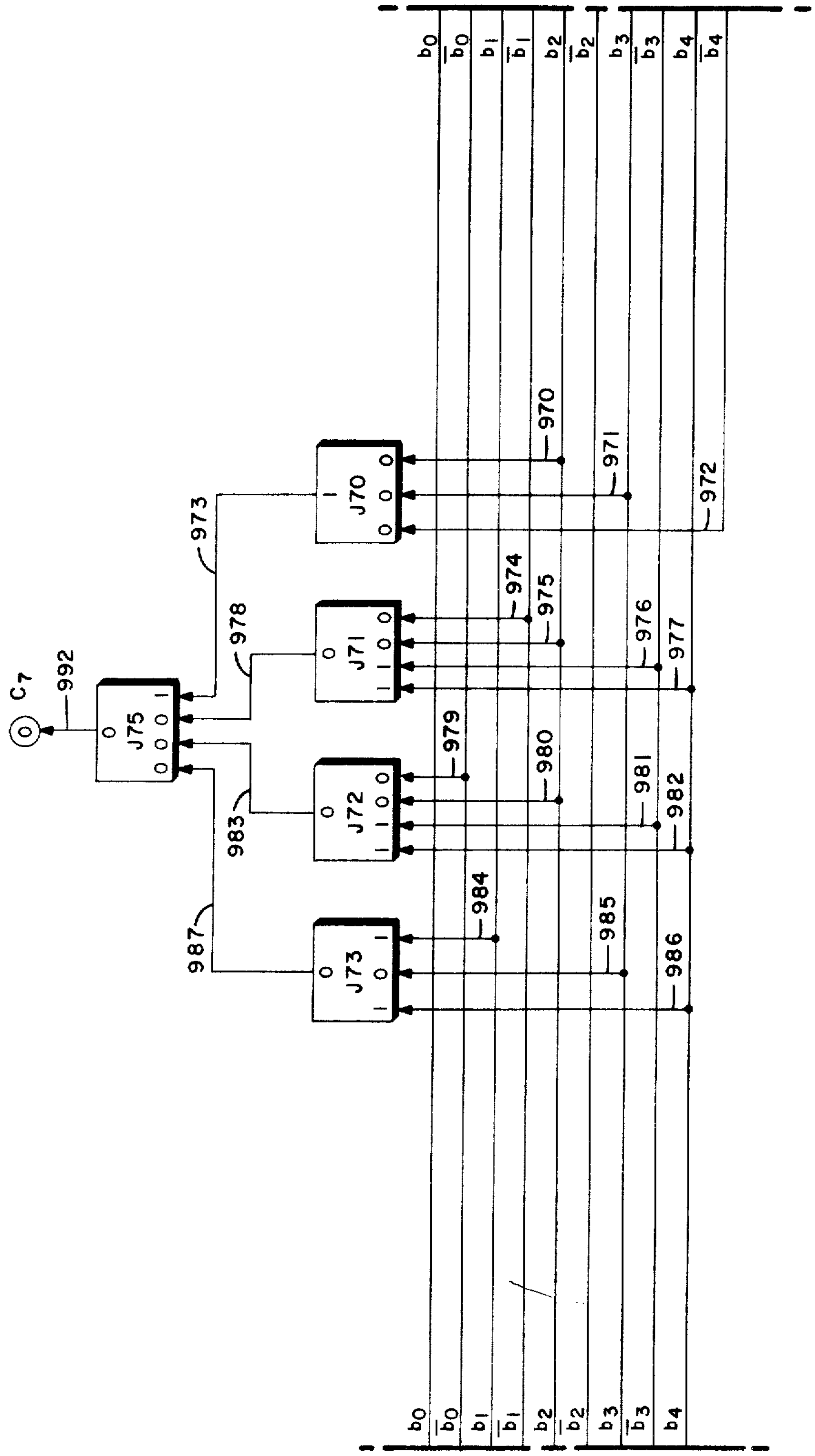

Proceeding now to a consideration of FIG. 29*d*, it can be seen that NOR circuit J70 receives its input signals from the *b*2 bus via wire 970; from the *b*3 bus via wire 971; and from the $\bar{b}$4 bus via wire 972. In response to these input signals, all of which are logical 0 for this example, J70 provides a logical 1 output signal on wire 973 as one of the input signals to J75.

The J71 NOR circuit receives its input signals from the $\bar{b}$1 bus via wire 974; from the *b*2 bus via wire 975; from the $\bar{b}$3 bus via wire 976; and from the *b*4 bus via wire 977. In response to these input signals, two of which are logical 1 signals for this example, J71 provides a logical 0 output signal on wire 978 as another of the input signals to J75.

The J72 NOR circuit receives its input signals from the $\bar{b}$0 bus via wire 979; from the *b*2 bus via wire 980; from the *b*3 bus via wire 981; and from the *b*4 bus via wire 982. In response to these input signals, two of which are logical 1 signals for this example, J72 provides a logical 0 output signal on wire 983 as another of the input signals to J75.

The J73 NOR circuit receives its input signals from the *b*1 bus via wire 984; from the *b*3 bus via wire 985; and from the *b*4 bus via wire 986. In response to these signals, two of which are logical 1 for this example, J73 provides a logical 0 output signal on wire 987 as another of the input signals to J75.

In response to the input signals described above, one of which is a logical 1 signal for this example, J75 provides an output signal on wire 992 to the C7 output terminal. For this example, the output signal is a logical 0.

Figure 29E:
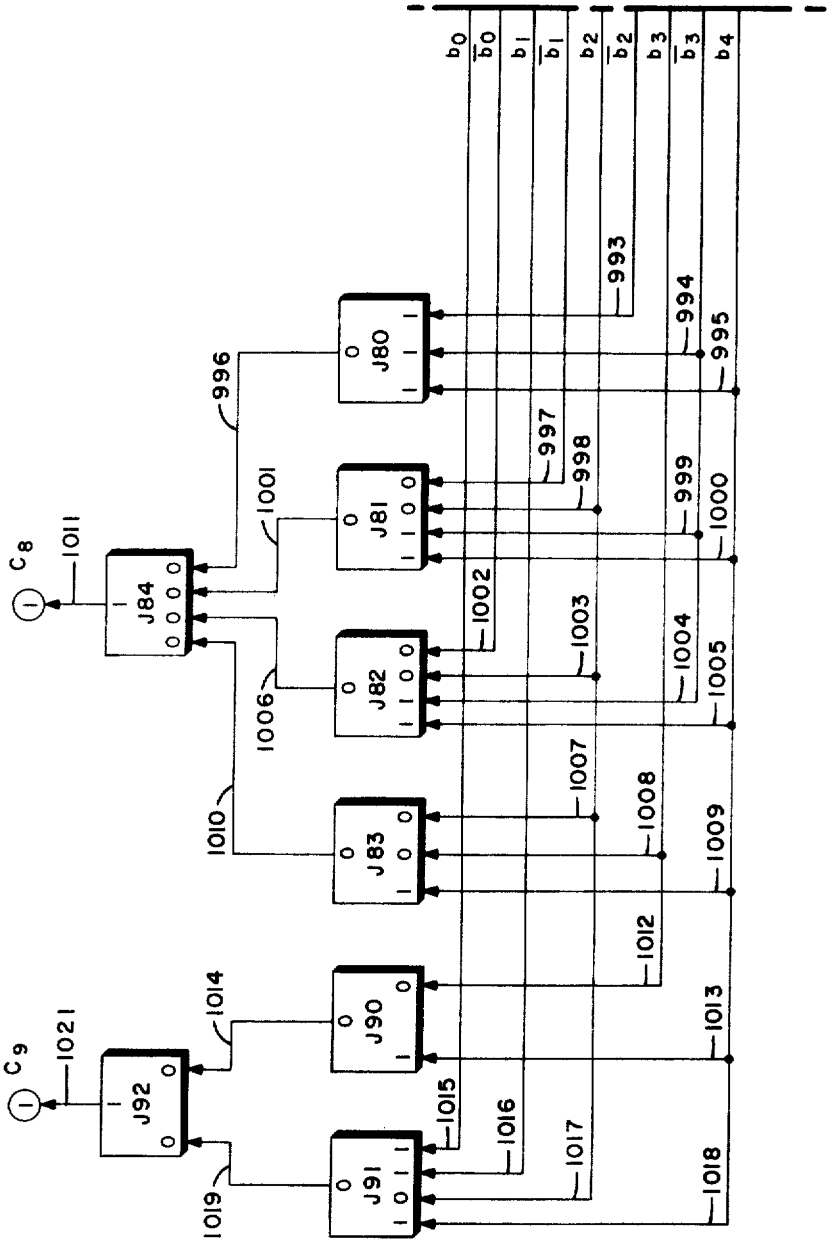

Finally, a consideration of the circuitry illustrated in FIG. 29*e* will determine the nature of the two remaining output terminals. The J80 NOR circuit receives its input signals from the $\bar{b}$2 bus via wire 993; from the $\bar{b}$3 input bus via wire 994; and from the *b*4 bus via wire 995. In response to these input signals, all of which are logical 1 signals for this example, J80 provides a logical 0 output signal on wire 996 as one the input signals to J84.

The J81 NOR circuit receives its input signals from the $\bar{b}$1 bus via wire 997; from the *b*2 bus via wire 998; from the $\bar{b}$3 bus via wire 999; and from the *b*4 bus via wire 1000. In response to these input signals, two of which are logical 1 input signals for this example, J81 provides an output signal on wire 1001, which is a logical 0 for this example, and is applied as another of the input signals to J84.

The J82 NOR circuit receives its input signals from the $\bar{b}$0 bus via wire 1002; from the bus *b*2 bus via wire 1003; from the $\bar{b}$3 bus via wire 1004; and from the *b*4 bus via wire 1005. In response to these input signals, two of which are logical 1 signals for this example, J82 provides an output signal on wire 1006 which is applied as one of the input signals to J84. For this example, the output signal is a logical 0.

The J83 NOR circuit receives its input signals from the *b*2 bus via wire 1007; from the *b*3 bus via wire 1008; and from the *b*4 bus via wire 1009. In response to these input signals, one of which is a logical 1 signal for this example, J83 provides an output signal on wire 1010 which carries the only remaining unexplained input signal to J84.

In response to the above described input signals, all of which are a logical 0 for this example, J84 provides an output signal on wire 1011 which is coupled to the C8 output terminal. This output signal is a logical 1 for this example.

Considering the final stage now, it can be seen the J90 NOR circuit receives its input signals from the *b*3 bus via line 1012 and from the *b*4 bus via wire 1013. In response to these signals, one of which is a logical 1 signal for this example, J90 provides an output signal on wire 1014 which is applied as one of the input signals to J92. For this example, a logical 0 is propagated.

The J91 NOR circuit receives its input signal from the *b*0 bus via wire 1015; from the *b*1 bus via wire 1016; from the *b*2 bus via wire 1017; and from the *b*4 bus via wire 1018. In response to these input signals, three of which are logical 1 signals for this example, J91 provides another of the input signals to J92 via wire 1019. For this example this output signal is a logical 0.

In response to the input signals described above, J92 provides an output signal on wire 1021 which is coupled to the C9 output terminal. For this example the C9 output is a logical 1.

From the foregoing discussion, then, it can be seen that the circuitry described performs the requisite logical operations to square the value of the number provided as an input. The signals provided at the C output terminals are the complement values of the digits of the squared operand, but upon being gated into the appropriate register, (as described above) the true value of the digits are stored. It should also be pointed out that the propagation of the pulses which ultimately result in the squared value being present at the C output terminals is performed in parallel. Having completed the squaring operation, the resultant value is transmitted to either the X1 or X2 Register, as described above, depending upon which of these registers the Squaring Circuitry is associated. For this embodiment, two complete sets of the Squaring Circuitry are required due to the dual arithmetic systems that perform the accumulation of the squared differences as they are generated.

PROGRAMMED CONTROL

It will be recalled from the discussion in conjunction with FIG. 1 that the final selection of the classification to be attributed to the detected waveform is determined by a programmed computer for this embodiment of the inventive concepts. The correlation values determined by the Digital Waveform Classifier are stored temporarily in the Memory Section of the Computer, and upon completion, the lowest valued correlation value is picked to indicate the identification or classification of the unknown detected waveform.

FIG. 30 is a logical flow diagram of the programmed control which performs the assembly and final selection of the classification to be attributed to the detected waveforms. When the Input Signal Sensing Equipment 12 provides the Interrupt input signal on wire 13 to the Computer 10, the operational control of the Programmed Control is put into operation.

Upon receiving the Interrupt signal, which indicates that a waveform has been detected, the Computer causes the programmed routine of computer instructions to be loaded into the operational portion of the Computer for execution; and causes the quantized detected waveform to be stored in a predetermined manner in the Memory Section 60, these operations being designated in block 1030. It should be pointed out at this point, that for any programmed solution of a problem, there may be several ways to code the individual computer instructions. The term "coding" for purposes of this discussion will be defined as listing in computer code the successive computer operations required to carry out a given routine or subroutine or to solve a given problem. This is to be distinguished from the term "program," which for purposes of this discussion, is the design of the logic of the solution of the given problem, and is in no way limited to a particular computer for piece of hardware to perform the actual operations or particular coded sequence of instructions. Therefore, a person skilled in the art of coding can take the problem solution as programmed and described in FIG. 30, and apply it to any computing device of sufficient sophistication to perform the desired control operations which are a part of this invention. Furthermore, the programmed control illustrated in FIG. 30 can be implemented by electronic circuitry, and such a system will be described below.

Continuing now with the discussion of the Programmed Control, an Interrupt signal is caused to be transmitted to the Digital Waveform Classifier 18, as indicated by block 1032, thereby initiating the operation of that circuitry in a manner as described in conjunction with FIG. 24*a* through FIG. 24*d*. It will be recalled that the Reference Waveforms which comprise the class of items which the system is designed to be able to classify or identify are prestored in the Memory Section of the Computer in a predetermined manner. Having sent the Interrupt signal to the Digital Waveform Classifier, the control operation proceeds along to transmit one of the digitally represented Reference Waveforms to the R Registers. This operation is illustrated in block 1034, and is accomplished by the successive transmittal of six words of six samples each for this embodiment, as was described in conjunction with FIG. 24*a*. These six words are read out of six of the Memory Section registers and applied sequentially on the selected Output Channel.

Having established the desired Reference Waveform in the R Registers, the next step in the Programmed Control is to transmit the portion of the quantized detected waveform that has been read in from the analog-to-digital converter and stored in the Memory Section, out to the G Registers. This operation is shown in block 1036, and is accomplished by the successive transmittal of six words of six samples each, as was described in conjunction with FIG. 24*b*. These six words represent one Off-set position for the detected waveform, and are read out of the predetermined Memory Section registers, and applied sequentially to the selected Output Channel. Additionally, when the first Off-set position is loaded in the G Registers, and additional word is transmitted to the G–*in* Register, as described above, to form a supply of additional samples to be used during the process of identification for the subsequent Off-set positions.

At this point the Control Timing 414 and 416 of the Digital Waveform Classifier takes over for the performance of the determination of the correlation value for the Off-set position, and retains the value in the H Register. Upon completion of the calculation for each Off-set position, as described above, a signal is sent to the Computer, as indicated by line 1038, thereby causing two counters to be advanced. This operation is illustrated in block 1040. These counters serve to keep track of how many Off-set positions have been considered for the Reference Waveform under consideration. One of these counters (counter 1) keeps count up to a total of six, thereby determining when another word of six samples must be provided to the G–*in* Register, and the other counter (counter 2) keeps a total count of the Off-set positions evaluated so that when a predetermined number representing all of the Off-set positions has been accumulated, the operation for the Reference Waveform under consideration can be terminated.

Following the advancement of the Off-set Counters 1040, the Programmed Control tests the first of these counters for equality to six, thereby determining if another word is required for the G–*in* Register. This operation is illustrated by decision element 1042. In the event the count is less than six, the No path designated 1044 is taken, and the Programmed Control merely returns to a point where it awaits another signal on line 1038 from the Digital Waveform Classifier indicating that another Off-set position has been completed. In the event that the count is determined to be equal to six, the Yes path designated 1046 is taken, and a new word of six samples taken from the Memory Section and transmitted to the G–*in* Register. This operation is illustrated in block 1048. When a new word is thus transferred, it is necessary to determine whether or not all of the Off-set positions have been evaluated for the Reference Waveform under consideration. This is illustrated by decision element 1050. The decision is made by comparing the value stored in the second counter mentioned above to a predetermined value. If the operation is not completed, the No path designated 1052 is taken, and the first counter is cleared. This operation is illustrated in operation block 1054, and puts counter 1 in an initialized condition which permits it to begin accumulating counts for the new word just transmitted to the G–*in* register.

When the condition is met that the operand stored in the second counter matches the predetermined value indicating the total number of Off-set positions, the Yes path designated 1055 is taken. This determination indicates that all of the Off-set positions of the detected waveform have been compared to the Reference Waveform stored in the R Registers, and that a final correlation value has been determined. This correlation value is stored in the H Register of Digital Waveform Classifier, and is provided on data channel 1056 as an input to the computer. When the Yes path 1055 is taken, the Programmed Control causes the correlation value to be stored in a predetermined table in the Memory Section, as indicated by operation block 1058.

Having determined that a Reference Waveform has been compared to all Off-set positions of the detected waveform, it is necessary to determine if all of the Reference Waveforms have been considered. This operation is illustrated by decision element 1060, and is accomplished by examining a third counter for equality to a predetermined number of Reference Waveforms. In the event that not all of the Reference Waveforms have been considered, the No path designated 1062 will be taken. It is necessary to clear both the first counter and the total Off-set counter (counter 2), as indicated by operation element 1064, thereby preparing them for the consideration of the next Reference Waveform. It is also necessary at that point to advance counter 3, which represents the number of Reference Waveforms which have been considered. This operation is illustrated in block 1066. The procedure then follows path 1067 to a point in the program where the total operation is reinitiated for a subsequent Reference Waveform.

When it is determined that all of the Reference Waveforms have been considered and their corresponding correlation values stored in the Memory Section, the Yes path designated 1068 is taken. At this point each of the correlation values stored is compared to all of the other correlation values, and the lowest valued three are selected. This is an arbitrary choice, and it could equally as well be only the lowest valued one chosen, or more than three could be selected. This operation is illustrated by block 1070.

Having selected the lowest valued correlation value, or the three lowest, as the case may be, it remains to supply the identification signals to the utilization device. This operation is illustrated by block 1072. Following this last operation the controls of the Programmed Control is terminated until another Interrupt indicates that a new waveform has been detected.

It can be readily seen that this Programmed Control yields versatility, in that the number of Off-set positions and the number of Reference Waveforms can be selected at will by altering the prestored parameters which are indicative of these items. Also the number of correlation values to be selected can be readily altered to suit the desired situation.

DIGITAL WAVEFORM CLASSIFIER CONTROL SYSTEM

FIG. 31 is a simplified block diagram of the Digital Waveform Classifier with its own memory and control system included. That portion of the diagram shown within dashed block 1100 is similar to that illustrated in FIG. 21, but it will be noted that the R0 through R5 Registers and the G0 through G5 Registers and the G–*in* Register are not included. The operation of that portion of the circuitry shown within dashed block 1100 is identical to the operation described for the same circuitry above, and will not be repeated here.

By providing the Digital Waveform Classifier with its own addressable Memory 1102, the necessity of utilizing the circulating registers can be omitted, since the samples can be repeatedly read out of the Memory 1102 as needed. This also simplifies the control operations described in conjunction with FIG. 24*a* through FIG. 24*d*, since the register circulation is not required. In its place; however, it is necessary to supply the Memory Addressing Control 1104, which is circuitry of a type well-known in the computing and data processing arts.

For this embodiment, the Control Timing 1106 is comprised of timing chains of a type well-known in the art which are driven by a four-phase clock. The Control Timing operates when initiated by an Interrupt signal on line 1108 from the detection device to issue a signal on line 1110 to initiate the operation of the analog-to-digital converter to quantize the detected waveform. The Quantized signals are then received from the analog-to-digital converter on input channel 1112. These quantized signals are directed by the Memory Addressing Control 1104 to a predetermined memory table in the Memory 1102. This operation continues until such time as the Control Timing 1106 receives a signal from the analog-to-digital converter on control line 1114 that the whole detected waveform has been loaded in the Memory 1102. It should also be pointed out that the desired Reference Waveforms are prestored in a predetermined order in the Memory 1102.

Having loaded a detected waveform, the Control Timing issues a start pulse on wire 1116 to the Memory Addressing Control circuitry 1104, thereby causing it to read the first word of six samples of the Reference Waveform into the Buffer I register 1118, and the first word of six samples, of the detected waveform are read into the Buffer II register 1120. Following this operation, the Memory Addressing Control 1104 issues an enable pulse on wire 1122, thereby enabling Gates 1124 and 1126. When Gates 1124 are enabled, the word in Buffer I register 1118 is transmitted via cable 1128 through the Gates and via cable 1130 into the R Register. In a similar fashion, when Gates 1126 are enabled, the word in the Buffer II register 1120 is transmitted via cable 1132 through the Gates and via cable 1134 into the G Register.

As this time the Control Timing 1106 starts to issue enable pulses on cables 1136 and 1138. These enable pulses are applied to the R Register and the G Register, and cause the associated samples to be gated into the appropriate $(R-G)^2$ circuitry, as described above. It will be recalled that the highest ordered samples in the R Register and the G Register are directed to one of the difference forming circuits, and subsequently the second highest ordered samples in these registers are directed to the other difference forming circuitry, and so on in this back and forth manne runtil all six samples have been operated on. It is the function of the enable signals just mentioned to sequentially gate the samples in the manner described. These same enable pulses are each applied to Counter 1, labeled 1140, via wires 1142 and 1144. Counter 1 is a scale-of-six circular counter which is advanced by one for each enable generated, and returns to zero when the next count pulse is impressed on it.

When Counter 1 has been advanced six times, a pulse is emitted on wire 1146 which is directed to the Memory Addressing Control 1104, and advises it that the next word from the Reference Waveform should be loaded in the Buffer I Register, and that the next word from the detected waveform should be loaded in the Buffer II register. This is accomplished as described above. The same signal is provided via wire 1148 to Counter 2, labeled 1150. This a counter of sufficient stages to be fully counted up when all of the words which represent one full Reference Waveform have been considered. This means that when Counter 2 is fully counted up, one Off-set position for the particular Reference Waveform has been considered. Counter 2 issues a pulse on wire 1152 when the Off-set position has been completed, to the Memory Addressing Control 1104, thereby advising it to start over and load the first word of the Reference Waveform into the Buffer I register so that the next Off-set position of the detected waveform can be analyzed. It also causes the words to be loaded in the Buffer II register to be advanced by one sample position. The pulse emitted from Counter 2 is also provided on wire 1154 to advance Counter 3, labeled 1156. Counter 3 has sufficient stages so that when it is counted up to a predetermined value, it represents the number of Off-set positions for the detected waveform. This count will depend upon the application, and will be determined in advance. The operation of Counter 3 is such that when all of the Off-set positions have been considered for the particular Reference Waveform, it will issue a pulse on wire 1158 to the Control Timing circuits 1106. In response to this pulse the Control Timing will advance the selection of the address of the Reference Waveform by causing the Memory Addressing Control 1104 to be conditioned to select the next Reference Waveform for evaluation with the detected waveform. In addition to this operation, the pulse is applied on wire 1160 as an advance pulse to Counter 4, labeled 1162. Counter 4 is of a predetermined number of stages such that when it is fully counted up it represents the total number of Reference Waveforms being handled by the system. Until it is counted to its capacity the operation is allowed to cycle in the manner described above, with the other counters and circuitry cycling through the calculations for each Off-set position.

When Counter 3 has been advanced to its capacity, thereby indicating that one Reference Waveform has been completely analyzed, the Control Timing 1106 is advised by a pulse on wire 1158, as described above. In addition to the operations described in response to this pulse, the Control Timing also issues a pulse on wire 1164. It will be recalled from above, that upon completion of the consideration of all possible Off-set positions of the detected waveform for a Reference Waveform, that a correlation value is stored in the H register. The occurrence of the pulse on wire 1164 enables Gates 1166, thereby permitting the correlation value to pass therethrough and on cable 1168 to the Comparator Circuit, labeled 1170. This Comparator circuit is of a type well-known in the art, and operates to compare two numerical operands to determine which is numerically larger. The other input to the Comparator is received from the Lowest correlation Register, labeled 1172, in the Memory via cable 1174. The value stored in the Lowest Correlation Register is the lowest correlation value previously determined for the Reference Waveforms that have been considered. If the Comparator determines that the value just read from the H Register is numerically smaller than the value read from the Lowest Correlation Register, thereby indicating that the Reference Waveform just considered is a closer approximation to the detected waveform than those previously considered, it provides the value stored in the H Register via cable 1176 to the Memory Addressing Control, and causes it to be stored in the Lowest Correlation Register 1172. In the event that the value stored in the H Register is found to be numerically larger than the previously determined low value, no alteration is made, and the contents of the Lowest Correlation Register 1172 is left unaltered. This operation causes a continuously updated record of the status of the determination of correlation or identification of the detected waveform to be maintained, so that when the last Reference Waveform has been analyzed, the identification is made by observing the value in the Lowest Correlation Register.

When Counter 4 has counted up to its predetermined capacity, a pulse is issued on wire 1178 to the Control Timing thereby advising the system that the classification operation can be terminated. The same pulse is also issued on wire 1180 to enable Gates 1182. When enabled, these Gates cause the lowest correlation value, as determined by the Comparator, to be read through, and supplied to the Utilization Device 1184.

At this point the entire operation can be re-initiated by receiving the Interrupt on line 1108. From the foregoing, it can be seen that the control circuitry just described performs the same operation as that of the Programmed Control described above, and permits the Digital Waveform Classifier to operate independently from a computer, but that the concepts of operation and control are the same.

What is claimed is:

1. A data processing system for classifying electromagnetic waveforms, apparatus in combination comprising:

means for sampling said detected electromagnetic waveform energy (12);

means for sampling said detected electromagnetic waveform energy at a predetermined frequency, including means for digitally quantizing the samples by forming signal groupings indicative respectively of the sample amplitudes (15);

control means (10) coupled to said sampling means, including addressable storage means (60) for storing quantized digital samples and including additional addressable storage means arranged for storing a predetermining group of reference waveform, said reference waveforms represented by quantized digital samples;

digital waveform correlation means (FIG. 21) coupled to said control means and said storage means for numerically comparing said quantized detected waveforms to each of said reference waveforms in a sample-by-sample system and providing a correlation signal value for each of said reference waveforms; and comparator means (110 of FIG. 1) for evaluating in a predetermined manner said correlation signal values to determine the classification of the detected waveforms.

2. Apparatus as in claim 1 wherein said means for sampling comprises means for sensing waveform amplitude during each sample period, and means for generating digital signals indicative of said sensed amplitudes for each sample position of the detected waveform.

3. Apparatus as in claim 1 wherein said control means comprises a programmable digital computer including a control section for timing and guiding the execution of selected ones of a predetermined repetoire of instructions, a memory section for storing data operand signals and program instructions signals, and an arithmetic section for performing arithmetic manipulations on said data operand signals as directed by said program instruction signals, input means responsively coupled to said means for sampling for receiving said quantizide sample signals into the system, and output means for transmitting control signals and data operands to said waveform correlation means.

4. Apparatus as in claim 1 wherein said waveform correlation means comprises:

reference waveform storage means ($R_0$–$R_6$ in FIG. 21) for storing at least one of a group of predetermined reference waveforms;

detected waveform storage means ($G_0$–$G_6$) for storing at least a portion of quantized detected waveform;

means (330 and 332) for selecting in a predetermined order samples from said reference waveform storage means and samples from said detected waveform storage means;

calculating means responsively coupled to the selecting means including means for generating signals indicative of the numerical differences (FIG. 26) of the samples, and means (FIG. 29) for generating resultant signals indicative of the squared values of said numerical difference indicating signals; and accumulating means ($X_1$, $X_2$, $C_1$, $C_2$, $S_1$, $S_2$, and 372 in FIG. 21) coupled to said calculating means for accumulating the squared difference values of said samples, the sum of the squared sample differences for said reference waveforms being indicative of the degree of correlation of the detected waveforms to the respective reference waveforms.

5. Apparatus as in claim 1 wherein said waveform correlation means (FIG. 21) comprises:

reference waveform storage means ($R_0$–$R_6$) for storing the signals comprising at least one of a group of predetermined reference waveforms;

detected waveform storage means ($G_0$–$G_6$) for storing the signals comprising at least a portion of a quantized detected waveform;

input means (30*a*—FIG. 1) for loading said reference waveform storage means and said detected waveform storage means;

means for selecting and transmitting in a predetermined order sample signals from said reference waveform storage means and sample signals from said detected waveform storage means (414 and 416—FIG. 24);

first and second means (330, 332 and FIG. 26) for generating signals indicative of the numerical difference between reference waveform samples and detected waveform samples;

first and second squaring means (FIG. 29) responsively coupled to associated ones of the first and second difference calculating means for generating signals indicative of the numerically squared values of the numerical difference signals so provided;

control means (FIG. 24) for alternately enabling said first and second difference calculating means;

first and second accumulating means ($X_1$, $C_1$, $S_1$ and $X_2$, $C_2$, $S_2$) responsively coupled to respective ones of said first and second squaring means for accumulating associated ones of the squared sample difference values, said first and second accumulating means alternately operable in accordance with said control means and including carry determining means 372 common to said first and second accumulating means;

off-set control means (FIG. 24) for selectively altering the sequence of samples of the portion of said detected waveform stored in said detected waveform storage means according to a predetermined system, said off-set control means including means ($G_6$) for discarding a sample at one end of the portion of said detected waveform, means for moving all subsequent samples by one sample position, and means (606 and 416) for adding a new sample at the other end of the sequence of samples;

means ($S_1$ and $S_2$) for temporarily storing the signals indicative of the summation of the squared sample differences for each off-set position, including means (380) for transmitting said summation value;

correlation value determining means ($S_2$, H-register, $\overline{H}$, $C_2$) responsively coupled to said off-set control means and said first and second accumulating means for successively comparing each summation of the squared sample difference values for the off-set positions to the previously selected off-set summation value according to a predetermined plan, including means (376) for replacing said previously selected off-set summation value when a first condition is indicated during comparison and further including means for leaving said previously selected off-set summation value unaltered when a second condition is indicated during comparison; and storage means (60, FIG. 1) coupled to the means for transmitting and arranged for storing said finally retained off-set summation values for the respective reference waveforms according to the predetermined plan, each of said finally retained off-set summation values indicative of the degree of correlation of its associated reference waveform to the detected waveform.

6. Apparatus as in claim 1 wherein said comparator means comprises means coupled to said addressable storage means for evaluating said correlation signal values according to a predetermined plan, including means for selecting the lowest valued correlation signal value stored therein as the reference waveform most closely approximating the detected waveform.

7. A data processing system for classifying electromagnetic waveforms, apparatus in combination comprising:

means (12) for detecting electromagnetic waveform energy;

means (15) for sampling said detected electromagnetic waveform energy at a predetermined frequency, including means for digitally quantizing the samples by forming signal groupings indicative respectively of the sample amplitudes;

control means (10) coupled to said sampling means, including addressable storage means (60) for storing quantized digital samples and including additional addressable storage means arranged for storing a predetermined group of reference waveforms, said reference waveforms each represented by quantized digital samples;

input means (30*a*) intermediate said sampling means and said control means for transmitting said signal groupings to said storage means;

real-time control means (80) for controlling the time allowed for the classification of each of said detected electromagnetic waveforms;

digital waveform correlation means (18) coupled to said control means, said storage means, and said real-time control means for numerically comparing said quantized detected waveforms to each of said reference waveforms in a sample-by-sample system and providing a correlation signal value for each of said reference waveforms;

comparator means (110) for evaluating in a predetermined manner said correlation signal values to determine the classification of the detected waveform; and output means (30*b* and 24) for transmitting signals indicative of the classification of said detected waveforms.

8. Apparatus as in claim 7 wherein said means for sampling comprises means for sensing waveform amplitude during each sample period, and means for generating digital signals indicative of said sensed amplitudes for each sample position of the detected waveform.

9. Apparatus as in claim 7 wherein said control means comprises a programmable digital computer including a control section for timing and guiding the execution of selected ones of a predetermined repertoire of instructions, a memory section for storing data operand signals and program instructions signals, and an arithmetic section for performing arithmetic manipulations on said data operand signals as directed by said program instruction signals, input means responsively coupled to said means for sampling for receiving said quantized sample signals into the system, and output means for transmitting control signals and data operands to said waveform correlation means.

10. Apparatus as in claim 7 wherein said comparator means comprises means coupled to said addressable storage means for evaluating said correlation signal values according to a predetermined plan, including means for selecting the lowest valued correlation signal value stored therein as the reference waveform most closely approximating the detected waveform.

11. Apparatus as in claim 7 wherein said waveform correlation means comprises;

reference waveform storage means ($R_0$–$R_6$, FIG. 21) for storing at least one of a group of predetermined reference waveforms;

detected waveform storage means ($G_0$–$G_6$) for storing at least a portion of a quantized detected waveform;

means (414 and 416) for selecting a predetermined order samples from said reference waveform storage means and samples from said detected waveform storage means;

calculating means (330 and 332) responsively coupled to the selecting means including means for generating signals indicative of the numerical differences of the samples and means for generating resultant signals indicative of the squared values of said numerical difference indicating signals; and accumulating means (half adders and associated registers) coupled to said calculating means for accumulating the squared difference values of said samples, the sum of the squared sample differences for said reference waveforms being indicative of the degree of correlation of the detected waveforms to the respective reference waveforms.

12. Apparatus as in claim 7 wherein said waveform correlation means comprises:

reference waveform storage means for storing the signals comprising at least one of a group of predetermined reference waveforms;

detected waveform storage means for storing the signals comprising at least a portion of a quantized detected waveform;

input means (30*b*) for loading said reference waveform storage means and said detected waveform storage means and said detected waveform storage means;

means (414 and 416) for selecting and transmitting in a predetermined order sample signals from said reference waveform storage means and sample signals from said detected waveform storage means;

first and second means (FIG. 26) for generating signals indicative of the numerical difference between reference waveform samples and detected waveform samples;

first and second squaring means (FIG. 29) responsively coupled to associated ones of the first and second difference calculating means for generating signals indicative of the numerically squared values of the numerical difference signals so provided;

control means (414, 416, 560 and 552) for alternately enabling said first and second difference calculating means;

first and second accumulating means (Half adders $X_1$, $C_1$, $S_1$ and $X_2$, $C_2$, $S_2$) responsively coupled to respective ones of said first and second squaring means for accumulating associated ones of the squared sample difference values, said first and second accumulating means alternately operable in accordance with said control means control of said difference calculating means and including carry determining means (372) common to said first and second accumulating means;

off-set control means ($G_6$ and 498, 552, 576, 604 and 612) for selectively altering the sequence of samples of the portion of said detected waveform stored in said detected waveform storage means according to a predetermined system, said off-set control means including means for discarding a sample at one end of the portion of said detected waveform, means (G-register gates in FIG. 24) for moving all subsequent samples by one sample position, and means for adding a new sample at the other end of the sequence of samples;

means ($S_2$) for temporarily storing the signals indicative of the summation of the squared sample differences for each off-set position, including means 380 for transmitting said summation value;

correlation value determining means (H-register, $\overline{H}$, $C_2$) responsively coupled to said off-set control means and said first and second accumulating means for successively comparing each summation of the squared sample difference values for the off-set positions to the previously selected off-set summation value according to a predetermined plan, including means 376 for replacing said previously selected off-set summation value when a first condition is indicated during comparison and further including means for leaving said previously selected off-set summation value unaltered when a second condition is indicated during comparison; and storage means (H-register) coupled to the means for transmitting and arranged for storing said finally retained off-set summation values for the respective reference waveforms according to the predetermined plan, each of said finally retained off-set summation values indicative of the degree of correlation of its associated reference waveform to the detected waveform.

13. In a waveform classification system having apparatus for detecting, sampling, and quantizing electromagnetic waveform energy and having a storage section for storing a plurality of predetermined reference waveforms, each of these reference waveforms represented by signal groupings, waveform identification apparatus comprising:

reference waveform storage (R-registers—FIGS. 21 and 31) for storing at least one of a group of predetermined reference waveforms;

detected waveform storage means (G-Registers) for storing at least a portion of a quantized detected waveform;

means (414 and 416) for selecting in a predetermined order samples from said reference waveform storage means and samples from said detected waveform storage means;

calculating means (330 and 332) responsively coupled to the selecting means, including (FIG. 26) for generating signals indicative of the numerical differences of the samples, and means (FIG. 29) for generating resultant signals indicative of the squared values of said numerical difference indicating signals; and accumulating means (Half-adder, $X_1$, $C_1$, $S_1$, $X_2$, $C_2$, $S_2$) coupled to said calculating means for accumulating the squared difference values of said samples, whereby the sum of the squared differences for said reference waveforms are indicative of the degree of correlation of the detected waveforms to the respective reference waveforms.

14. In a waveform classification system having apparatus for detecting, sampling, and quantizing electromagnetic waveform energy and having storage apparatus for storing a plurality of predetermined reference waveforms, classification apparatus comprising:

reference waveform storage means ($R_0$–$R_6$) for storing the signals comprising at least one of a group of predetermined reference waveforms;

detected waveform storage means ($G_0$–$G_6$) for storing the signals comprising at least a portion of a quantized detected waveform;

input means (30*b*) for loading said reference waveform storage means and said detected waveform storage means;

means (520, 560, 584, 496, 550, 574) for selecting and transmitting in a predetermined order sample signals from said reference waveform storage means and sample signals from said detected waveform storage means;

first and second means (506 and 526) for generating signals indicative of the numerical difference between reference waveform samples and detected waveform samples;

first and second squaring means (512, 540) responsively coupled to associated ones of the first and second difference calculating means for generating signals indicative of the numerically squared values of the numerical difference signals so provided;

control means (414, 416) for alternately enabling said first and second difference calculating means;

first and second accumulating means ($X_1$, $C_1$, $S_1$, $X_2$, $C_2$, $S_2$) respectively coupled to respective ones of said first and second squaring means for accumulating associated ones of the squared sample difference values, said first and second accumulating means alternately operable in accordance with said control means control of said difference calculating means and including carry determining means (372) common to said first and second accumulating means;

means ($S_2$ register) for temporarily storing the signals indicative of the summation of the squared sample differences for each of said reference waveforms, including means 380 for transmitting each of the summation values; and storage means (H-Register) coupled to said means for transmitting and arranged for storing said summation values according to a predetermined plan, each of said summation values indicative of the degree of correlation of its associated reference waveform to the detected waveform.

15. In a waveform classification system having apparatus for detecting, sampling, and quantizing electromagnetic waveform energy and having storage apparatus for storing a plurality of predetermined reference waveforms, classification apparatus comprising:

reference waveform storage means ($R_0$–$R_6$) for storing the signals comprising at least one of a group of predetermined reference waveforms;

detected waveform storage means ($G_0$–$G_6$) for storing the signals comprising at least a portion of a quantized detected waveform;

input means 30*b* for loading said reference waveform storage means and said detected waveform storage means;

means (520, 560, 584, 550, 574) for selecting and transmitting in a predetermined order sample signals from said reference wave form storage means and sample signals from said detected waveform storage; means;

first and second means (506, 526) for generating signals indicative of the numerical difference between reference waveform samples and detected waveform samples;

first and second squaring means (512, 540) responsively coupled to associated ones of the first and second difference calculating means for generating signals indicative of the numerically squared values of the numerical difference signals so provided;

control means (414, 416) for alternately enabling said first and second difference calculating means;

first and second accumulating means ($X_1$, $C_1$, $S_1$, $X_2$, $C_2$, $S_2$) responsively coupled to respective ones of said first and second squaring means for accumulating associated ones of the squared sample difference values, said first and second accumulating means alternately operable in accordance with said control means control of said difference calculating means and including carry determining means 372 common to said first and second accumulating means;

off-set control means (G–*in*) for selectivity altering the sequence of samples of the portion of said detected waveform stored in said detected waveform storage means according to a predetermined system, said off-set control means including means ($G_6$) for discarding a sample at one end of the portion of said detected waveform, means for moving all subsequent samples by one sample position, and means for adding a new sample at the other end of the sequence of samples;

means ($S_2$) for temporarily storing the signals indicative of the summation of the squared sample differences for each off-set position, including means (380) for transmitting said summation value;

correlation value determining means (372, 376) responsively coupled to said off-set control means and said first and second accumulating means for successively comparing each summation of the squared sample difference values for the off-set positions to the previously selected off-set summation value according to a predetermined plan, including means (376) for replacing said previously selected off-set summation value when a first condition is indicated during comparison and further including means for leaving said previously selected off-set summation value unaltered when a second condition is indicated during comparison; and storage means (H-Register) coupled to the means for transmitting and arranged for storing said finally retained off-set summation values for the respective reference waveforms according to the predetermined plan, each of said finally retained off-set summation values indicative of the degree of correlation of its associated reference waveform to the detected waveform.

16. In a data processing system for classifying electromagnetic waveforms, apparatus in combination comprising:

means (12) for detecting electromagnetic waveform energy;

means (15) for sampling said detected electromagnetic waveform energy at a predetermined frequency, including means for digitally quantizing the samples by forming signal groupings indicative respectively of the sample amplitudes;

control means (10) for guiding and controlling the classification operation;

input means (30*a*) intermediate said sampling means and said control means for providing quantized input signals indicative of the detected waveform samples thereto;

addressable storage means (60) coupled to said control means and arranged for storing said detected waveform samples, and further including addressable storage means for storing a predetermined group of reference waveforms;

digital waveform correlation means (18) coupled to said contol means and said storage means for numerically comparing said quantized detected waveforms to each of said reference waveforms in a sample-by-sample system and providing a correlation signal value for each of said reference waveforms;

off-set control means (414, 416) for controlling the order of selecting the samples of said detected waveforms in forming the sum of the squared sample differences for the respective reference waveforms;

means (418) coupled to said control means and responsively associated with said off-set control means for controlling the storing of said correlation signal values in said storage means, and for issuing a completion signal (interrupt—FIG. 24*c*) to said control means upon the completion of the evaluation of all of the reference waveforms for all off-set positions; and comparator means (110) for evaluating in a predetermined manner said correlation signal values to determine the classification of the detected waveform.

17. In a data processing system for classifying electromagnetic waveforms apparatus in combination comprising:

input means (12, 15) providing signals indicative of quantized samples of a detected unknown waveform;

control means (1106) for guiding and controlling the classification operation;

addressable storage means (1102) coupled to said control means and arranged for storing said detected waveform samples, and further including addressable storage means for storing a predetermined group of reference waveforms;

first and second means (506, 526) for generating signals indicative of the numerical difference between reference waveform samples and detected waveform samples;

first and second squaring means (512, 540) responsively coupled to associated ones of the first and second difference calculating means for generating signals indicative of the numerically squared values of the numerical difference signals so provided:

first and second accumulating means ($X_1$, $C_1$, $S_1$, $X_2$, $C_2$, $S_2$) responsively coupled to respective ones of said first and second squaring means for accumulating associated ones of the squared sample difference values, said first and second accumulating means alternately operable in accordance with said control means, carry determining means (carry pyramid) common to said first and second accumulating means;

reference waveform buffer storage means 1118 and detected waveform buffer means 1120;

means for loading a predetermined number of samples of said reference waveforms into the associated reference waveform buffer and a predetermined number of samples into the associated detected waveform buffer;

enabling means for alternately enabling said first and second difference calculating means;

first counter means coupled to said enabling means for providing a signal upon reaching a predetermined count, said signal arranged for causing the transmission of additional samples to said reference waveform buffer and said detected waveform buffer;

second counter means coupled to said first counter means for providing a signal upon reaching a predetermined count indicating that all samples for an off-set position have been evaluated, said second counter having its output terminal coupled to said addressable storage means for causing it to select samples for a subsequent off-set position;

third counter means responsively coupled to said second counter means for providing a signal upon being advanced to a predetermined count indicating that all off-set positions for the detected waveform have been evaluated for the reference waveform under consideration, said third counter means having its output terminal coupled to said control means for causing it to select the next reference waveform in response thereto;

fourth counter means responsively coupled to said third counter means for providing a signal upon being advanced to a predetermined count indicating that all of the reference waveforms have been evaluated, said fourth counter means having its output terminal coupled to said control means for causing it to prepare to receive a new detected waveform;

means for temporarily storing the signals indicative of the summation of the squared sample differences for each off-set position, including means for transmitting said summation values;

correlation value determining means responsively coupled to said control means and said first and second accumulating means for successively comparing each summation of the squared sample difference values for the off-set positions to the previously selected off-set summation value according to a predetermined plan;

means for utilizing the signals indicative of the wave form classification; and a plurality of gates coupled to said correlation value determining means and said fourth counter means in a manner for transmitting the final correlation value to said utilization means upon completion of evaluation of all of said reference waveforms.

18. In a waveform classification system having a plurality of predetermined reference waveforms said waveforms having a predetermined number of quantized samples, for use in classifying unknown detected waveforms, the process of classification comprised of the steps of:

(a) detecting unknown waveforms;

(b) sampling and amplitude quantizing said detected waveforms at a predetermined rate and storing the quantized values so determined, the number of samples being greater than the number of samples of said reference waveforms;

(c) selecting a reference waveform for evaluation;

(d) forming the correlation value for the reference waveform under consideration by determining the sum of the squared sample differences for all off-set position of the detected waveform, and selecting and storing the lowest value as the degree of correlation between the reference waveform and the detected waveform;

(e) repeating steps *c* and *d* until all reference waveforms have been evaluated and the respective correlation values determined; and (f) comparing all of the correlation values numerically and selecting the lowest value as being indicative of the closest approximation of the associated reference waveform to the detected waveform, thereby identifying and classifying the detected waveform.

19. In a waveform classification system having a plurality of predetermined reference waveforms, said waveforms having a predetermined number of quantized samples, for use in classifying unknown detected waveforms, the process of classification comprised of the steps of:

(a) detecting unknown waveforms;

(b) sampling and amplitude quantizing said detected waveforms at a predetermined rate and storing the quantized values so determined, the number of samples being greater than the number of samples of said reference waveforms;

(c) selecting a reference waveform for evaluation;

(d) selecting an off-set position of a sequential number of quantized samples of the detected waveform, said number being equal to the number of samples in the reference waveform;

(e) sequentially subtracting a sample of the detected waveform from the associated sample of the reference waveform and squaring the difference thus determined for the off-set position;

(f) accumulating the difference squared values for the off-set position;

(g) upon completion of an off-set position, selecting the next off-set position of the detected waveform and repeating steps (e) and (f);

(h) after the completion of the evaluation of each off-set position, after the first one for each reference waveform, comparing the final accumulated value to the previously selected value, and, if greater, leaving the previously selected low value unaltered, and, if of a lesser value, replacing the previously selected low value with the newly determined low accumulated value;

(i) repeating steps (e), (f), and (g) until all off-set positions have been evaluated for a reference waveform and when completed, saving the final accumulated value:

(j) repeating steps (c) through (i) for each reference waveform in the system; and (k) when all reference waveforms have been evaluated, comparing all of the final accumulated values numerically and selecting the lowest value as being indicative of the closest approximation of the associated reference waveform to the detected waveform.

References Cited

UNITED STATES PATENTS

| | | | |
|---|---|---|---|
| 3,037,076 | 5/1962 | Williams et al. | 179—1 |
| 3,177,349 | 4/1965 | Zaborszky et al. | 235—150.5 XR |
| 3,302,109 | 1/1967 | Jones | 340—149 XR |
| 3,354,297 | 11/1967 | Anderson et al. | 235—181 |
| 3,376,411 | 4/1968 | Montani et al. | 235—151.32 |

OTHER REFERENCES

Final Engineering Report, Digital Correlator Study, Navy Department Bureau of Ships, UNIVAC Division of Sperry Rand, December 1962, Cataloged by ASTIA as AD No. 296 216, received by ASTIA on February 15th, 1963, pp. 1 to 28, and 29 which commences Waveform Identification Techniques by Farrell containing pp. 1 to 15.

EUGENE G. BOTZ, Primary Examiner
EDWARD J. WISE, Assistant Examiner

U.S. Cl. X.R.

235—150.5, 152, 181; 340—149, 146.3

UNITED STATES PATENT OFFICE

CERTIFICATE OF CORRECTION

Patent No. 3,504,164 March 31, 1970

Edward J. Farrell et al.

It is certified that error appears in the above identified patent and that said Letters Patent are hereby corrected as shown below:

Column 48, line 64, cancel "and said detected waveform storage means". Column 50, line 38, "respectively" should read -- responsively --.

Signed and sealed this 8th day of December 1970.

(SEAL)
Attest:

Edward M. Fletcher, Jr.
Attesting Officer

WILLIAM E. SCHUYLER, JR.
Commissioner of Patents